United States Patent
Abarzadeh et al.

(10) Patent No.: US 11,456,679 B2
(45) Date of Patent: Sep. 27, 2022

(54) VOLTAGE LEVEL MULTIPLIER MODULE FOR MULTILEVEL POWER CONVERTERS

(71) Applicant: ECOLE DE TECHNOLOGIE SUPERIEURE, Montreal (CA)

(72) Inventors: Mostafa Abarzadeh, Montreal (CA); Kamal Al-Haddad, Montréal (CA)

(73) Assignee: SOCOVAR S.E.C., Montreal (CA)

( * ) Notice: Subject to any disclaimer, the term of this patent is extended or adjusted under 35 U.S.C. 154(b) by 0 days.

(21) Appl. No.: 17/079,879

(22) Filed: Oct. 26, 2020

(65) Prior Publication Data

US 2021/0067057 A1 Mar. 4, 2021

Related U.S. Application Data

(63) Continuation of application No. PCT/CA2019/050531, filed on Apr. 25, 2019.

(Continued)

(51) Int. Cl.
*H02M 7/483* (2007.01)
*H02M 7/10* (2006.01)
(Continued)

(52) U.S. Cl.
CPC ....... *H02M 7/53875* (2013.01); *H02M 1/084* (2013.01); *H02M 1/009* (2021.05);
(Continued)

(58) Field of Classification Search
CPC ........ H02M 1/009; H02M 7/10; H02M 7/537; H02M 7/483
(Continued)

(56) References Cited

U.S. PATENT DOCUMENTS

2011/0280052 A1* 11/2011 Al-Haddad ......... H02M 7/4837
363/84
2013/0155741 A1* 6/2013 Takano ................. H02M 3/156
363/98
(Continued)

FOREIGN PATENT DOCUMENTS

WO 2017/152181 A1 9/2017

OTHER PUBLICATIONS

Scott et al., "A gallium Nitride Switched-Capacitor Power Inverter for Photovoltaic Applications" 2012 Twenty-Seventh Annual IEEE Applied Power Electronics Conference and Exposition (APEC), Feb. 5-9, 2012.

(Continued)

*Primary Examiner* — Gary A Nash
(74) *Attorney, Agent, or Firm* — Anglehart et al.

(57) ABSTRACT

Generalized circuit topology of voltage level multiplier modules (VLMMs) for use with multilevel inverters (MLIs) and power converter circuits comprising at least one VLMM and a MLI are described herein. The VLMM is configured to receive a first output voltage from the MLI having a first number of voltage levels and to generate a second output voltage having a second number of voltage levels. If the first number of voltage levels is M, and the VLMM is N-fold voltage level multiplier, then second number of voltage levels is M×N+1. Switching pattern generators for use with the VLMM and modulation methods for controlling switching elements of the VLMM are also described herein.

19 Claims, 49 Drawing Sheets

Related U.S. Application Data

(60) Provisional application No. 62/662,389, filed on Apr. 25, 2018.

(51) Int. Cl.
*H02M 7/537* (2006.01)
*H02M 7/5387* (2007.01)
*H02M 1/084* (2006.01)
*H02M 1/00* (2006.01)

(52) U.S. Cl.
CPC ............. *H02M 7/10* (2013.01); *H02M 7/483* (2013.01); *H02M 7/537* (2013.01)

(58) Field of Classification Search
USPC ...................................................... 363/59, 60
See application file for complete search history.

(56) References Cited

U.S. PATENT DOCUMENTS

| | | | | |
|---|---|---|---|---|
| 2014/0003108 | A1* | 1/2014 | Song | H02M 7/483 363/131 |
| 2014/0361700 | A1* | 12/2014 | Mork | H05B 45/3725 315/200 R |
| 2016/0126862 | A1* | 5/2016 | Vahedi | H02M 7/537 363/131 |
| 2017/0104424 | A1* | 4/2017 | Shen | H02M 7/4837 |

OTHER PUBLICATIONS

International application No. PCT/CA2019/050531 International Search Report dated Jun. 28, 2019.
International application No. PCT/CA2019/050531 Search Strategy dated Jun. 28, 2019.
International application No. PCT/CA2019/050531 Written Opinion of the International Searching Authority dated Jun. 28, 2019.
Related European patent application No. 19791633.1 extended European search report dated Dec. 13, 2021.
M. J. Mojibian, et al. "Cascaded Multilevel Inverters with Reduced Structures Based on a Recently Proposed Basic Units: Implementing a 147-level Inverter". AUT Journal of Electrical Engineering. 49 (2) (Apr. 26, 2017), pp. 141-150.

* cited by examiner

TABLE I
SWITCHING STATES OF THE PUC5 CONVERTER.

| $S_1$ | $S_2$ | $S_3$ | $V_{out}$ | $\Delta E_C$ | Switching State | State |
|---|---|---|---|---|---|---|
| 1 | 0 | 0 | $+E$ | 0 | $V_1$ | 1 |
| 1 | 0 | 1 | $+\frac{E}{2}$ | $+$ | $V_2$ | 2 |
| 1 | 1 | 0 | $+\frac{E}{2}$ | $-$ | $V_3$ | 3 |
| 1 | 1 | 1 | 0 | 0 | $V_4$ | 4 |
| 0 | 0 | 0 | 0 | 0 | $V_5$ | 5 |
| 0 | 0 | 1 | $-\frac{E}{2}$ | $-$ | $V_6$ | 6 |
| 0 | 1 | 0 | $-\frac{E}{2}$ | $+$ | $V_7$ | 7 |
| 0 | 1 | 1 | $-E$ | 0 | $V_8$ | 8 |

| Type of MLI | No. of High Freq. Switches | No. of Low Freq. Switches | No. of Capacitors | No. of Diodes | No. of DC Sources | Total No. of Components |
|---|---|---|---|---|---|---|
| NPC | 16×3 | - | 8 | 56×3 | 1 | 225 |
| CHB | 16×3 | - | - | - | 4×3 | 60 |
| FCM | 16×3 | - | 9×3 | - | 2 | 77 |
| ANPC | 8×3 | 4×3 | 5×3 | - | 1 | 52 |
| MMC (FB) | 64×3 | - | 16×3 | - | 1 | 241 |
| MMC (HB) | 32×3 | - | 16×3 | - | 1 | 145 |
| | | | | | | |
| Q-H Bridge | 4×3 | 12 | 3 | - | 1 (1 p.u.) 3 (0.08 p.u.) | 31 |

2900

| Type of MLI | No. of High Freq. Switches | No. of Low Freq. Switches | No. of Capacitors | No. of Diodes | No. of DC Sources | Total No. of Components |
|---|---|---|---|---|---|---|
| NPC | 24×3 | - | 12 | 132×3 | 1 | 481 |
| CHB | 24×3 | - | - | - | 6×3 | 90 |
| FCM | 24×3 | - | 13×3 | - | 2 | 113 |
| ANPC | 12×3 | 4×3 | 7×3 | - | 1 | 70 |
| MMC (FB) | 96×3 | - | 24×3 | - | 1 | 361 |
| MMC (HB) | 48×3 | - | 24×3 | - | 1 | 217 |
|  |  |  |  |  |  |  |
| Q-NPC | 4×3 | 18 | 3 | - | 1 (1 p.u.) 3 (0.04 p.u.) | 37 |

Figure 29

VOLTAGE LEVEL MULTIPLIER MODULE FOR MULTILEVEL POWER CONVERTERS

CROSS-REFERENCE TO RELATED APPLICATIONS

The present application claims priority to U.S. Provisional Patent Application bearing Ser. No. 62/662,389 filed on Apr. 25, 2018, the contents of which are hereby incorporated by reference.

TECHNICAL FIELD

The present disclosure relates generally to power converter circuits, and, more particularly, to voltage level multiplier modules for use with multilevel inverters.

BACKGROUND OF THE ART

Multilevel inverters (MLIs) are used as power converters for energy conversion systems in many industrial applications. Applications for MLIs include renewable energy conversion systems, grid connected inverters, transportation, electric vehicles, aerospace and other industrial plant applications, to name a few. A multilevel inverter (MLI) produces a staircase type of output voltage which provides improved harmonic content, reduced dV/dt, lower switching frequency and losses, higher efficiency, decreased electromagnetic interference (EMI) and fault-tolerant capabilities. These advantages enable MLIs to be used in high-power applications.

MLIs are typically classified under three major topologies: neutral-point-clamped (NPC) converters, cascaded H-bridge (CHB) converters and flying capacitor (FC) converters. FC MLIs have a sub-topology referred to as stacked multi-cell (SM) converters.

It is desirable to increase the number of voltage levels in MLs, for example, to fulfill relevant standards. However, to achieve a higher number of voltage levels in MLIs requires an excessive increase in the number of isolated direct current (DC) power supplies in CHB converters, of DC-link capacitors and clamping diodes in NPC converters, and of flying capacitors in FC and SM converters. In addition, increasing the output voltage levels in the aforementioned topologies, increases not only the number of components but also the complexity of the DC-link capacitors voltage control in NPC converters and of flying capacitors voltage balancing in FC converters.

In order to overcome the aforementioned drawbacks, new configurations of multilevel converters such as hybrid multilevel converters have been proposed. For example, a hybrid cascaded multilevel inverter (HCMLI) which consists of improved 4-level submodules and a full-bridge converter has been proposed. Optimized topologies for symmetrical cascaded multilevel (SCM) and asymmetrical cascaded multilevel (ASCM) converters have also been proposed. A three-stage 18-level hybrid inverter circuit which comprises three hybrid high, medium, and low voltage inverter stages as well as its modulation method have been proposed. However, by increasing the number of output voltage levels, these hybrid configurations require numerous isolated DC-power supplies with various voltages. Hence, the HCMLI, SCM, and ASCM configurations lead to an increase cost and size, and also a decrease in modularity of the mentioned converters.

A hybrid multicell converter (HMC) based on the combination of FC and CHB converters has also been proposed. The nominal voltage of the HMC converter is set to be equal to the blocking voltage of the semiconductors of augmented CHB. Hence, this configuration is not applicable for high voltage MLIs. Moreover, even though the suggested hybrid configuration consists of fewer isolated DC power supplies, they require numerous bulky and costly FCs in order to achieve a large number of voltage levels. This leads to increased cost, size, and complexity of control and modulation while decreasing modularity.

As such, there is a need for improved MLs and associated power electronic circuits and/or modules.

SUMMARY

In one aspect, there is provided a power converter circuit. The power convert circuit comprises a multilevel inverter providing at an output thereof a first output voltage having M voltage levels, and at least one N-fold voltage level multiplier module electrically connected to the output of the multilevel inverter and comprising a plurality of circuit elements configured to provide at least five voltage levels, the at least one voltage level multiplier module configured to receive the first output voltage from the multilevel inverter and to generate a second output voltage having M×N+1 voltage levels, where N is at least four.

In some embodiments, the at least one N-fold voltage level multiplier module comprise m series-connected N-fold voltage level multiplier modules generating a converter output voltage of $M \times N^m + \Sigma_{k=0}^{m-1} N^k$ voltage levels, where k is an index of each of the series-connected N-fold voltage level multiplier modules, k ranging from 1 to m.

In some embodiments, the multilevel inverter comprises a first power source operating at a DC voltage level E and where the plurality of circuit elements comprise an additional power source operating at a voltage level of $E/(N^{(k-1)} \times (M-1))$ for each $k^{th}$ series-connected N-fold voltage level multiplier module.

In some embodiments, the plurality of circuit elements comprise two low frequency switches operating at the $E/(N^{(k-1)} \times (M-1))$ voltage level, for each kth series-connected N-fold voltage level multiplier module.

In some embodiments, the plurality of circuit elements comprise 2×n high frequency switches and n−1 capacitors each having a capacitor voltage of $((n-b) \times E)/(N^{(k-1)} \times (M-1))$ where b is an index of each of the n−1 capacitors, b ranging from 1 to n−1, the high frequency switches operating at a voltage of $E/(n \times N^{(k-1)} \times (M-1))$, for each kth series-connected N-fold voltage level multiplier module.

In some embodiments, the power converter circuit further comprises a switching pattern generator connected to the at least one voltage level multiplier module, the plurality of circuit elements comprise a plurality of switching elements, the switching pattern generator configured to provide a plurality of switching signals each for controlling a given one of the plurality of switching elements based on comparing a voltage level multiplier module (VLMM) reference signal to n phase-shifted triangular carrier signals.

In some embodiments, the plurality of switching signals provide sensor-less voltage balancing to n−1 capacitors.

In some embodiments, the power converter circuit further comprises a switching pattern generator connected to the at least one voltage level multiplier module, the plurality of circuit elements comprise a plurality of switching elements, the switching pattern generator configured to provide a plurality of switching signals each for controlling a given one of the plurality of switching elements based on phase disposition pulse width modulation.

In some embodiments, the switching pattern generator is configured to generate the plurality of switching signals based on comparing a voltage level multiplier module (VLMM) reference signal to four level-shifted triangular carrier signals, when N=4.

In some embodiments, two of the four level-shifted triangular carrier signals are phase-shifted.

In some embodiments, the power converter circuit further comprises a reference signal generator for generating a multilevel inverter (MLI) reference signal, the MLI reference signal being generated according to a modulation of an input reference signal.

In some embodiments, the reference signal generator is further adapted to generate a voltage level multiplier module (VLMM) reference signal, the VLMM reference signal being generated according to the input reference signal to which the MLI reference signal is subtracted.

In some embodiments, the power converter circuit further comprises a MLI switching pattern generator connected to the multilevel inverter, the switching pattern generator configured to provide a plurality of switching signals for controlling switches of the multilevel inverter according to a pulse width modulation of the MLI reference signal.

In some embodiments, the multilevel inverter is configured to provide three output voltages, each of the three output voltages being phase shifted by $2\pi/3$ and having the M voltage levels, three of the at least one voltage level multiplier module being connected to receive a respective one of the three output voltages and being configured to each generate the second output voltage at a corresponding phase.

In some embodiments, the power converter circuit further comprises an output filter connected to an output of the voltage level multiplier module, the output filter comprising an inductor and a capacitor, wherein the inductor has an inductance value of $$L = \frac{V_{DC}}{8 \times (n-1) \times \Delta I_L \times f_{1stSWHarmonic}}$$

and the capacitor has a capacitance value of $$C = \frac{4}{(2\pi \times f_{1stSWHarmonic})^2 \times L},$$

where n is the number of output voltage levels, $\Delta I_L$ is the desired output current ripple, $f_{1st\ SW\ Harmonic}$ is the first switching harmonic cluster frequency and $V_{DC}$ is the DC-link voltage.

In some embodiments, the multilevel inverter is selected from the group consisting of a neutral point clamped converter, a cascaded H-bridge converter, a flying capacitor multi-cell converter, a stacked multi-cell converter, an active neutral point clamped converter and a packed U-cell converter.

In some embodiments, the at least one voltage level multiplier module comprises a plurality of circuit elements configured as a converter selected from the group consisting of a neutral point clamped converter, a cascaded H-bridge converter, a flying capacitor multi-cell converter, a stacked multi-cell converter, an active neutral point clamped converter, a voltage level multiplier module and a packed U-cell converter.

In accordance with one aspect, there is provided a voltage level multiplier module. The voltage level multiplier module comprises an input for connecting to a multilevel inverter and for receiving therefrom a first output voltage having M voltage levels, an output, and a plurality of circuit elements connected between the input and the output, the plurality of circuit elements configured to provide at least five voltage levels and configured for providing a second output voltage having M×N+1 voltage levels, where N is at least four.

In some embodiments, the voltage level multiplier module is connectable in series and is adapted to generate a converter output voltage of $M \times N^m + \Sigma_{k=0}^{m-1} N^k$ voltage levels, where k is an index of each of the series-connected voltage level multiplier modules ranging from 1 to m and m is the number of series-connected voltage level multiplier modules.

In some embodiments, the multilevel inverter comprises a first power source operating at a DC voltage level E and wherein the plurality of circuit elements comprise an additional power source operating at a voltage level of $E/(N^{(k-1)} \times (M-1))$ for each kth series-connected voltage level multiplier module.

In some embodiments, the plurality of circuit elements comprise two low frequency switches operating at the $E/(N^{(k-1)} \times (M-1))$ voltage level, for each kth series-connected voltage level multiplier module.

In some embodiments, the plurality of circuit elements comprise 2×n high frequency switches and n−1 capacitors each having a capacitor voltage of $((n-b) \times E)/(n \times N^{(k-1)} \times (M-1))$ where b is an index of each of the n−1 capacitors ranging from 1 to n−1, the high frequency switches operating at a voltage of $E/(n \times N^{(k-1)} \times (M-1))$, for each kth series-connected voltage level multiplier module.

In some embodiments, the two low frequency switches and the 2×n high frequency switches are controlled to provide sensor-less voltage balancing to n−1 capacitors.

In some embodiments, the multilevel inverter is selected from the group consisting of a neutral point clamped converter, a cascaded H-bridge converter, a flying capacitor multi-cell converter, a stacked multi-cell converter, an active neutral point clamped converter, a voltage level multiplier module, and a packed U-cell converter.

In some embodiments, the voltage level multiplier module comprises a plurality of circuit elements configured as a converter selected from the group consisting of a neutral point clamped converter, a cascaded H-bridge converter, a flying capacitor multi-cell converter, a stacked multi-cell converter, an active neutral point clamped converter, a voltage level multiplier module and a packed U-cell converter.

In some embodiments, a switching pattern generator is connected to the voltage level multiplier module, the plurality of circuit elements comprise a plurality of switching elements, the switching pattern generator configured to provide a plurality of switching signals each for controlling a given one of the plurality of switching elements based on phase disposition pulse width modulation.

In some embodiments, the switching pattern generator is configured to generate the plurality of switching signals based on comparing a reference voltage signal to a group of triangular carrier signals.

In some embodiments, the plurality of circuit elements comprise 2×n high frequency switches and n−1 capacitors and wherein the group of triangular carrier signals are n phase-shifted triangular carrier signals that are shifted by $2 \times \pi/n$.

In some embodiments, the plurality of switching signals provide sensor-less voltage balancing to the n−1 capacitors.

In accordance with one aspect, there is provided a method for controlling a plurality of switching elements of a voltage level multiplier module configured to provide at least five voltage levels. The method comprises generating a first reference signal having staircase voltage levels based on level detection of a sinusoidal input reference signal, generating a second reference signal by subtracting the first reference signal from the sinusoidal input reference signal, comparing the second reference signal to a plurality of triangular carrier signals to generate comparison results, processing the comparison results to generate a plurality of switching signals, and providing the plurality of switching signals to the voltage level multiplier module, each of the plurality of switching signals for controlling a given one of the plurality of switching elements.

In some embodiments, the plurality of triangular carrier signals are phase-shifted triangular carrier signals.

In some embodiments, the plurality of triangular carrier signals are level-shifted triangular carrier signals.

In some embodiments, the plurality of triangular carrier signals are n triangular carrier signals that are shifted by $2\pi/n$, where the plurality of circuit elements comprise $2 \times n$ high frequency switches and $n-1$ capacitors.

In some embodiments, the method further comprises comparing the second reference signal to a zero value by applying a zero-crossing comparator to generate comparison results for two low-frequency switching elements of the plurality of circuit elements.

In some embodiments, the second reference signal is a modified reference signal generated from the second reference signal.

In some embodiments, the method further comprises sensor-less balancing a voltage of $n-1$ capacitors according to the switching signals, where the plurality of circuit elements comprise a number of $n-1$ capacitors.

DESCRIPTION OF THE DRAWINGS

Reference is now made to the accompanying figures in which:

FIG. 4B is a table presenting the switching states provided by the first switching pattern generator of FIG. 4A, in accordance with an embodiment;

FIG. 29 is a table presenting a component comparison between the three phase converter of FIG. 27 with various traditional topologies, according to one embodiment;

It will be noted that throughout the appended drawings, like features are identified by like reference numerals.

DETAILED DESCRIPTION

Voltage level multiplier modules (VLMMs) for use with multilevel inverters (MLIs) and power converter circuits comprising at least one voltage level multiplier module (VLMM) and a multilevel inverter (MLI) are described herein. Switching pattern generators for use with the VLMM are also described herein. A VLMM is described herein for use with any suitable MLI, such that the VLMM increases the number of voltage levels of the output voltage of the MLI.

Figure 1:
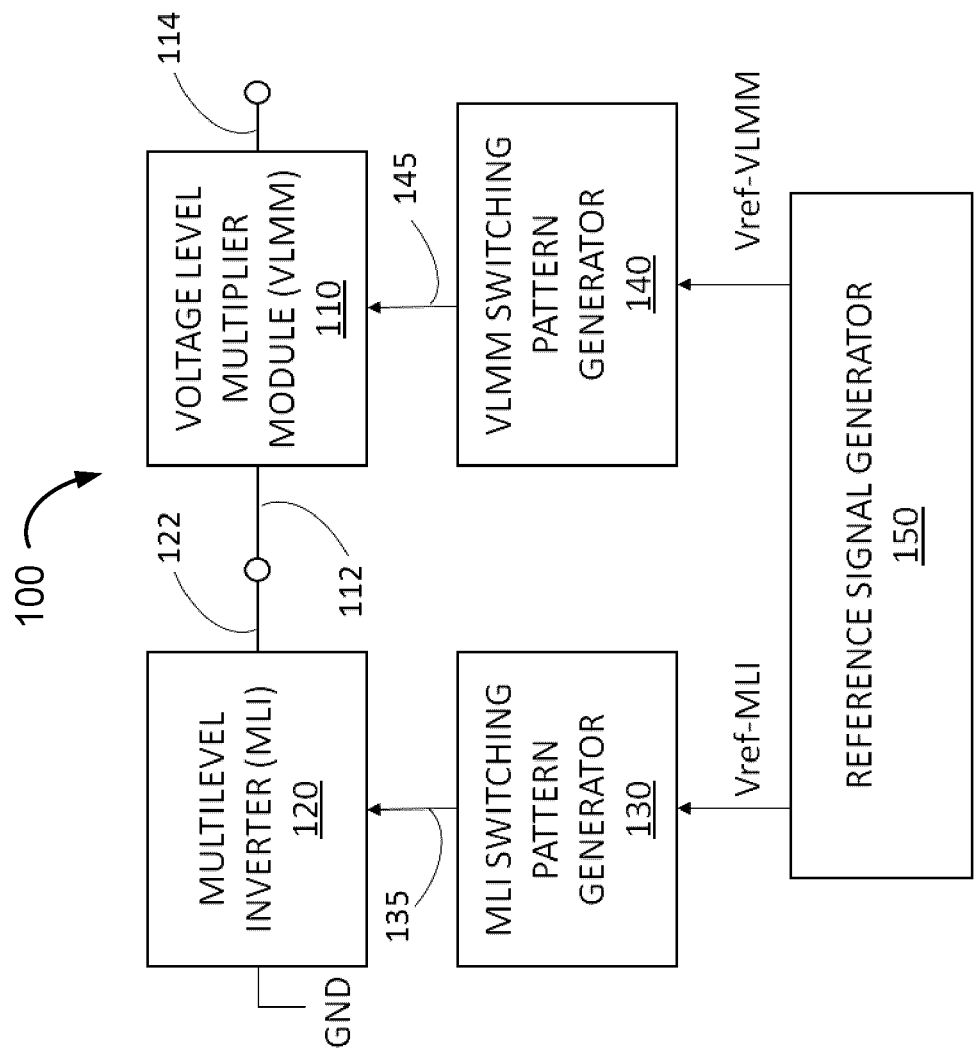
FIG. 1 is a schematic block diagram of an example power converter circuit comprising a voltage level multiplier module (VLMM) for use with a multilevel inverter (MLI) and being controlled by a VLMM switching pattern generator and a MLI switching pattern generator respectively, in accordance with an embodiment.

With reference to FIG. 1, an example power converter circuit 100 comprising a VLMM 110 for increasing the number of voltage levels of an output voltage of an MLI 120 is shown. In accordance with an embodiment, the power converter circuit 100 comprises the MLI 120. The MLI 120 has an output 122 for providing an alternating current (AC) output voltage having a number of voltage levels. The MLI 120 may be implemented according to any suitable configuration, including, but not limited to, a neutral point clamped (NPC) converter, a cascaded H-bridge (CHB) converter, a flying capacitor multi-cell (FCM) converter, a stacked multi-cell (SM) converter, an active neutral point clamped (ANPC) converter, and a packed U-cell (PUC) converter. In accordance with a specific and non-limiting example of implementation, the MLI 120 is a five-level MLI generating five output voltage levels. The number of output voltage levels may vary depending on practical implementation.

The VLMM 110 has an input 112 and an output 114. To differentiate the output 122 of the MLI 120 from the output 114 of the VLMM 110, the output 122 of the MLI 120 may be referred to as an "MLI output" and the output 114 of the VLMM 110 may be referred to as a "VLMM output". The input 112 of the VLMM 110 may be referred to as a "VLMM input". In accordance with an embodiment, the MLI output 122 is electrically connected to the VLMM input 112. The VLMM 110 is configured such that the VLMM output 114 provides an AC voltage having an increased number of voltage levels compared to the number of voltage levels of the AC voltage at the VLMM input 112 (and MLI output 122). In other words, the VLMM 110 is configured to receive a first output voltage having a first number of voltage levels from the MLI 120 and to generate a second output voltage having a second number of voltage levels. In accordance with an embodiment, the second number of voltage levels are at least a quadruple of the first number of voltage levels. The VLMM 110 is configured to generate minor voltage levels between main voltage levels of the MLI 120. For example, in the case of a five-level MLI 120, the VLMM 110 may be configured to generate minor voltage levels between the five levels of the voltage levels of the MLI output 122 for a total of twenty-one (21) levels. The number of voltage levels at the VLMM output 114 may vary depending on practical implementation. The VLMM output 114 provides the output of the power converter circuit 100.

In accordance with an embodiment, the power converter circuit 100 comprises an MLI switching pattern generator 130 for controlling the MLI 120. The MLI switching pattern generator 130 outputs an MLI switching pattern via an output 135 connected to switches (not shown) of the MLI 120. In accordance with an embodiment, the power converter circuit 100 comprises a VLMM switching pattern generator 140 for controlling the VLMM 110. The VLMM switching pattern generator 140 outputs a VLMM switching pattern via an output 145 connected to switches (not shown) of the VLMM 110. According to one embodiment, the MLI switching pattern generator 130 and the VLMM switching pattern generator 140 receive a respective reference signal $V_{ref-MLI}$ 152 and reference signal $V_{ref-VLMM}$ 154 generated by a reference signal generator 150. The MLI switching pattern is thereby generated according to the $V_{ref-MLI}$ 152 and the VLMM switching pattern is thereby generated according to the $V_{ref-VLMM}$ 154. The MLI switching pattern generator 130 and VLMM switching pattern generator 140 and reference signal generator 150 are described in further detail elsewhere in this document.

Figure 2:
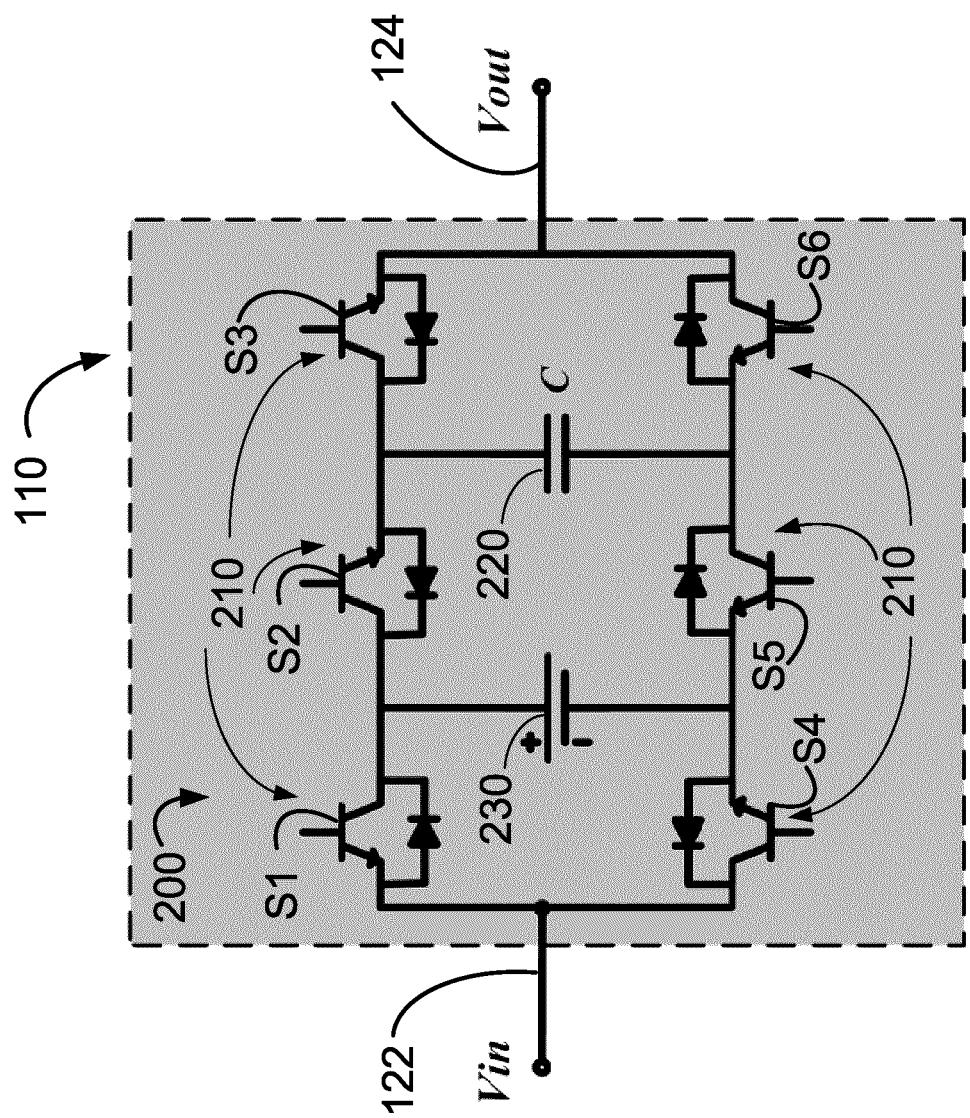
FIG. 2 is a circuit diagram of an example voltage level multiplier module, in accordance with an embodiment.

With reference to FIG. 2, the VLMM 110 is shown in accordance with an embodiment. The VLMM 110 comprises a plurality of circuit elements 200 connected between the VLMM input 122 and the VLMM output 124. The plurality of circuit elements 200 comprises a plurality of switches 210, a capacitor 220 and a DC source 230. The plurality of switches 210 may be referred to as a plurality of switching elements. In the illustrated embodiment, the plurality of switches 210 comprises six power switches S1, S2, S3, S4, S5 and S6. The switches S1, S2, S3, S4, S5 and S6 may be metal-oxide-semiconductor field-effect transistors (MOSFETs), gate turn-off thyristors (GTOs), insulated-gate bipolar transistors (IGBTs) or any other suitable type of switches. In accordance with an embodiment, four of the six switches S2, S3, S5 and S6 are high-frequency switches and two of the six switches S1 and S4 are low-frequency switches. The switches S1, S2, S3, S4, S5 and S6 are complementary in operation and may be considered as complimentary pairs {S1, S4}, {S2, S5} and {S3, S6}. The DC source 230 provides a DC voltage. The DC source 230 may be a DC link capacitor adapted for connection to a separate independent DC source (e.g., a standard AC/DC converter, a solar photovoltaic module or the like). The DC source 230 may be an isolated DC source. The DC voltage of the DC source 230 may be referred to as a DC-link voltage. The capacitor 220 may be any suitable DC capacitor. In accordance with an embodiment, the capacitor voltage is regulated to half of the voltage level of the DC source 230 by the VLMM switching pattern generator 140. For example, the VLMM switching pattern generator 140 may apply self-voltage-balancing multicarrier pulse width modulation (PWM) to the plurality of switches 210 according to the $V_{ref-VLMM}$ 154.

Figure 3:
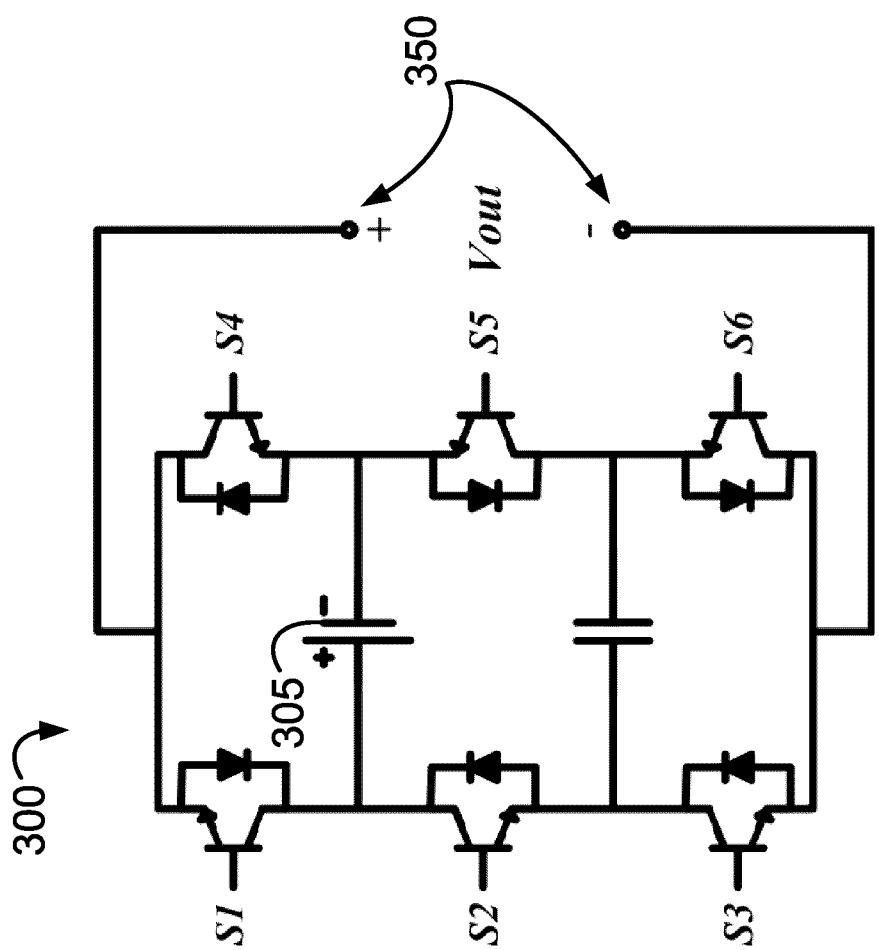
FIG. 3 is a circuit diagram of an example packed u-cell converter.

The VLMM 110 illustrated in FIG. 2 is based on a sensor-less five-level packed U-cell (PUC5) converter. In accordance with an embodiment, the plurality of circuit elements 200 (e.g., the plurality of the switches 210, the capacitor 220 and the DC source 230) are configured (e.g. arranged and interconnected) according to a packed U-cell or PUC5 converter configuration. While the VLMM 110 is configured according to the packed U-cell converter configuration, the VLMM 110 is configured to operate differently than a conventional packed U-cell MLI. With additional reference to FIG. 3, an example of a packed U-cell converter 300 is shown. The packed U-cell MLI 300 is a power converter for transforming DC power to AC power with variable voltage magnitude and variable frequency output. In particular, the packed U-cell MLI 300 converts a DC source 305 to a positive and a negative AC output voltage that is outputted on a pair of AC outputs 350. The packed U-cell MLI 300 does not increase a number of voltage levels of a non-existent input AC voltage. In addition, the packed U-cell MLI 300 is switched according to a conventional switching pattern and can not be switched according to the switching patterns provided by the VLMM switching pattern generator 140. In fact, the control and modulation methods to control the switches (S1 to S6) 210, as well as input reference signal $V_{ref-VLMM}$ 154, of the VLMM switching pattern generator 140 associated to the VLMM 110 are different from the packed U-cell switching pattern generator associated to the conventional packed U-cell MLI 300. As should become more readily apparent in this document, a modulation method controls the VLMM 110 in order to generate desired minor voltage levels between major voltage levels of a main MLI 120 connected to the VLMM 110. In order to generate such minor voltage levels, the input reference signal of the VLMM switching pattern generator 140 associated to the VLMM 110 is a complex reference signal (e.g., such as reference signal presented in FIG. 5B).

Figure 4A:
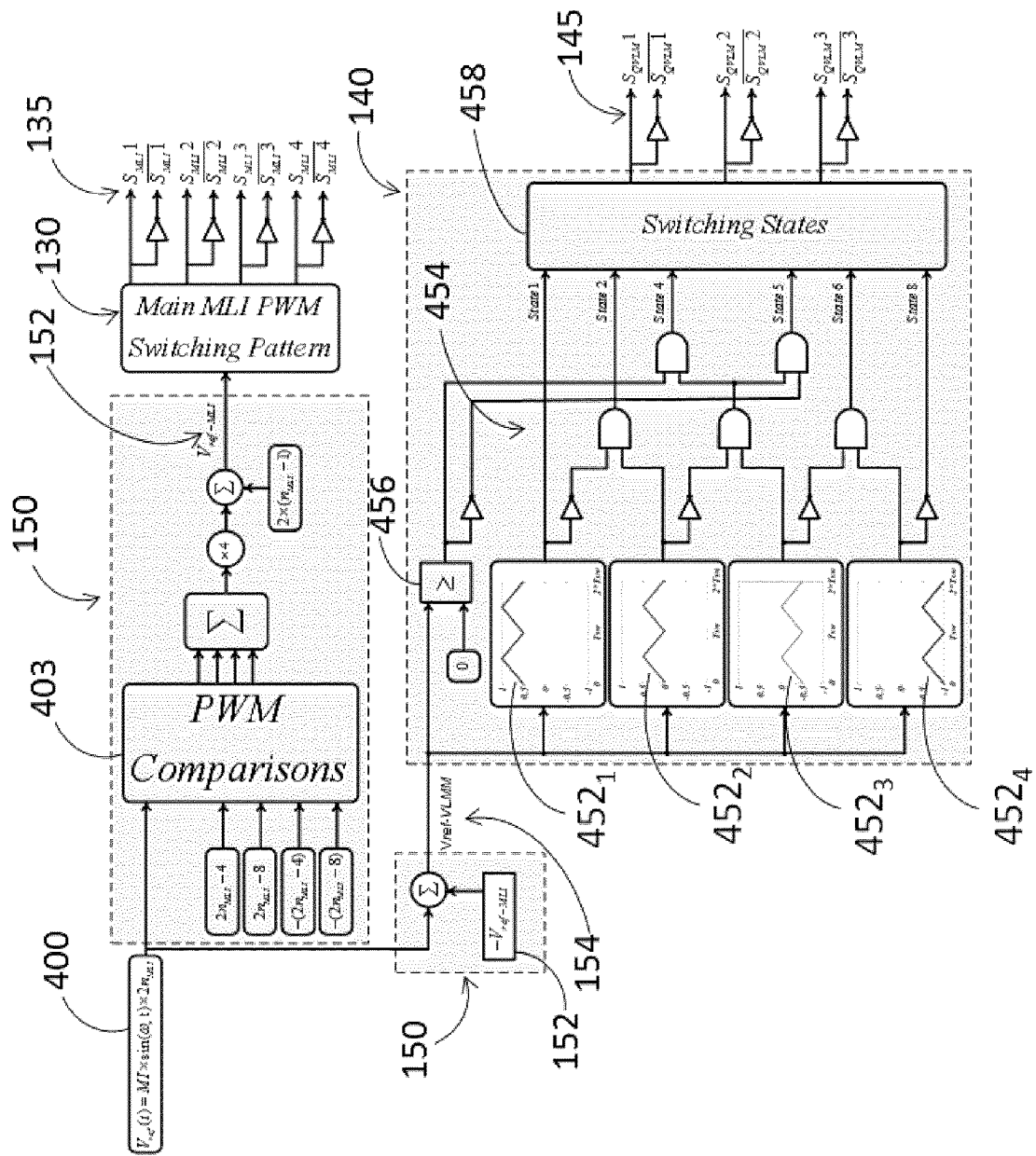
FIG. 4A is a block diagram of a first switching pattern generator for use with the voltage level multiplier module of FIG. 2, in accordance with an embodiment.

With reference to FIG. 4A, the MLI switching pattern generator 130, the VLMM switching pattern generator 140 and the reference signal generator 150 are shown in accordance with an embodiment. In general, the MLI switching pattern generator 130 is configured to provide a plurality of switching signals each for controlling a given one of a plurality of switches of the MLI 120. The MLI switching pattern generator 130 generates the MLI switching pattern at the output 135 from the reference signal $V_{ref-MLI}$ 152. The reference signal generator 150 generates the $V_{ref-MLI}$ 152 according to an input reference signal 400 that is a sinusoidal voltage signal that may be represented as: $V_{ref}(t)=MI \times \sin(\omega_r t) \times 2n_{MLI}$, where t corresponds to time, MI corresponds to a modulation index, $\omega_r$ corresponds to the angular frequency of the input signal and $n_{MLI}$ corresponds to the number of output voltage levels for the MLI 120. The reference signal generator 150 comprises a waveform generator that generates the MLI reference signal $V_{ref-MLI}$ 152 having staircase voltage levels. A PWM comparison module 403 may compare the input reference signal 400 to a plurality of reference levels to generate a plurality of pulses. The number of reference levels may vary depending on practical implementation. For example, a level detector may be used to compare the voltage levels of the input reference signal $V_{ref}$ 400 to generate the plurality of pulses. In the illustrated embodiment, four reference levels $2n_{MLI}-4$, $2n_{MLI}-8$, $-(2n_{MLI}-4)$, $-(2n_{MLI}-8)$ are used for the comparison. The reference levels are constant numbers. The number of reference levels may vary depending on practical implementation. The MLI reference signal $V_{ref-MLI}$ 152 may be generated by combining the plurality of pulses (e.g., summation), scaling (e.g., multiplied by four or any other suitable number) and adding an offset (e.g., $2 \times (n_{MLI}-1)$ or any other suitable value. In other words, the PWM comparison module 403 produces four outputs which are added together, multiplied by four (4) and then is added to a offset of $2 \times (n_{MLI}-1)$ to produce the MLI reference signal $V_{ref-MLI}$ 152.

Figure 5A:
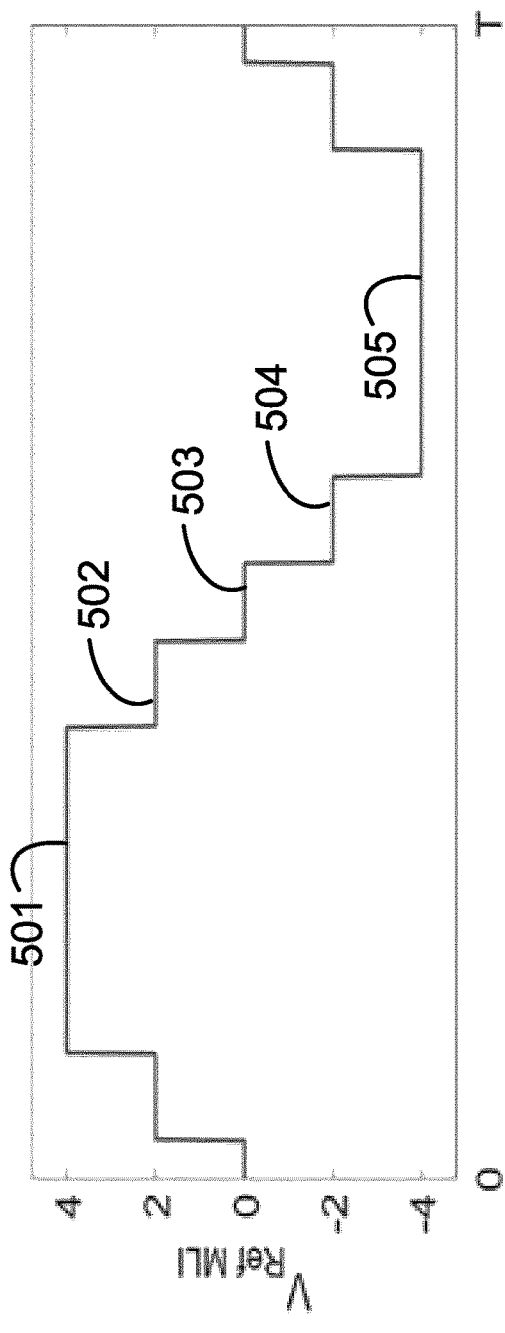
FIG. 5A is an example of a first reference signal for use by a switching pattern generator for a multilevel inverter.
Figure 5B:
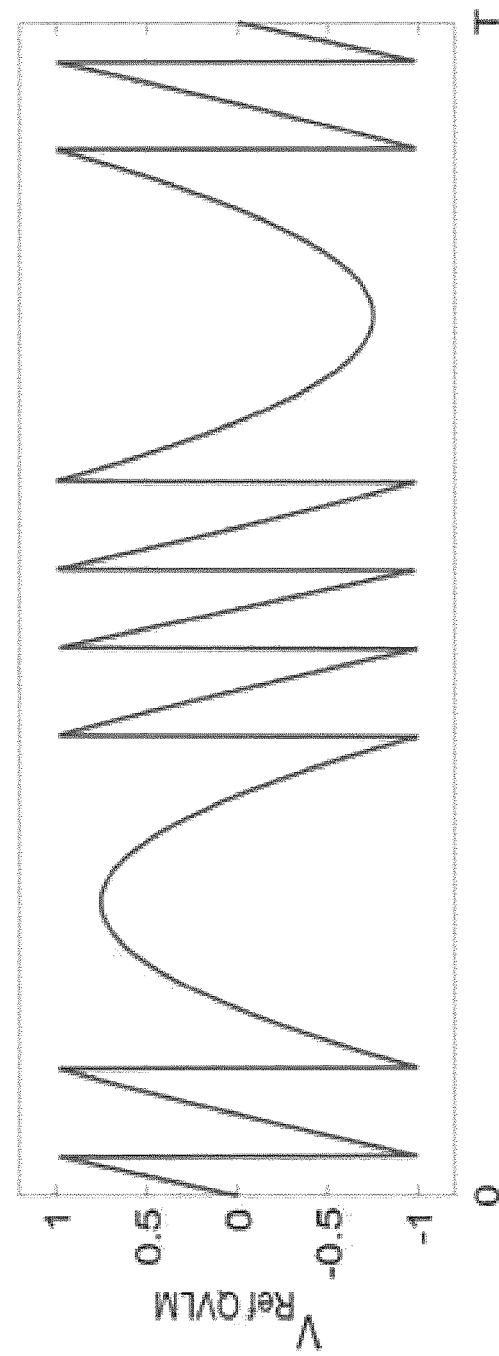
FIG. 5B is an example of a second reference signal for use by a switching pattern generator for a voltage level multiplier module.
Figure 5C:
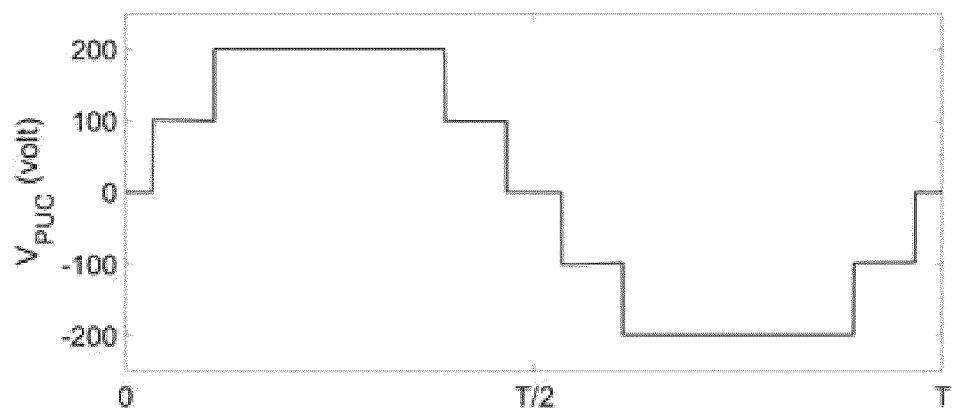
FIG. 5C is an example of an output voltage of the multilevel inverter with respect to a ground, in accordance with an embodiment.
Figure 5D:
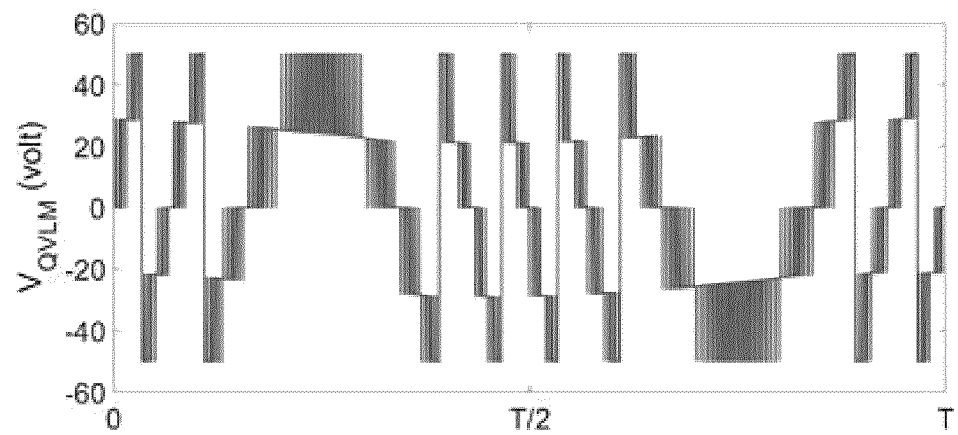
FIG. 5D is an example of a voltage between an input and output of the voltage level multiplier module, in accordance with an embodiment.
Figure 5E:
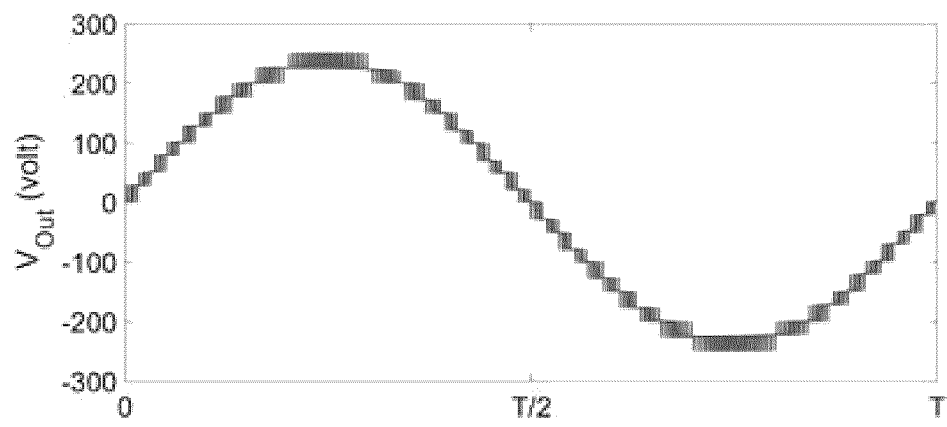
FIG. 5E is an example of an output voltage of the converter of FIG. 1 with respect to a ground, in accordance with an embodiment.

With additional reference to FIG. 5A, an example of the MLI reference signal $V_{ref-MLI}$ 152 is shown with five stepped voltage levels 501, 502, 503, 504, 505. In this example, the five stepped voltage levels 501, 502, 503, 504, 505 corresponds to 4, 2, 0, −2 and −4, respectively. Accordingly, FIG. 5A illustrates a five level low-frequency staircase reference signal. Presented in FIG. 5C, is the corresponding output voltage of the MLI 120 between the output 122 and ground (GND). The number of voltage levels and the values of the voltage levels of the MLI reference signal $V_{ref-MLI}$ may vary depending on practical implementations. Moreover, an example of the VLMM reference signal $V_{ref\text{-}VLMM}$ 154 is shown in FIG. 5B. In this example, VLMM reference signal $V_{ref\text{-}VLMM}$ 154 is defined by a subtraction of the MLI reference signal $V_{ref\text{-}MLI}$ 152 from the input reference signal $V_{ref}$ 400 to generate the VLMM reference signal $V_{ref\text{-}VLMM}$ 154 having a peak to peak values of −1 to 1. Hence as presented in FIG. 5D, the corresponding voltage between the VLMM output 114 and VLMM input 112 is a five level PWM voltage. The waveform and the values of the voltage levels of the VLMM reference signal $V_{ref\text{-}VLMM}$ 154 may vary depending on practical implementations. Accordingly, by applying the VLMM 110 to the MLI 120, an achieved 21-level hybrid Q-MLI converter output voltage corresponds to normalised voltage level numbers 5, 4.5, 4, 3.5, 3, 2.5, 2, 1.5, 1, 0.5, 0, −0.5, −1, −1.5, −2, −2.5, −3, −3.5, −4, −4.5, −5, respectively, as presented in FIG. 5E. Therefore, 21-level output voltage levels are obtained. The number of output voltage levels and the values of the voltage levels of the MLI reference signal $V_{ref\text{-}MLI}$ 152 and the VLMM reference signal $V_{ref\text{-}VLMM}$ 154 may vary depending on the number of applied VLMMs and practical implementations.

Referring back to FIG. 4A, in accordance with an embodiment, the switching pattern generator module 130 generates the MLI switching pattern from the MLI reference signal $V_{ref\text{-}MLI}$ 152. For example, the switching pattern generator module 130 may comprise a look-up table from which the MLI switching pattern is selected based on the levels of the MLI reference signal $V_{ref\text{-}MLI}$ 152.

The MLI switching pattern generator 130 produces switching patterns according to the type of the MLI 120, for example, such as NPC, CHB, FC, SM, ANPC, PUC, etc. Hence, the switching pattern generator module 130 is adapted to produce numerous switching techniques such as phase disposition PWM (PDPWM), phase opposition disposition PWM (PODPWM), alternate phase opposition disposition PWM (APODPWM), phase shifted PWM (PSPWM), resampled phase shifted PWM (RPSPWM), etc. depending on the type of the MLI 120 and its utilized switching technique. The MLI switching pattern comprises a plurality of switching signals for actuating the switches of the MLI 120. In some embodiments, the MLI 120 comprises eight switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$, with switching pairs labelled as $\{S_{MLI}1, S_{MLI}1'\}$, $\{S_{MLI}2, S_{MLI}2'\}$, $\{S_{MLI}3, S_{MLI}3'\}$ and $\{S_{MLI}4, S_{MLI}4'\}$. The MLI switching pattern comprises eight switching signals each for actuating one of the switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$. The number of switching signals may vary depending on practical applications, the number of switches that the MLI 120 comprises and the specific configuration of the MLI 120. The MLI switching pattern generator 130 may be implemented in any suitable manner.

As further presented in FIG. 4A, the VLMM switching pattern generator 140 is configured to provide a plurality of switching signals each for controlling a given one of the plurality of switching elements 210 of the VLMM 110. The VLMM switching pattern generator 140 is configured for providing switching signals to control the switches S1, S2, S3, S4, S5 and S6 based on phase disposition pulse width modulation (PDPWM). The VLMM switching pattern generator 140 receives from the reference signal generator 150 the VLMM reference signal $V_{ref\text{-}VLMM}$ 154. The reference signal generator 150 subtracts the MLI reference signal $V_{ref\text{-}MLI}$ from the input reference signal $V_{ref}$ to generate the VLMM reference signal 154: $V_{ref\text{-}VLMM} = V_{ref} - V_{ref\text{-}MLI}$. The VLMM switching pattern generator 140 generates the VLMM switching pattern at the output 145 from the VLMM reference signal $V_{ref\text{-}VLMM}$ 154. With additional reference to FIG. 5B, an example of the VLMM reference signal $V_{ref\text{-}VLMM}$ 154 is shown.

Referring back to FIG. 4A, in accordance with an embodiment, the VLMM switching pattern generator 140 comprises circuitry for comparing the VLMM reference signal $V_{ref\text{-}VLMM}$ 154 to a plurality of level-shifted triangular carrier signals to detect the level of the VLMM reference signal $V_{ref\text{-}VLMM}$ 154. Based on the level detection, the circuitry generates an output (referred to herein as a comparison output) indicative of the level of the VLMM reference signal $V_{ref\text{-}VLMM}$ 154. The circuitry may include one or more comparators $452_1$, $452_2$, $452_3$ and $452_4$, and/or any other suitable circuitry. In the example illustrated, four level-shifted triangular carrier signals are used for the comparison by respective ones of the comparators $452_1$, $452_2$, $452_3$ and $452_4$. The number of level-shifted carrier signals may vary depending on practical implementations. A level-shifted triangle carrier signal may be represented by:

$$x(t) = \frac{1}{2a}\left(t - a\left\lfloor\frac{t}{a} + \frac{1}{2}\right\rfloor(-1)^{\lfloor\frac{t}{a}+\frac{1}{2}\rfloor}\right) + b, \text{ where } a = \frac{T_{sw}}{2},$$

$T_{sw}$ is the period which corresponds to $$T_{sw} = \frac{1}{f_{sw}},$$

$f_{sw}$ is the switching frequency, and b is the offset. In the example illustrated, a first level-shifted triangular carrier signals of a first comparator $452_1$ has a range of 0.5 to 1 over the period $T_{sw}$ and an offset of 0.75; a second level-shifted triangular carrier signals of a second comparator $452_2$ has a range of 0 to 0.5 over the period $T_{sw}$ and an offset of 0.25; a third level-shifted triangular carrier signals of a third comparator $452_3$ has a range of −0.5 to 0 over the period $T_{sw}$ and an offset of −0.25; and a fourth level-shifted triangular carrier signals of a fourth comparator $452_4$ has a range of −1 to −0.5 over the period $T_{sw}$ and an offset of −0.75. The configuration of the level-shifted triangular carrier signal (e.g. values of the signal at any given time) may vary depending on practical implementations.

In accordance with an embodiment, the VLMM switching pattern generator 140 comprises circuitry for selecting one of a plurality switching states from a switching states table 458 based on the comparison output. The circuitry may comprise logic gates 454 and/or any other suitable circuitry. In the example illustrated, each one of the comparators $452_1$, $452_2$, $452_3$ and $452_4$ outputs, as a function of time, a logical one (1) when the VLMM reference signal $V_{ref\text{-}VLMM}$ exceeds or is equal to the triangular carrier signal or a logical zero (0) when the VLMM reference signal $V_{ref\text{-}VLMM}$ 154 is less than the triangular carrier signal. The logic gates 454 connected to the comparators $452_1$, $452_2$, $452_3$ and $452_4$ and a positive/negative level detector 456 may be used to select a state from the state table 458. The positive/negative level detector 456 outputs a one (1) when the VLMM reference signal $V_{ref\text{-}VLMM}$ 154 is positive or equal to zero and a zero (0) when the VLMM reference signal $V_{ref\text{-}VLMM}$ 154 is negative. As illustrated, the logic gates 454 and the positive/negative level detector 456 are configured to generate state signals State 1, State 2, State 4, State 5, State 6 and State 8 from the comparison output and from the VLMM reference signal $V_{ref\text{-}VLMM}$. In this example, States 3 and States 7 are not considered because of redundancy with State 2 and State 6, respectively, as is indicated in the switching table 460 of FIG. 4B (described elsewhere in this document).

The state signals State 1, State 2, State 4, State 5, State 6 and State 8 indicate whether the VLMM reference signal $V_{ref\text{-}VLMM}$ 154 is positive or negative and the level of the VLMM reference signal $V_{ref\text{-}VLMM}$ 154 in comparison to each of the triangular carrier signals. State 1 is a one (1) when the VLMM reference signal $V_{ref\text{-}VLMM}$ 154 exceeds the triangular carrier signal of the first comparator $452_1$; otherwise it is a zero (0). State 2 is a one (1) when the VLMM reference signal $V_{ref\text{-}VLMM}$ 154 exceeds the triangular carrier signal of the second comparator $452_2$ and does not exceed the triangular carrier signal of the first comparator $452_1$; otherwise it is a zero (0). State 4 is a one (1) when the VLMM reference signal $V_{ref\text{-}VLMM}$ 154 exceeds the triangular carrier signal of the third comparator $452_3$, does not exceed the triangular carrier signal of the second comparator $452_2$ and is positive; otherwise it is a zero (0). State 5 is a one (1) when the VLMM reference signal $V_{ref\text{-}VLMM}$ 154 exceeds the triangular carrier signal of the third comparator $452_3$, does not exceed the triangular carrier signal of the second comparator $452_2$ and is negative; otherwise it is a zero (0). State 6 is a one (1) when, the VLMM reference signal $V_{ref\text{-}VLMM}$ 154 exceeds the triangular carrier signal of the fourth comparator $452_4$ and does not exceed the triangular carrier signal of the third comparator $452_3$; otherwise it is a zero (0). State 8 is a one (1) when, the VLMM reference signal $V_{ref\text{-}VLMM}$ 154 is below the triangular carrier signal of the fourth comparator $452_4$; otherwise it is a zero (0).

The state signals State 1, State 2, State 4, State 5, State 6 and State 8 are used to select switching states from the switching states module 458 for generating the VLMM switching pattern. The switching states module 458 may be implemented in any suitable hardware or circuitry. The switching states module 458 may be implemented with a lookup table, such as the switching table 460 of FIG. 4B. The switching table 460 has one switching state for each voltage state (State 1 to 8). The switching signals of {S1, S4}, {S2, S5}, {S3, S6} are associated to each voltage state (State 1, State 2, State 4, State 5, State 6, or State 8). The State 3, and State 7 are not considered because of redundancy. The VLMM switching pattern comprises a plurality of switching signals for switches 210 of the VLMM 110. In the illustrated embodiment, the VLMM switching pattern comprises six switching signals for the switches S1, S2, S3, S4, S5 and S6 of the VLMM 110.

Accordingly, in the embodiment illustrated in FIG. 4A, the reference signal generator is adapted to decompose the input reference signal $V_{ref}$ 400 to produce the MLI reference signal $V_{ref\text{-}MLI}$ 152 and the VLMM reference signal $V_{ref\text{-}VLMM}$ 154. In particular, the input reference signal $V_{ref}$ 400 is decomposed such as to generate major voltage levels for the MLI 120 and minor voltage levels for the VLMM 110. For example, MLI reference signal $V_{ref\text{-}MLI}$ 152 is used to detect high voltage and low frequency major voltage levels. The VLMM reference signal $V_{ref\text{-}VLMM}$ is used to detect the minor voltage levels between the major voltage levels. Accordingly, the MLI reference signal $V_{ref\text{-}MLI}$ and the VLMM reference signal $V_{ref\text{-}VLMM}$ are used to provide the MLI switching pattern signals and the VLMM switching pattern signals, respectively. The result is the generation of high-frequency and low-voltage signals at the VLMM output (reference 114 in FIG. 1) of the VLMM 110. The MLI switching pattern and the VLMM switching pattern described in relation to FIG. 4A for modulating the switches of the MLI 120 and the VLMM 110 may be referred to as a first modulation method.

Figure 6:
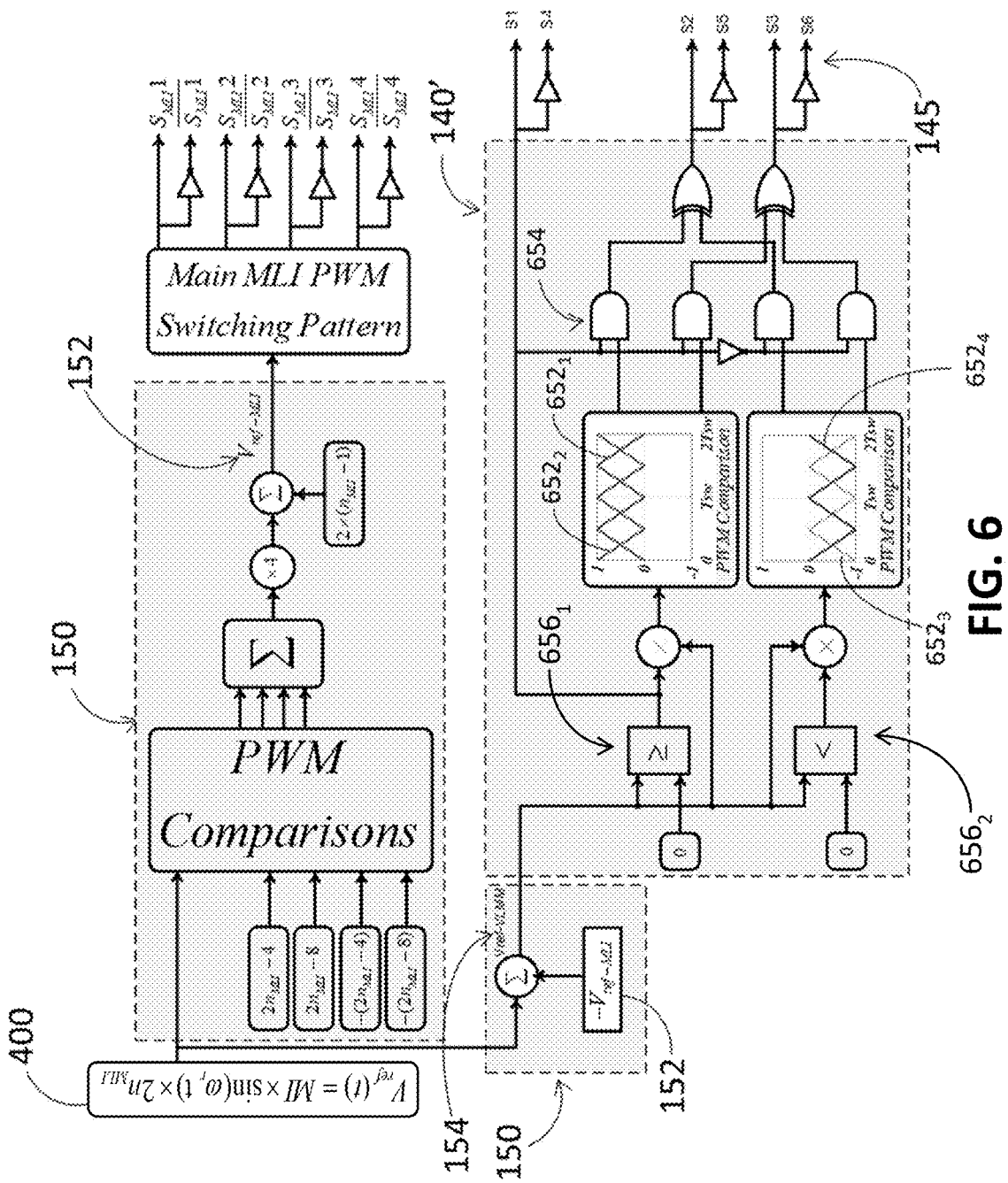
FIG. 6 is a block diagram of a second switching pattern generator for use with the voltage level multiplier module of FIG. 2, in accordance with an embodiment.

With reference to FIG. 6, the MLI switching pattern generator 130, a second proposed VLMM switching pattern generator 140' and the reference signal generator 150 are shown in accordance with an embodiment. The MLI switching pattern and the VLMM switching pattern described in relation to FIG. 6 for modulating the switches of the MLI 120 and the VLMM 110 may be referred to as a second modulation method. The second proposed VLMM switching pattern generator 140' generates, from the reference signal $V_{ref\text{-}VLMM}$ 154, a switching pattern that is provided at the VLMM output 145. In accordance with an embodiment, the second VLMM switching pattern generator 140' subtracts the MLI reference signal $V_{ref\text{-}MLI}$ 152 from the input reference signal $V_{ref}$ 400 to generate the VLMM reference signal $V_{ref\text{-}VLMM}$ 154. In accordance with an embodiment, the second VLMM switching pattern generator 140' comprises circuitry for generating the VLMM switching pattern. As illustrated, the second VLMM switching pattern generator 140' comprises circuitry for selecting two of four comparators $652_1$, $652_2$, $652_3$ and $652_4$ from the VLMM reference signal $V_{ref\text{-}VLMM}$ 154. A first positive/negative level detector $656_1$ outputs a logical one (1) when the VLMM reference signal $V_{ref\text{-}VLMM}$ 154 is positive or zero; otherwise a logical zero (0) is outputted. A second positive/negative level detector $656_2$ outputs a one (1) when the VLMM reference signal $V_{ref\text{-}VLMM}$ 154 is negative; otherwise a zero (0) is outputted. When the VLMM reference signal $V_{ref\text{-}VLMM}$ 154 is positive or zero, two comparators $652_1$, $652_2$ are used and when the VLMM reference signal $V_{ref\text{-}VLMM}$ 154 is negative two comparators $652_3$, $652_4$ are used. Each of the comparators $652_1$, $652_2$, $652_3$ and $652_4$ compares the VLMM reference signal $V_{ref\text{-}VLMM}$ 154 to one of four phase and level-shifted triangular carrier signals to generate a comparison output. A first phase and level-shifted triangular carrier signal of a first comparator $652_1$ has a range of 0 to 1 over the period $T_{sw}$ and an offset of 0.5 with a phase shift of 0 degree; a second phase and level-shifted triangular carrier signal of a second comparator $652_2$ has a range of 0 to 1 over the period $T_{sw}$ and an offset of 0.5 with a phase shift of 180 degrees; a third phase and level-shifted triangular carrier signal of a third comparator $652_3$ has a range of −1 to 0 over the period $T_{sw}$ and an offset of −0.5 with a phase shift of 0 degree; and a fourth phase and level-shifted triangular carrier signal of a fourth comparator $652_4$ has a range of −1 to 0 over the period $T_{sw}$ and an offset of −0.5 with a phase shift of 180 degrees. In the second modulation method, the DC capacitor 220 in VLMM 110 is charged and discharged in each switching period by the load current according to the switching operation. For the DC capacitor 220, the relation between load current ($i_l$), quantity of charge ($Q_{charge}$) and quantity of discharge ($Q_{discharge}$), and the PWM carrier period ($T_{sw}$) is expressed as:

$$i_l = dq/dt \qquad (1)$$

$$dt = \frac{|T_C - t_{on\text{-}sw3}|}{2} - \frac{|T_C - t_{on\text{-}sw2}|}{2} \qquad (2)$$

$$dq = Q_{discharge} - Q_{charge} \qquad (3)$$

$$= \frac{|T_C - t_{on\text{-}sw3}|}{2} \cdot i_l - \frac{|T_C - t_{on\text{-}sw2}|}{2} \cdot i_l$$

$$dq = \frac{|t_{on\text{-}sw3} - t_{on\text{-}sw2}|}{2} \cdot i_l \qquad (4)$$

where $t_{on\text{-}sw2}$ and $t_{on\text{-}sw3}$ are the S2 and S3 turn-on time. The DC capacitor 220 is balanced when $Q_{discharge}$ and $Q_{charge}$ are equal and then dq=0. Hence, with regards to (4), dq=0 when the turn-on periods of S2 and S3 are equal ($t_{on-sw2}=t_{on-sw3}$) For the VLMM 110, if the input reference voltage frequency variation is negligible in comparison with the carrier frequency ($f_{sw}$), then $t_{on-sw2}=t_{on-sw3}$ by applying the second modulation method with two phase shifted triangle carrier signals shifted by π for each positive and negative half cycle. Thus, the durations of charging and discharging of DC capacitor 220 are equal in each PWM carrier period. Consequently, the quantities of the charge and the discharge in each PWM carrier period are also equal. As a result, in the steady state operation, the DC capacitor 220 voltage will be automatically balanced in each PWM carrier period and sensor-less voltage regulation of the DC capacitor 220 is achieved in the proposed VLMM. Since the DC link voltage is E, then voltage across the DC capacitor 220 is constant and is equal to $$\frac{E}{2}.$$

The circuitry comprises logic gates 654 and/or any other suitable circuitry. The logic gates 654 connected to the comparators 652 and the first positive/negative level detectors $656_1$ may be used to generate the VLMM switching pattern. The switching pattern output 145 comprises a plurality of switching signals for the switches 210 of the VLMM 110. In the illustrated embodiment, the VLMM switching pattern comprises six switching signals for the switches S1, S2, S3, S4, S5 and S6. The MLI switching pattern generator 130 and/or the VLMM switching pattern generator 140' may vary depending on practical implementations. However, according to some embodiments, irrespective of the practical implementations, the reference signal generator 150 remains the same.

In accordance with an embodiment, the second modulation method causes self-balancing of the capacitor voltage. By using the second modulation method a capacitor size of the capacitor 220 may be decreased by a factor of $$R_C = \frac{f_{sw}}{f_1},$$

where $f_1$ is the fundamental frequency. It should be appreciated that reducing the capacitance of the capacitor 220 may lead to increased power density, and reduced cost, size, and/or complexity. By way of example, if the switching frequency $f_{sw}=10$ kHz and the fundamental frequency $f_1=50$ Hz, the capacitor size is reduced by a factor of $$R_C = \frac{f_{sw}}{f_1} = \frac{10 \text{ kHz}}{50 \text{ Hz}} = 200.$$

In accordance with an embodiment, by using the second modulation method, the first switching harmonic cluster may be shifted to $2\times f_{sw}$. The doubling of the first switching harmonic cluster may lead to improved output voltage frequency spectrum. In accordance with an embodiment, using the second modulation method instead of the first modulation method allows to reduce the size of components (e.g., capacitor and/or inductor values) of an output filter provided at an output 114 of the VLMM 110. In accordance with an embodiment, the second modulation method eliminates the use of a switching state table and the sensor-less aspect is implemented by logic gates. In accordance with an embodiment, the second modulation method generates the plurality of switching signals for the switches 210 of the VLMM 110 for faster charging of the DC capacitor 220 and better output harmonic contents than the first modulation method.

In accordance with an embodiment, the second modulation method is sensor-less and utilizes four phase and level shifted triangular carriers and logic gates. Thus, the second modulation method does not require a switching states module, as is the case in the first modulation method. Accordingly, the second modulation method does not impose any complex calculations and may be easily implemented by low-cost microcontrollers. Moreover, by implementing the second modulation method, the charging and discharging of the DC capacitor 220 is balanced in each switching period. In contrast, for the VLMM 110, controlled by the VLMM switching pattern generator 140 of FIG. 4A, the DC capacitor 220 is charged and discharged in each output voltage fundamental period. Therefore, the DC capacitor 220 value of the VLMM 110 controlled by the VLMM switching pattern generator 140' is decreased. This may lead to an increase in the power density and a decrease of the cost, size, and start-up time of the VLMM 110. As well, in accordance with an embodiment, by applying the second modulation method, this shifts the first switching harmonic clusters to twice the switching frequency. Hence, it leads to fast transient response and improved harmonic contents of the VLMM 110.

FIGS. 7A to 7E illustrate various examples of power converter circuits, and more particularly illustrate that the VLMM 110 may be connected to a variety of MLIs (reference 120 in FIG. 1). It should be understood that, in the examples of FIGS. 7A to 7E, the switches of the VLMM 110 and the MLI 120 may be controlled according to the first or second modulation methods.

Figure 7A:
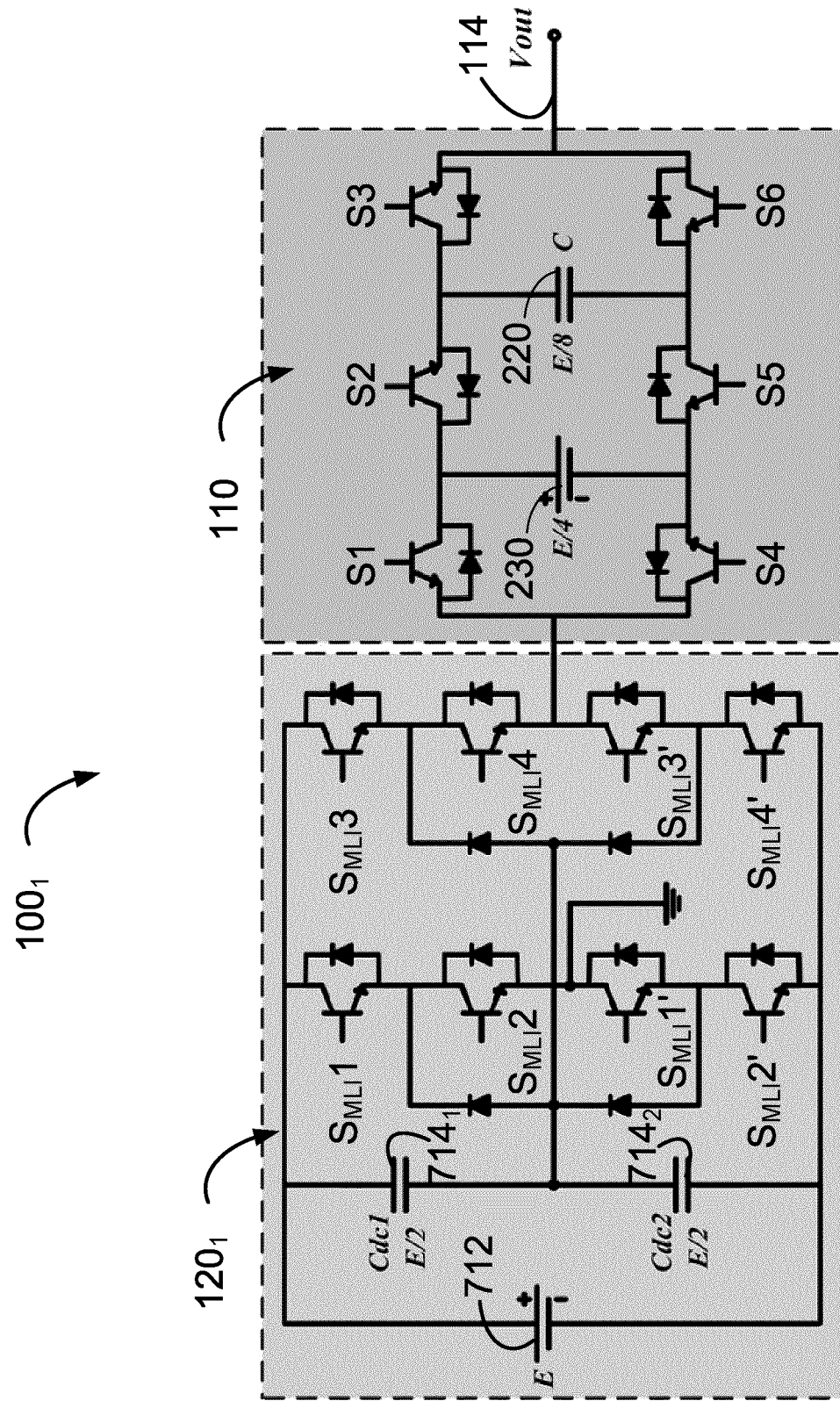
FIG. 7A is a circuit diagram of an example power converter circuit comprising a neutral-point-clamped (NPC) converter and the voltage level multiplier module of FIG. 2, in accordance with an embodiment.

With reference to FIG. 7A, a first specific and non-limiting example implementation of a power converter circuit $100_1$ is shown. In this example, the MLI 120 is implemented as a NPC converter $120_1$. In this example, the NPC converter $120_1$ is a 5-level converter having a full bridge. As illustrated, the NPC converter $120_1$ comprises a power source 712 operating at a DC voltage level E, two capacitors $714_1$ and $714_2$ regulated to have a voltage of E/2 and eight switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$. In accordance with an embodiment, the DC source 230 of the VLMM 110 is configured to operate at ¼ of the DC voltage level E. In accordance with an embodiment, the capacitor 220 is regulated to have a capacitor voltage of ⅛ of the DC voltage level E. The capacitor 220 may be regulated by applying the VLMM switching pattern to the plurality of switches S1, S2, S3, S4, S5, S6 according to the first or second modulation method. The implementation of the NPC converter $120_1$ may vary depending on practical applications. While a 5-level NPC converter is illustrated in FIG. 7A, the number of levels may vary. For example, any suitable n-level NPC converter comprising (n−1)(n−2) clamping diodes, 2(n−1) switching devices and (n−1) DC-link capacitors may be used.

Figure 7B:
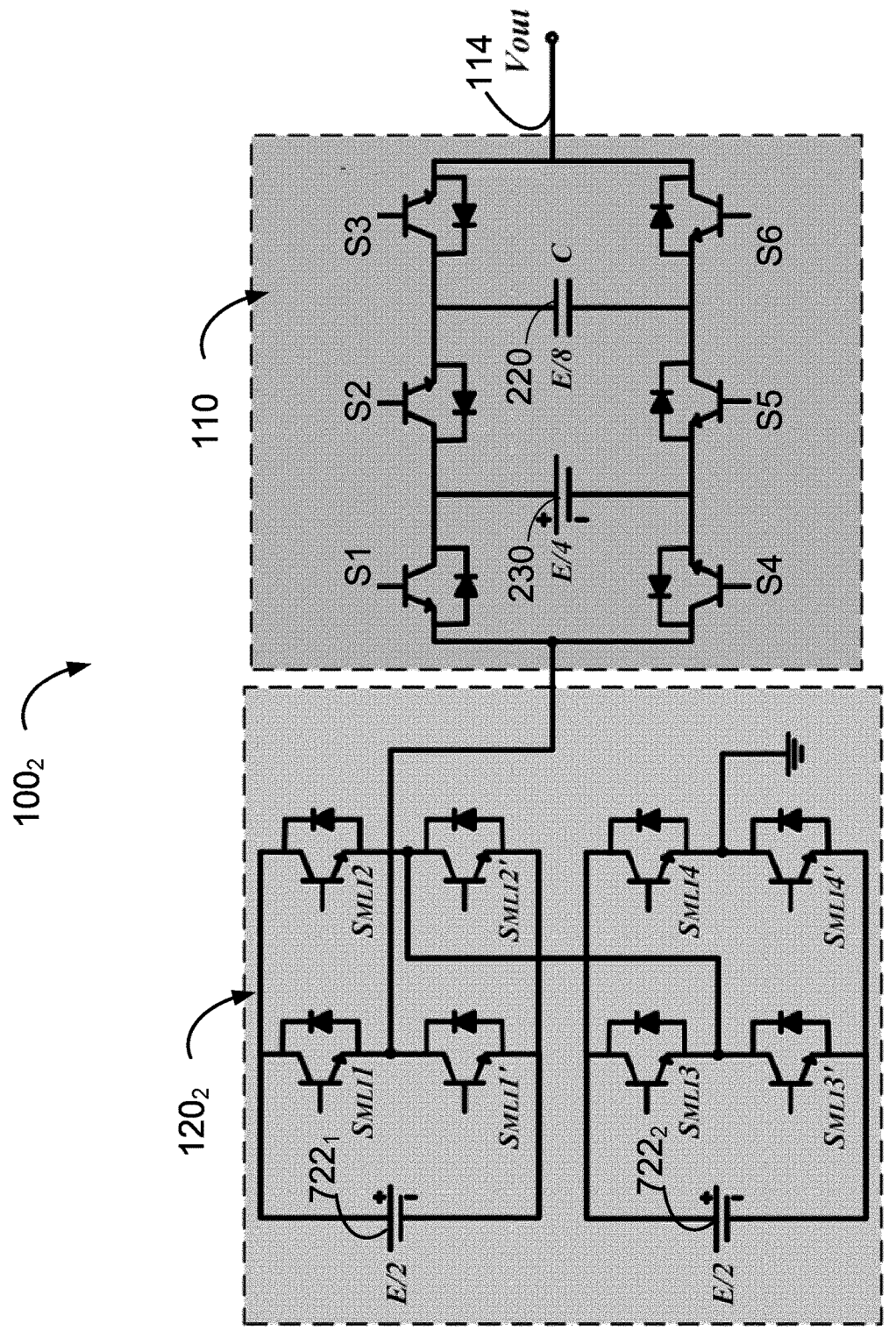
FIG. 7B is a circuit diagram of an example power converter circuit comprising a cascaded H-bridge (CHB) converter and the voltage level multiplier module of FIG. 2, in accordance with an embodiment.

With reference to FIG. 7B, a second specific and non-limiting example of a power converter circuit $100_2$ is shown. In this example, the MLI 120 is implemented as a 5-level CHB converter $120_2$. As illustrated, the CHB converter $120_2$ comprises two power sources $722_1$ and $722_2$ each operating at a DC voltage level E/2 and eight switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$. In accordance with an embodiment, the DC source 230 of the VLMM 110 is configured to operate at ¼ of the DC voltage level E. In accordance with an embodiment, the capacitor 220 is regulated to have a capacitor voltage of ⅛ of the DC voltage level E. The implementation of the CHB converter 120₂ may vary depending on practical applications. While a 5-level CHB converter is illustrated in FIG. 7B, the number of levels may vary. For example, any suitable n-cell CHB converter having 2n−1 voltage levels may be used.

Figure 7C:
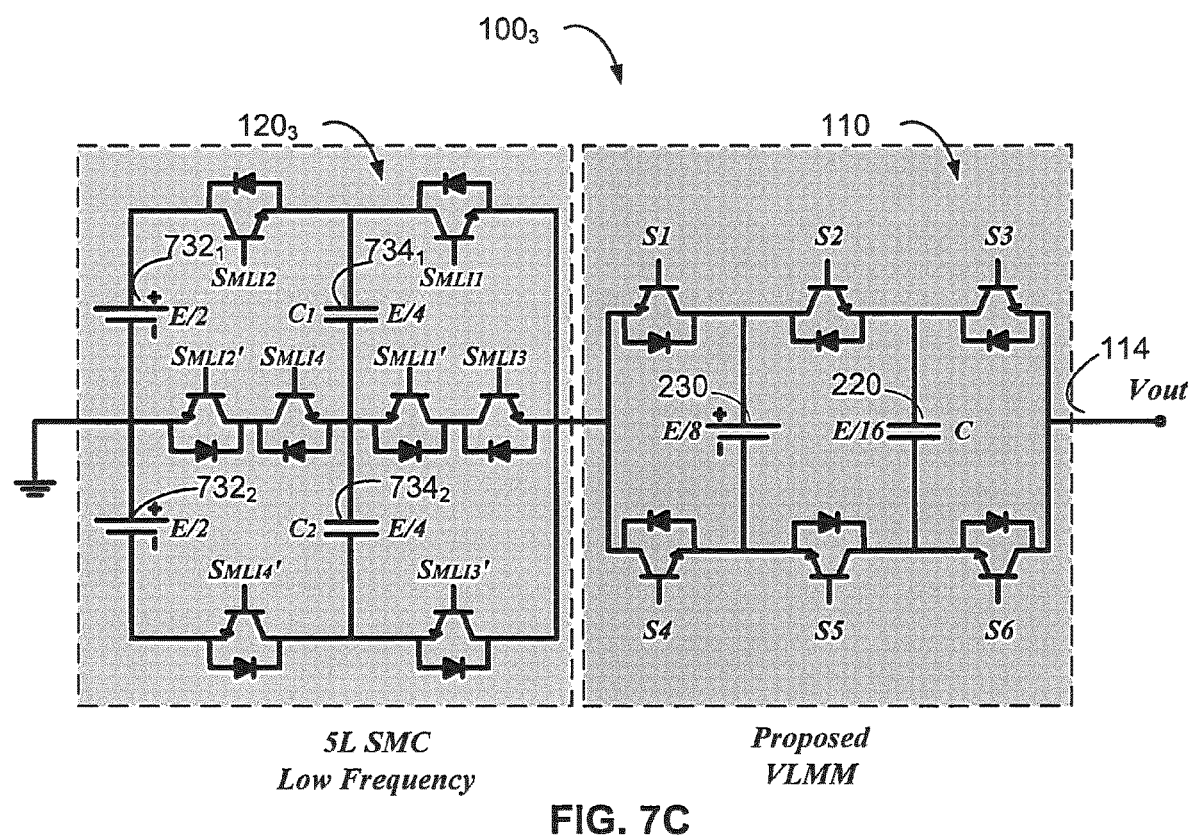
FIG. 7C is a circuit diagram of an example power converter circuit comprising a stacked multi-cell (SM) converter and the voltage level multiplier module of FIG. 2, in accordance with an embodiment.

With reference to FIG. 7C, a third specific and non-limiting example of a power converter circuit 100₃ is shown. In this example, the MLI 120 is implemented as a SM converter 120₃. In the illustrated embodiment, the SM converter 120₃ is a 5-level converter having two cells. As illustrated, the SM converter 120₃ comprises two power sources 732₁ and 732₂ each operating at a DC voltage level E/2, two capacitors 734₁ and 734₂ regulated to have a voltage of E/4 and eight switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$. In accordance with an embodiment, the DC source 230 of the VLMM 110 is configured to operate at ⅛ of the DC voltage level E. In accordance with an embodiment, the capacitor 220 is regulated to have a capacitor voltage of 1/16 of the DC voltage level E. The implementation of the SM converter 120₃ may vary depending on practical applications. While a 5-level SM converter is illustrated in FIG. 7C, the number of levels may vary. For example, any suitable 2n-cell SM converter comprising 2n cells, 2n−2 flying capacitors, and 4n switches controlled by phase shifted PWM (PSPWM) with a phase shift of π/n to provide equal duty cycle to each cell may be used. Accordingly, the number of output voltage levels for a 2n-cell SM converter is 2n+1.

Figure 7D:
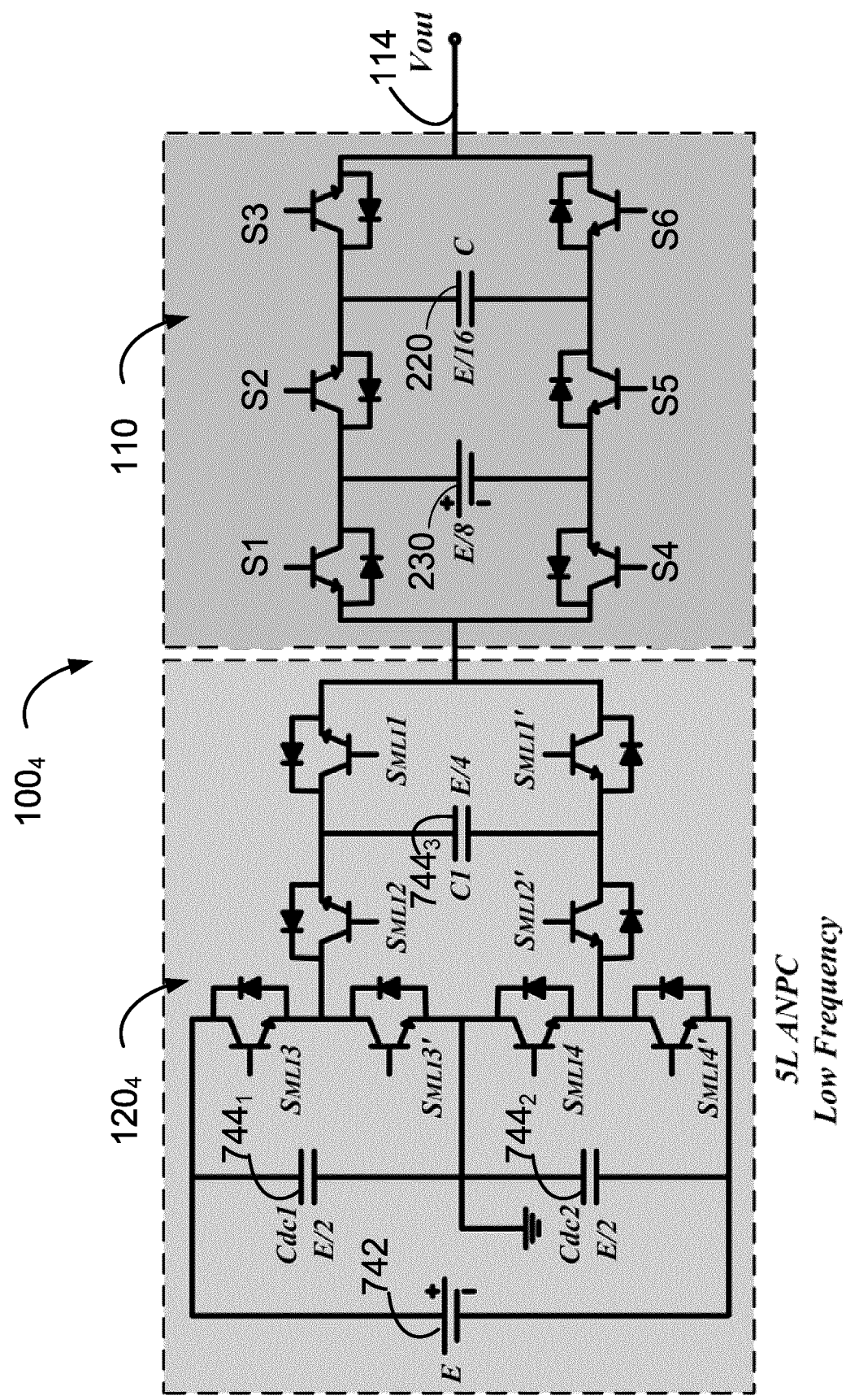
FIG. 7D is a circuit diagram of an example power converter circuit comprising an active neutral-point-clamped (ANPC) converter and the voltage level multiplier module of FIG. 2, in accordance with an embodiment.

With reference to FIG. 7D, a fourth specific and non-limiting example of a power converter circuit 100₄ is shown. In this example, the MLI 120 is implemented as an ANPC converter 120₄. In the illustrated embodiment, the ANPC converter 120₄ is a 5-level converter comprising four high-frequency switches and four low frequency switches $S_{MLI}1$, $S_{MLI}1'$, $S_{MLI}2$, $S_{MLI}2'$, $S_{MLI}3$, $S_{MLI}3'$, $S_{MLI}4$ and $S_{MLI}4'$ in which $S_{MLI}3$, $S_{MLI}3'$, $S_{MLI}4$ and $S_{MLI}4'$ are low frequency switches whereas $S_{MLI}1$, $S_{MLI}1'$, $S_{MLI}2$, $S_{MLI}2'$ are high frequency switches. The 5-level converter further comprises one DC power source 742 operating at a DC voltage level E, two capacitors 744₁ and 744₂ regulated to have a voltage of E/2 and one flying capacitor 744₃ regulated to have a voltage of E/4. While a 5-level ANPC is illustrated in FIG. 7D, the number of levels may vary. Any other suitably configured ANPC converter may be used.

Figure 7E:
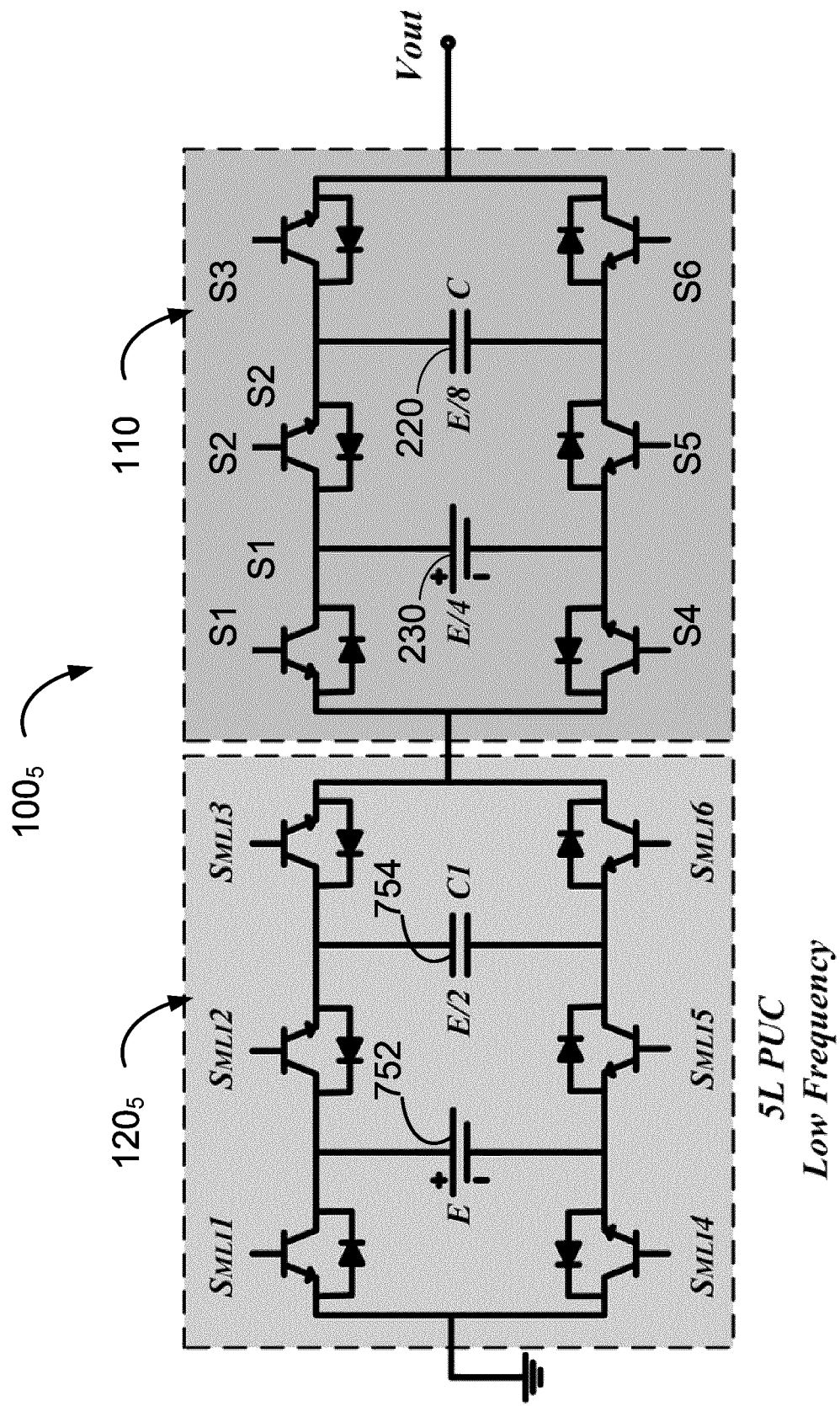
FIG. 7E is a circuit diagram of an example power converter circuit comprising a packed U-cell (PUC) converter and a voltage level multiplier module of FIG. 2, in accordance with an embodiment.

With reference to FIG. 7E, a fifth specific and non-limiting example of a power converter circuit 100₅ is shown. In this example, the MLI 120 is implemented as a PUC converter 120₅. In the illustrated embodiment, the PUC converter 120₅ is a 5-level PUC converter (PUC5). The PUC converter 120₅ comprises a power source 752 operating at a DC voltage level E, a capacitor 754 regulated to have a voltage of E/2 and six switches $S_{MLI}1$, $S_{MLI}1'$, $S_{MLI}2$, $S_{MLI}2'$, $S_{MLI}3$, and $S_{MLI}3'$. While a 5-level PUC is illustrated in FIG. 7E, the number of levels may vary. Any other suitably configured PUC converter may be used.

In accordance with an embodiment, the switching pattern for the power converter circuit 1001 of FIG. 7A and/or the power converter circuit 100₂ of FIG. 7B is PDPWM. The switching pattern produced for the power converter circuit 100₃ of FIG. 7C is PSPWM, for the power converter circuit 100₄ of FIG. 7D is modified PSPWM, and/or for the power converter circuit 100₅ of FIG. 7E is its proposed modified PSPWM or modified PDPWM method.

In accordance with an embodiment, the parameters of the components of the VLMM 110 using the second proposed VLMM switching pattern generator 140' with a reduced DC capacitor 220 value (with a DC-link power of $P_{DC}$, DC-link voltage of $V_{DC}$ for the DC source 230, DC-link current of $I_{DC}$ and output current of $I_L$) are presented in Table 1.

TABLE 1

Example parameters of the VLMM 110

| Parameters | Value |
|---|---|
| DC-link Power Supply | $\begin{cases} V_{DC-VLMM} = \dfrac{V_{DC}}{4} \\ I_{DC-VLMM} = \dfrac{I_{DC}}{4} \\ P_{DC\_VLMM} = \dfrac{P_{DC}}{16} \end{cases}$ |
| Capacitor | $\begin{cases} C = 125 \ \mu F \\ V_C = \dfrac{V_{DC}}{8} \end{cases}$ |
| Low-Frequency Switches (2 pcs.) | $\begin{cases} V_{Switch} = \dfrac{V_{DC}}{4} \\ I_{Switch} = I_L \end{cases}$ |
| High-Frequency Switches (4 pcs.) | $\begin{cases} V_{Switch} = \dfrac{V_{DC}}{8} \\ I_{Switch} = I_L \end{cases}$ |

Table 1 indicates that when the MLI 120 comprises a power source operating at a DC voltage level VDC, the DC source 230 of the VLMM operates at ¼ of the DC voltage level. Table 1 further indicates that when the MLI 120 operates at a DC current level, the at least one VLMM 110 operates at ¼ of the DC current level. Table 1 further indicates that when the MLI 120 operates at a DC power level, the at least one VLMM 110 operates at 1/16 of the DC power level. Table 1 further indicates that the capacitor 220 of the VLMM 110 has a voltage of ⅛ of the DC voltage level VDC. Table 1 further indicates that two low frequency switches of the VLMM 110 operate at ¼ of the DC voltage level and four high frequency switches operate at ⅛ of the DC voltage level of the VLMM 110. The parameters provided in Table 1 are example parameters and may vary depending on practical implementations.

In accordance with an embodiment, all of the components of the VLMM 110 operate at a low voltage and low power than the components of the MLI 120. In accordance with an embodiment, the VLMM 110 operates at a higher switching frequency than the switching frequency of the MLI 120.

In accordance with an embodiment, the VLMM 110 increases the number of voltage levels while maintaining a reduced cost, size and number of components (e.g., power supplies, semiconductors, capacitors, etc.) when compared to a MLI designed to have a comparable number of voltage levels.

In accordance with an embodiment, the output voltage frequency spectrum is improved when the VLMM 110 is utilized with the MLI 120 relative to the MLI 120 without the use of the VLMM 110. In accordance with an embodiment, the output voltage ripple is reduced.

The complexity of controlling the power converter circuit 100 may be reduced by use of the proposed decomposed modulation method as well as the VLMM first or second modulation method in comparison to conventional methods for modulating switches of MLIs. In accordance with an embodiment, by use of the first or second modulation method, the capacitor voltage is regulated automatically without using closed-loop controls. In other words, self-balancing of the capacitor voltages may lead to significant reduction in the complexity of MLIs.

In accordance with an embodiment, an improved dynamic and steady state performance is achieved when the VLMM 110 is utilized with the MLI 120 relative to the MLI 120 without the use of the VLMM 110.

In accordance with an embodiment, GTOs may be used for the switches of the MLI 120 due to low switching frequency of the MLI and MOSFETS may be used for the switches 210 of the VLMM 110 due to low voltage of the VLMM, which may decrease cost and complexity.

In accordance with an embodiment, by applying the VLMM 110 to the MLI 120, the output voltage staircase levels are increased (e.g., at least quadrupled) without any modifications of the switches and other components of the MLI 120. In accordance with an embodiment, the VLMM 110 is applied at the MLI output 122 and the reference voltage is the only parameter modified.

In accordance with an embodiment, an output filter (comprising an inductor and a capacitor) at output 114 may be completely eliminated or remarkably reduced in capacitance and/or inductance size, thereby enabling the power converter circuit 100 to be provided with a decreased cost, size, and sensitivity to a load. Accordingly, this may result in the power converter circuit 100 having increased power density, reliability and efficiency. One of the major issues in grid-connected and stand-alone power converters is power quality. Complying with the harmonic limit mandated by relevant standards such as IEEE 519 and IEEE 1549 is requisite for acceptable operation of power converters. Hence, in order to suppress and eliminate the emanated harmonics by power converters, passive filters such as L, LC, and LCL are usually used at the output of power converters. However, they are bulky, heavy, costly, and have potential resonant risk especially for high power ranges. The quality of an output waveform of a power converter should be improved to reduce the size of the output filter or completely eliminate the output filter. In accordance with an embodiment, the VLMM 110 results in an improved output waveform and improved power quality. Thus, the VLMM 110 may allow for a reduction in the size of the capacitor and/or inductor of the output filter or even completely removal of the output filter.

In some embodiments, an output filter is connected to the output 114 (e.g., as shown in FIG. 1). In accordance with an embodiment, the output filter comprises an inductor having an inductance value of:

$$L = \frac{V_{DC}}{8 \times (n-1) \times \Delta I_L \times f_{1stSW\,Harmonic}}$$

and a capacitor having a capacitance of $$C = \frac{4}{(2\pi \times f_{1stSW\,Harmonic})^2 \times L},$$

where n is the number of output voltage levels, $\Delta I_L$ is the desired output current ripple, $f_{1st\,SW\,Harmonic}$ is the first switching harmonic cluster frequency and $V_{DC}$ is the DC-link voltage.

The derivation for the values of the inductor and the capacitor of the output filter is as follows: in an output LC filter, the inductor value depends on the output current ripple. Usually, the current ripple is considered as 15% of full load current. Therefore, the output current ripple is expressed as follows:

$$\Delta I_L = 0.15 \times \sqrt{2} \times \frac{P_{Out}}{V_{Out}} \tag{5}$$

where $\Delta I_L$, $P_{Out}$, and $V_{Out}$ are the output current ripple, the maximum output power and the output voltage of the inverter. The current in the inductor is expressed as:

$$\Delta i = \frac{V_{PWM}}{L} \times \Delta t \tag{6}$$

where $\Delta i$ is the current ripple in the inductor, L is the output inductor, $V_{PWM}$ is the pulse voltage across the inductor, and $\Delta t$ is the switching time. $\Delta t$ and $V_{PWM}$ are expressed as follows:

$$\Delta t = \frac{d}{2 \times f_{1stSW\,Harmonic}} \tag{7}$$

$$V_{PWM} = \frac{V_{DC} - V_{Out}}{n-1} \tag{8}$$

where d is the PWM duty cycle, $f_{1st\,SW\,Harmonic}$ is the first switching harmonic cluster frequency, $V_{DC}$ is the DC-link voltage, and n is the number of output voltage levels. By substituting (7) and (8) in (6), and considering $$d = \frac{V_{Out}}{V_{DC}},$$

$\Delta i$ is obtained as:

$$\Delta i = \frac{\left(\frac{V_{DC} - V_{Out}}{n-1}\right)}{L} \times \frac{\frac{V_{Out}}{V_{DC}}}{2 \times f_{1stSW\,Harmonic}} \tag{9}$$

The corresponding output voltage at maximum inductor current is calculated as:

$$\frac{\partial(\Delta i)}{\partial(V_{Out})} = \tag{10}$$

$$0 \Rightarrow \frac{\partial\left(\frac{\left(\frac{V_{DC} - V_{Out}}{n-1}\right)}{L} \times \frac{\frac{V_{Out}}{V_{DC}}}{2 \times f_{1stSW\,Harmonic}}\right)}{\partial(V_{Out})} = 0 \Rightarrow V_{Out} = \frac{V_{DC}}{2}$$

By substituting (10) in (9), $(\Delta i)_{max}$ is expressed as:

$$(\Delta i)_{max} = \frac{V_{DC}}{8 \times (n-1) \times L \times f_{1stSW\ Harmonic}} \quad (11)$$

The output filter inductor is then obtained as:

$$L = \frac{V_{DC}}{8 \times (n-1) \times \Delta I_L \times f_{1stSW\ Harmonic}} \quad (12)$$

The output filter capacitance is calculated by the cutoff frequency of the output LC filter. The output LC filter cutoff frequency is obtained as:

$$f_{cutoff} = \frac{1}{2\pi \times \sqrt{LC}} \quad (13)$$

There are various criteria to determine the output LC filter cutoff frequency. Here, the cutoff frequency is considered as half of the $f_{1st\ SW\ Harmonic}$. Hence, $$\frac{f_{1stSW\ Harmonic}}{2} = \frac{1}{2\pi \times \sqrt{LC}} \Rightarrow C = \frac{4}{(2\pi \times f_{1stSW\ Harmonic})^2 \times L} \quad (14)$$

Considering (12) and (14), the inductor and capacitor of the output LC filter are obtained.

In order to calculate the total power of utilized semiconductor devices in the VLMM 110, the total power of utilized semiconductors in the VLMM 110 is expressed as $$P_{SI} = \sum_{n=1}^{N_{SW}} I_{max}(n) \cdot V_{max}(n) \quad (15)$$

where $P_{SI}$ is the total power of utilized semiconductor devices in the VLMM 110, $N_{SW}$ is the number of semiconductors, $I_{max}(n)$ and $V_{max}(n)$ are the nth semiconductor maximum current and voltage, respectively. The $I_{max}(n)$ is expressed as $$I_{max} = K_t \cdot \left[ \sqrt{2} \cdot \sqrt{(\cos\varphi \cdot K_{OL} \cdot I_{NOM})^2 + \left(\sin\varphi \cdot K_{OL} \cdot I_{NOM} - \frac{V_{Out}}{X_{cap}}\right)^2} + K_{ripple} \cdot \frac{V_{Out}}{X_{cap}} \right] \quad (16)$$

where $K_t$ is the transformer ratio, $K_{OL}$ is the overload factor ($K_{OL}$=2.0), $I_{NOM}$ is the nominal load current, $V_{Out}$ is the output voltage, $X_{cap}$ is the output LC filter capacitor reactance, $K_{ripple}$ is the current ripple factor ($K_{ripple}$=0.15) and $\varphi$ is the phase difference between the current and voltage waveforms ($\varphi$=−0.6435).

For instance, when the number of voltage levels of the output voltage is 21, parameters are considered as follows $$\begin{cases} P_{Out} = 4000\ \text{VA} \\ V_{DC-MLI} = 200\ \text{V} \\ V_{DC-VLMM} = 50\ \text{V} \\ V_{Out} = 115\ \text{V} \\ I_{NOM} = 34.78\ \text{A} \end{cases} \quad (17)$$

The $I_{max}$ is obtained as $$I_{max} = 99.24A \quad (18)$$

Then, the $P_{SI}$ for the VLMM is expressed as $$P_{SI-VLMM} = \sum_{n=1}^{6} I_{max}(n) \cdot V_{max}(n) = \quad (19)$$
$$2 \times (99.24 \times 50) + 4 \times (99.24 \times 25) = 19.848\ \text{kVA}$$

Also, the $P_{SI}$ for the MLI 120 having 5 voltage levels (the PUC5 converter is considered) is obtained as $$P_{SI-5LMLI} = \sum_{n=1}^{6} I_{max}(n) \cdot V_{max}(n) = \quad (20)$$
$$2 \times (99.24 \times 200) + 4 \times (99.24 \times 100) = 79.392\ \text{kVA}$$

Hence, with respect to (19) and (20), the $P_{SI-VLMM}$ is a quarter of the $P_{SI-MLI}$.

Moreover, in order to compare the total power of utilized semiconductors in the proposed power converter circuit 100 with that in the traditional 5-level MLI for same output voltage and current, the $P_{SI-5LMLI}$ is obtained as $$I_{max} = 100.56\ A \quad (21)$$

$$P_{SI-5LMLI} = \sum_{n=1}^{6} I_{max}(n) \cdot V_{max}(n) = \quad (22)$$
$$2 \times (100.56 \times 250) + 4 \times (100.56 \times 125) = 100.56\ \text{kVA}$$

With respect to (19), (20) and (22), it is noteworthy to mention that $P_{SI-5LMLI} \approx P_{SI-MLI} + P_{SI-VLMM}$. Hence, from the aspect of the total power of utilized semiconductors, both of the traditional PUC5 and the power converter circuit 100 are approximately equal.

Figure 11A:
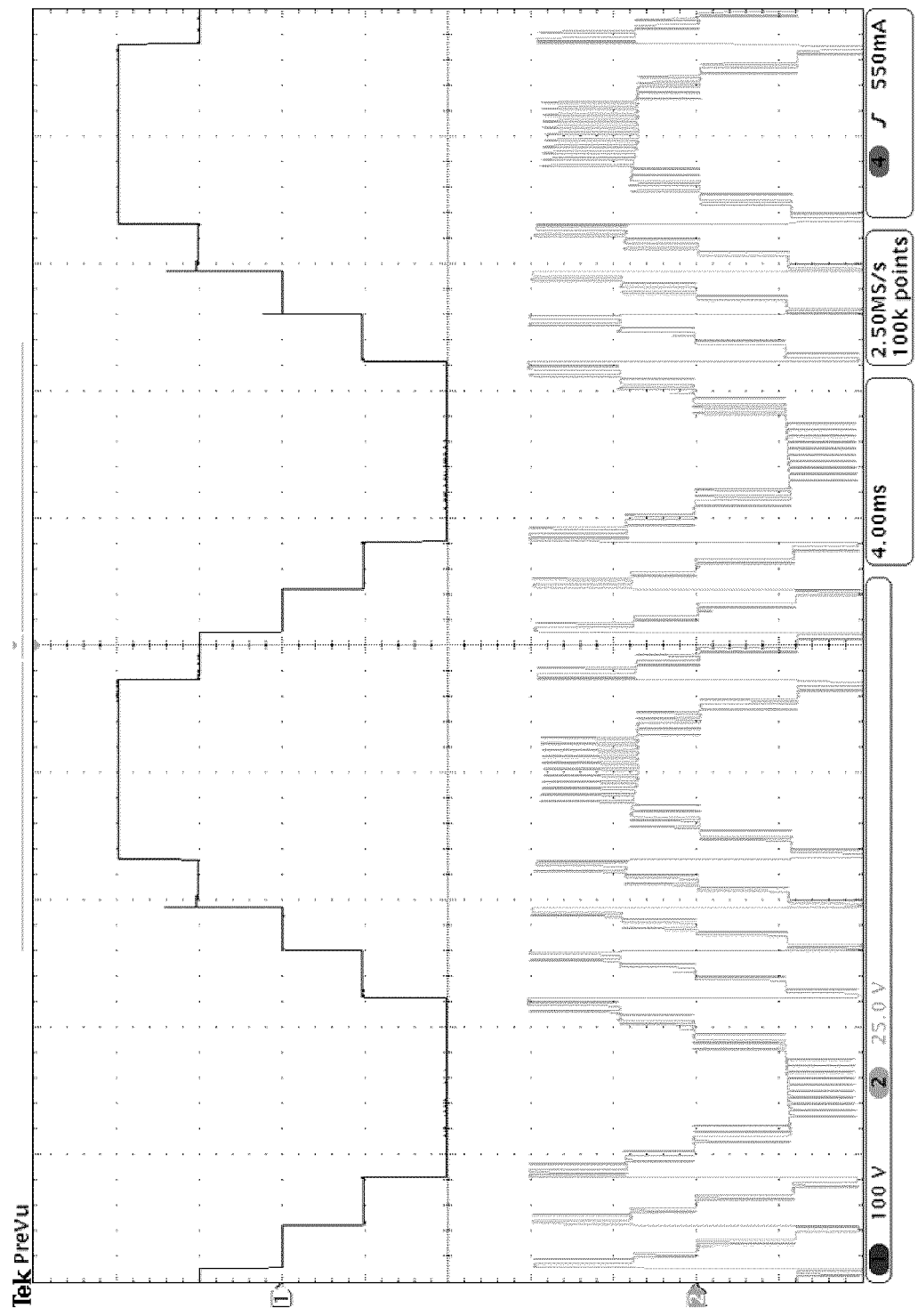
FIG. 11A is plot of output voltage of the voltage level multiplier module and the example multilevel inverter of FIG. 7E.
Figure 11B:
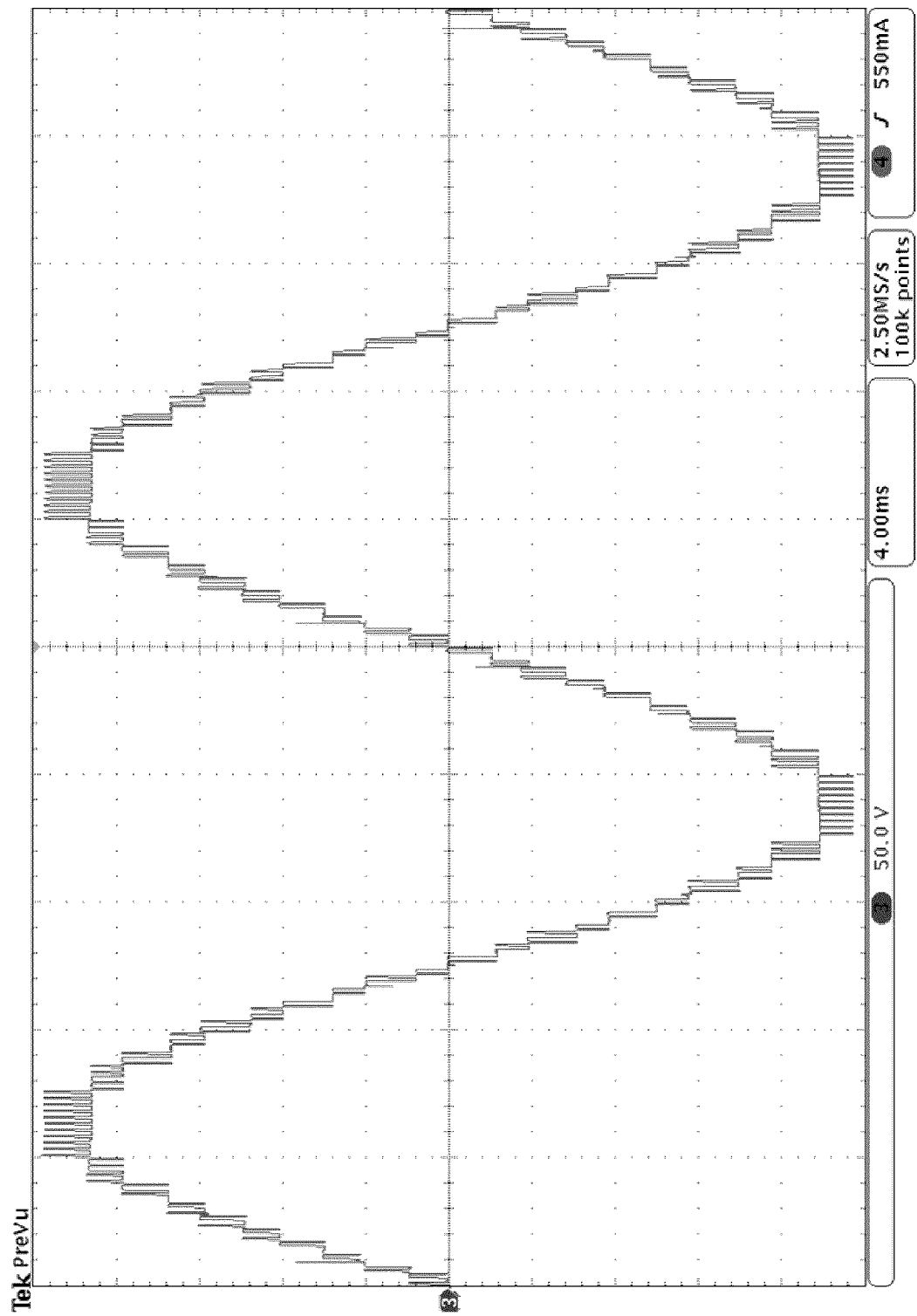
FIG. 11B is a plot of output voltage of the power converter circuit of FIG. 7E.
Figure 11C:
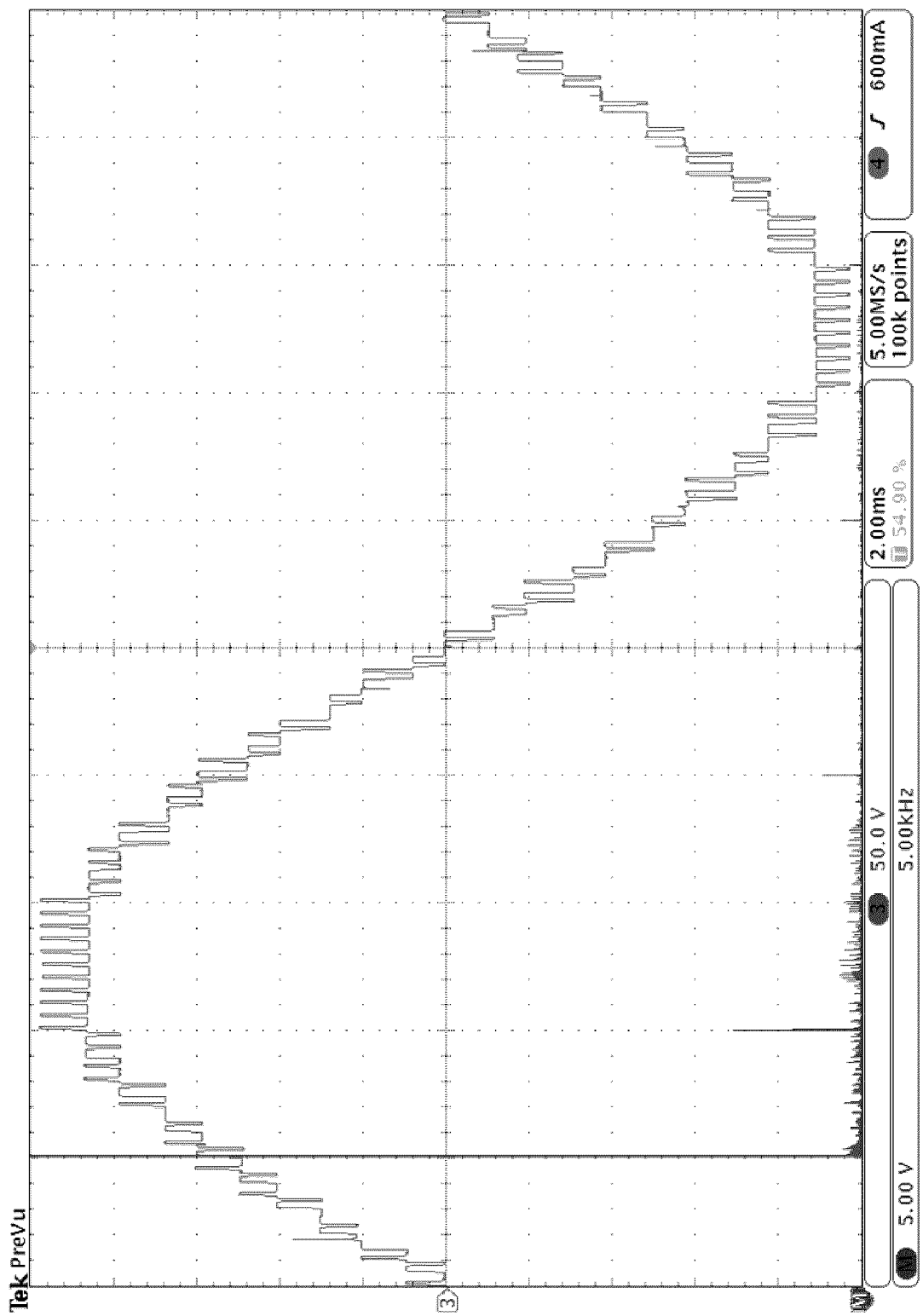
FIG. 11C is a plot of output voltage of the power converter circuit of FIG. 7E with a Fast Fourier Transform (FFT) analysis.
Figure 11D:
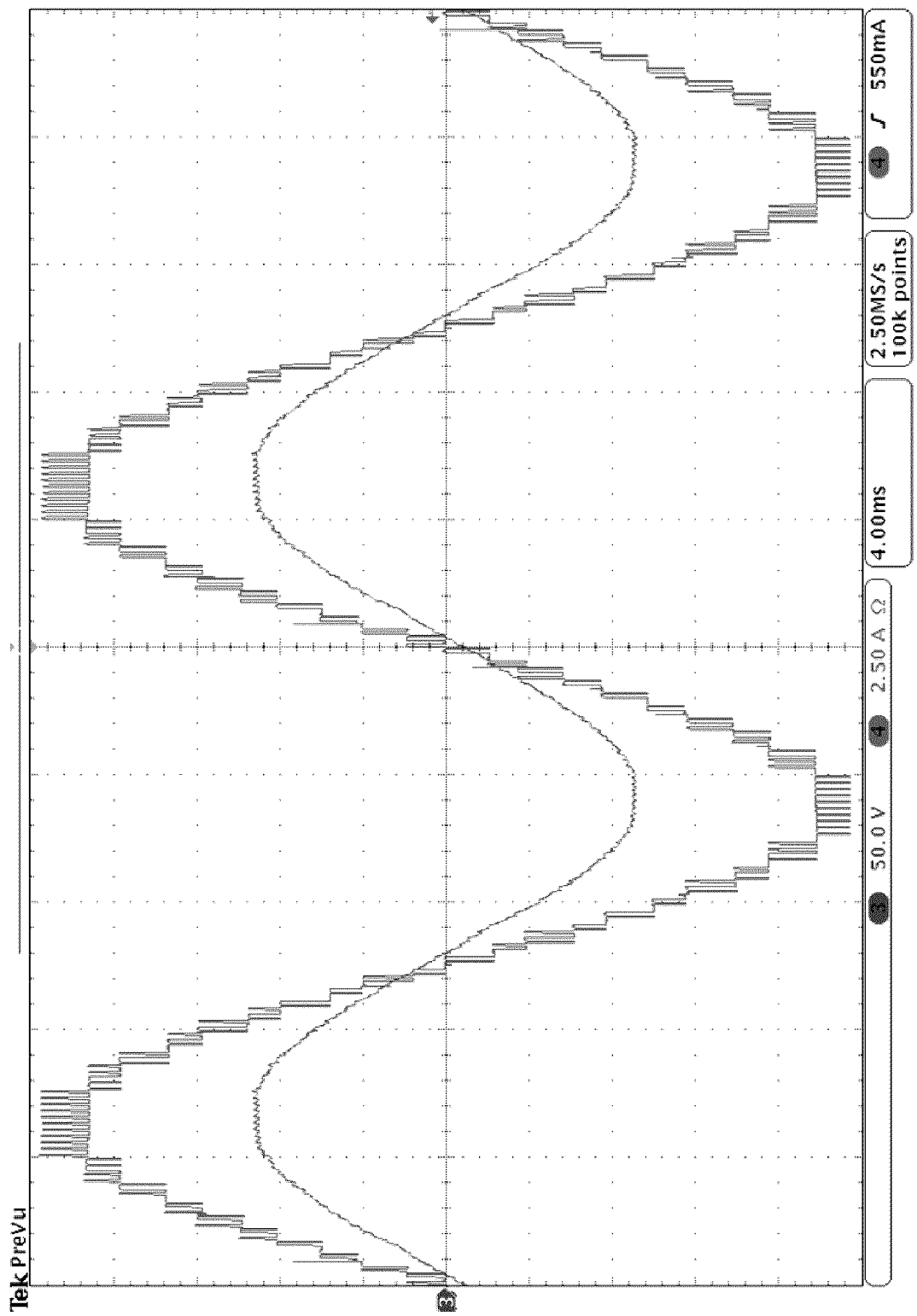
FIG. 11D is a plot of output voltage and load current of the power converter circuit of FIG. 7E.
Figure 11E:
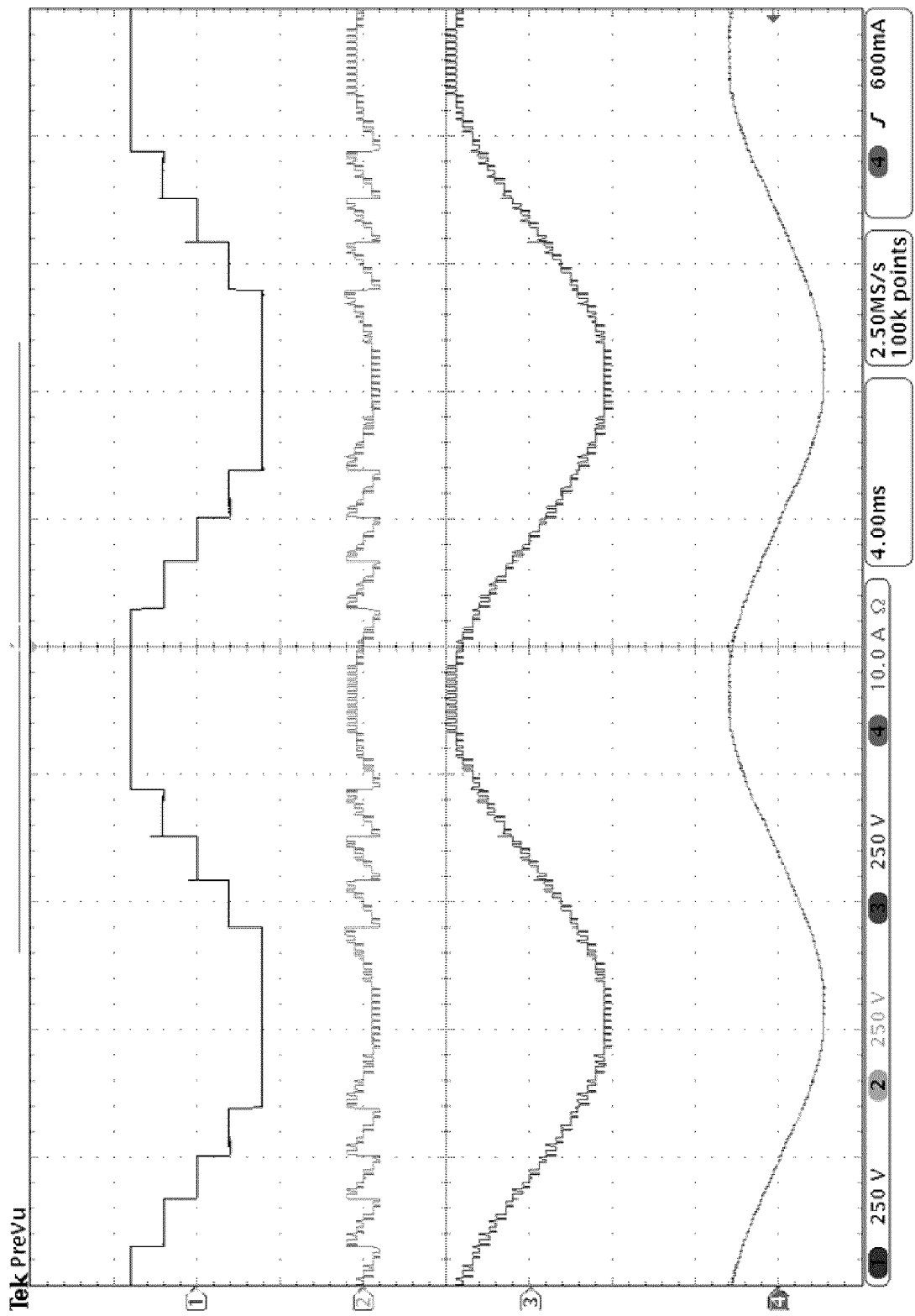
FIG. 11E is a plot of output voltage of the multilevel inverter, voltage level multiplier module and the multilevel power converter of FIG. 7E with a plot of load current.

The power converter circuit 100₅ FIG. 7E has been implemented to evaluate the feasibility and performance of power converter circuits described herein. The implemented converter consists of 12 IGBT switches while both of the capacitors 754 and 220 are 2500 μF, the PUC5 120₅ DC-link voltage is 200V, the low-voltage VLMM DC-link voltage is 50V. The modulation index is MI=0.9 and the switching frequency is 5 kHz. A dSPACE™ DS1103 real time controller has been used to control the proposed power converter circuit 100₅ using the first modulation method. The output RL load is R=40Ω, L=5 mH. FIG. 11A depicts the output voltage of the PUC5 converter 120₅ and the low-voltage VLMM 110. As shown in FIG. 11A, the PUC5 120₅ converter operates at 50 Hz with peak-to-peak voltage of 400V and the VLMM 110 works at switching frequency with peak-to-peak voltage of 100V. The staircase output voltage of the power converter circuit $100_5$ is illustrated in FIG. 11B. The power converter circuit $100_5$ output voltage FFT analysis is presented in FIG. 11C. As depicted in FIG. 11C, the output voltage has the first switching harmonic cluster around 5 kHz. FIG. 11D depicts the output voltage and load current of the power converter circuit $100_5$ at R=40Ω, L=5 mH load. FIG. 11E illustrates the PUC5 converter $120_5$ output voltage, the low-voltage VLMM 110 output voltage, the power converter circuit $100_5$ output voltage and the load current.

Figure 7F:
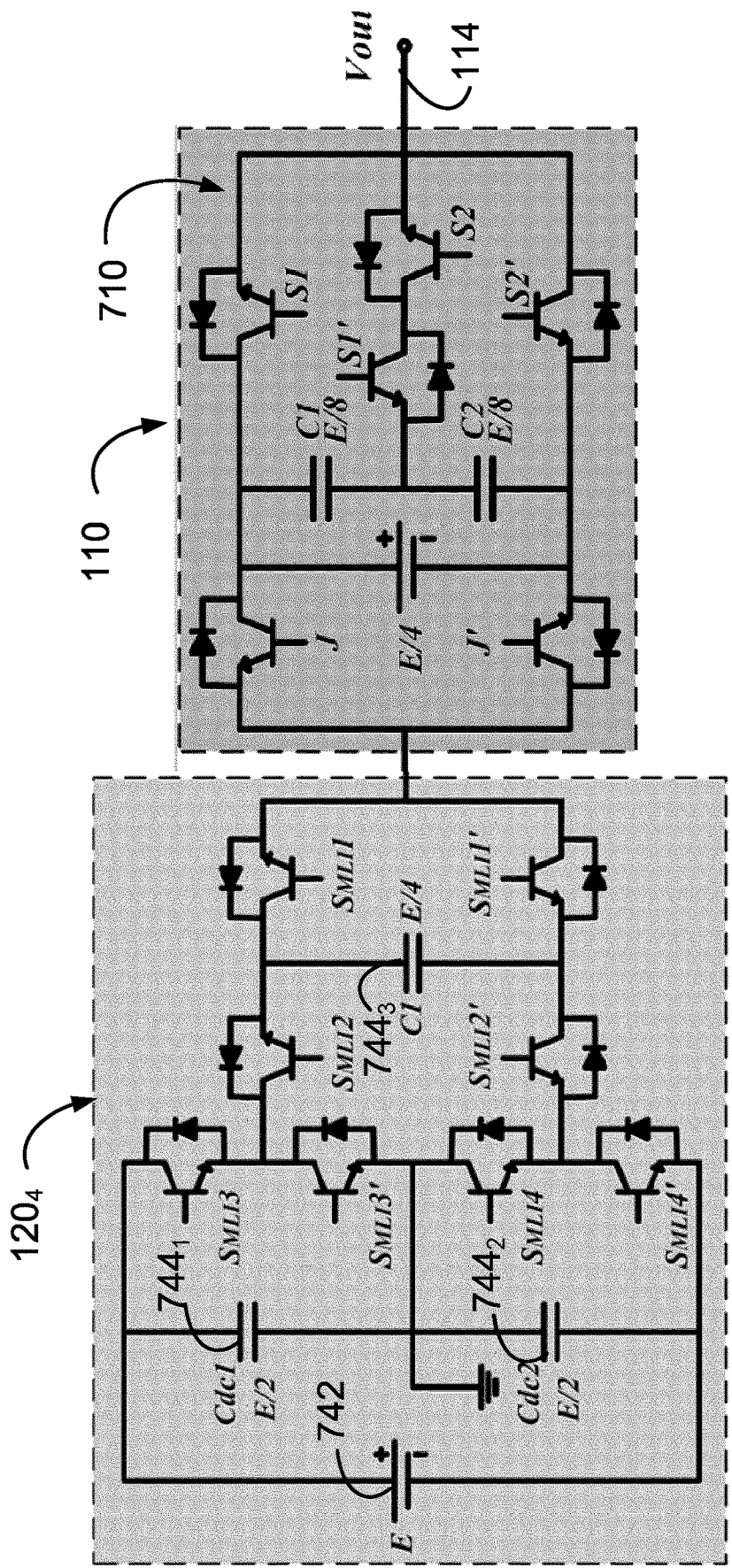
FIG. 7F is a circuit diagram of an example power converter circuit comprising an active neutral-point-clamped (ANPC) converter and another type of voltage level multiplier module, in accordance with an embodiment.

As illustrated in FIG. 7F, it shall be recognized that the 5-level PUC converter at the VLMM 110 can be replaced by a voltage level quadrupler module (VLQM) 710 or any other suitable 5-level converter such as a 5L-NPC, 5L-FC, 5L-SM, 5L-CHB, and 5L-ANPC. An adapted switching pattern shall be provided by the VLMM switching pattern generator 140.

Figure 8:
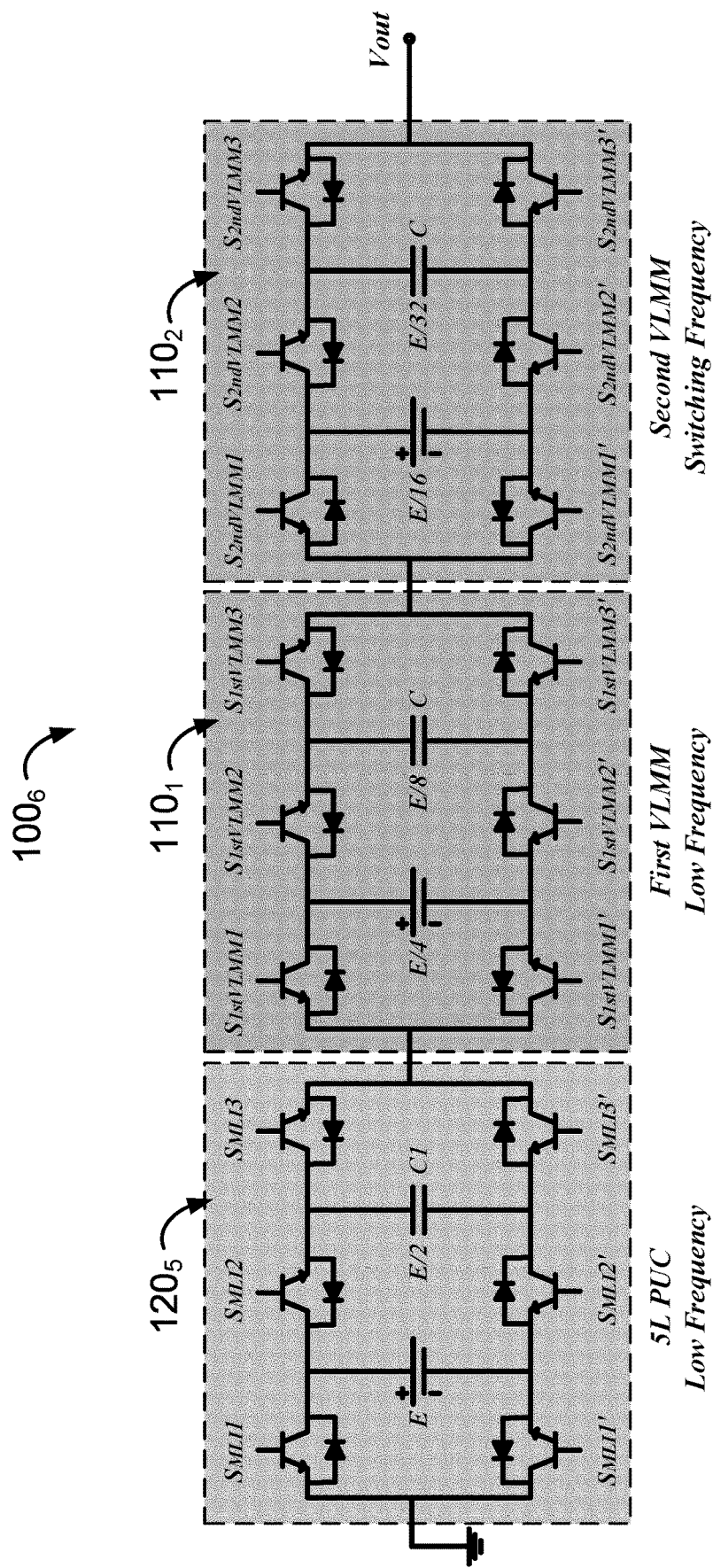
FIG. 8 is an example of an example power converter circuit comprising two voltage level multiplier modules connected in series to a multilevel inverter.

While FIG. 1 illustrates a single VLMM 110 in the power converter circuit 100, in some embodiments, more than one VLMM of the type of the VLMM 110 may be used. For example, when a plurality of VLMMs are used, they may be connected in series or cascaded. FIG. 8 illustrates an example of a power converter circuit $100_6$ comprising two VLMMs $110_1$, $110_2$ connected in series with a 5-level PUC converter $120_5$ (as the MLI 120, in this example). In the illustrated embodiment, the power converter circuit $100_6$ provides an output voltage having 85-level. When a plurality of VLMMs are used, the power converter circuit may be referred to as a Qn-MLI, which comprises one MLI 120 and n number of VLMMs 110. For example, power converter circuit $100_6$ may be referred to as a Q2-MLI.

Figure 9:
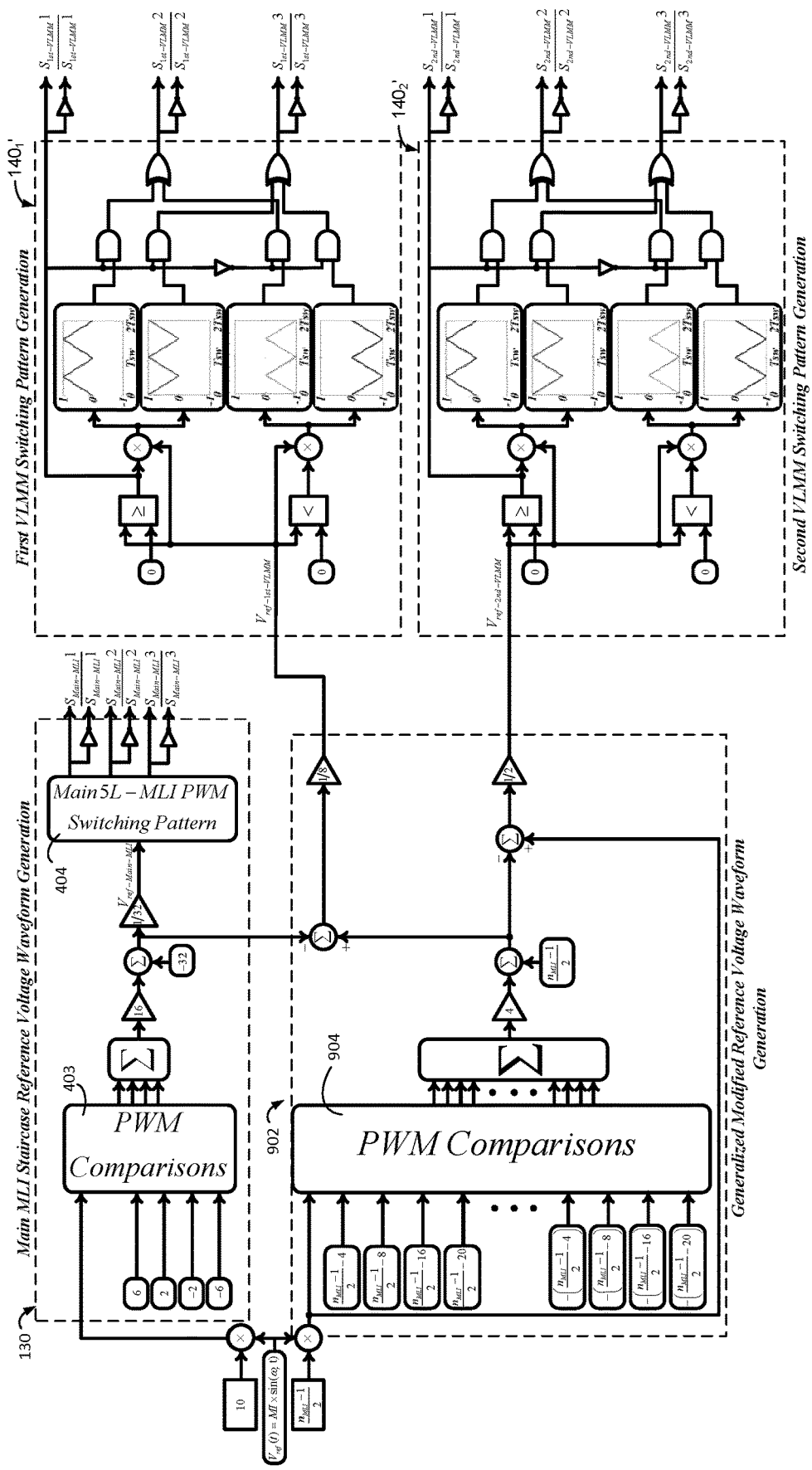
FIG. 9 is an example of a third switching pattern generator for use with the two voltage level multiplier modules of FIG. 8.

When more than one VLMM of the type of the VLMM 110 is used, the VLMM switching pattern generator 140 or 140' may be modified accordingly. FIG. 9 illustrates an example of a modified switching pattern generator for use with two VLMMs (references $110_1$, $110_2$ In FIG. 8). An input reference signal MI×sin($\omega_r$t) is decomposed to major voltage levels for the MLI 120 by the MLI switching pattern generator 130. The PWM comparison module 403 (e.g., a main MLI major level detector) is used to detect low-frequency and high-voltage major voltage levels ($V_{ref-Main-MLI}$). The achieved $V_{ref-Main-MLI}$ reference signal provides major levels of the output voltage. The obtained $V_{ref-Main-MLI}$ reference signal is applied to the MLI switching pattern generator 404 to provide switching signals ($S_{Main-MLI}1, \overline{S_{Main-MLI}1}, \ldots, S_{Main-MLI}3, \overline{S_{Main-MLI}3}$).

Figure 12A:
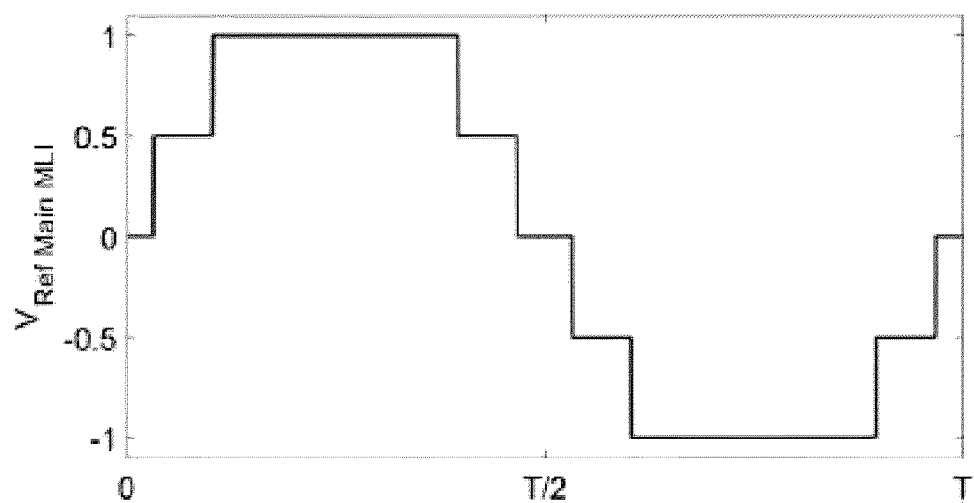
FIG. 12A is an example of a main reference signal for use by a switching pattern generator for the multilevel inverter of FIG. 8.
Figure 12B:
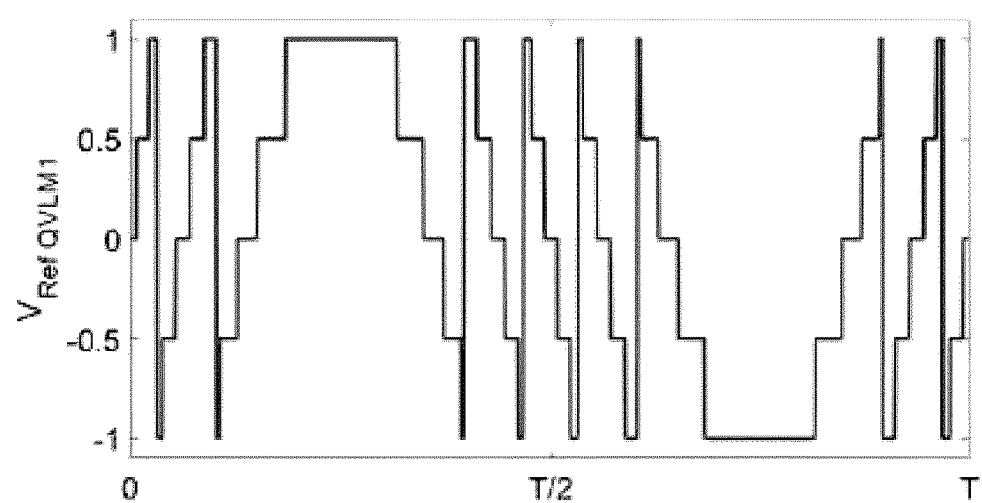
FIG. 12B is an example of a first reference signal for the first voltage level multiplier module of FIG. 8.
Figure 12C:
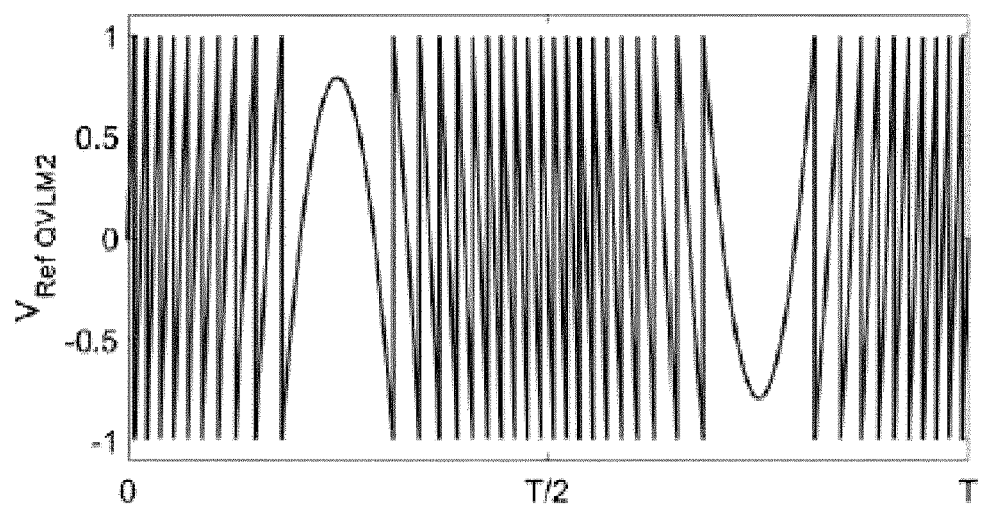
FIG. 12C is an example of a second reference signal for the second voltage level multiplier module of FIG. 8.
Figure 13A:
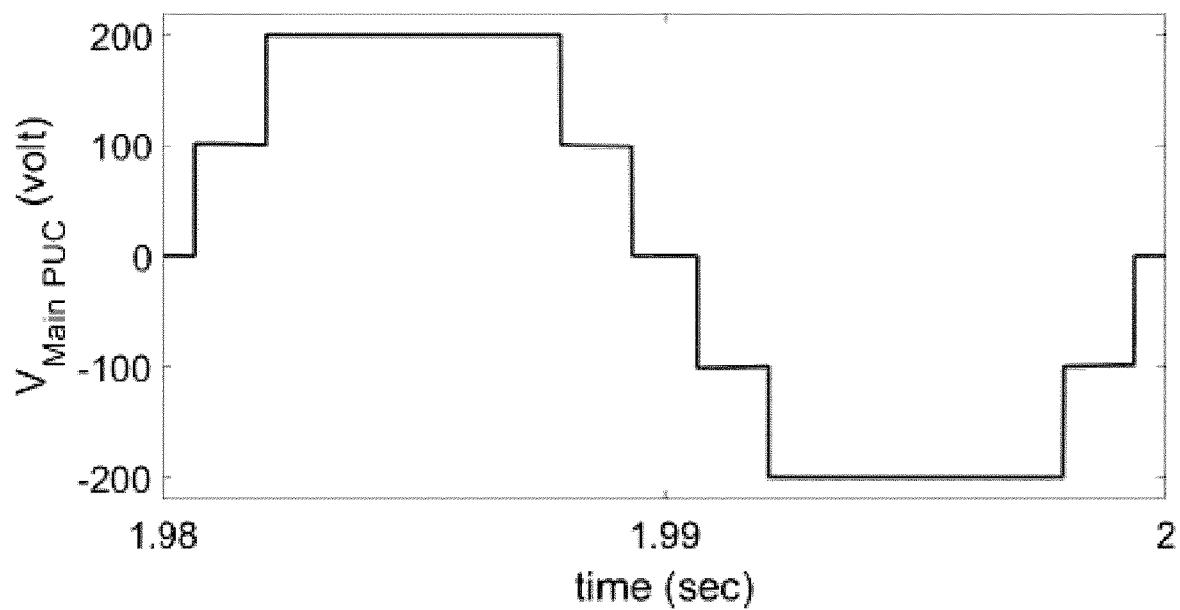
FIG. 13A is a plot of output voltage of the multilevel inverter of FIG. 8.
Figure 13B:
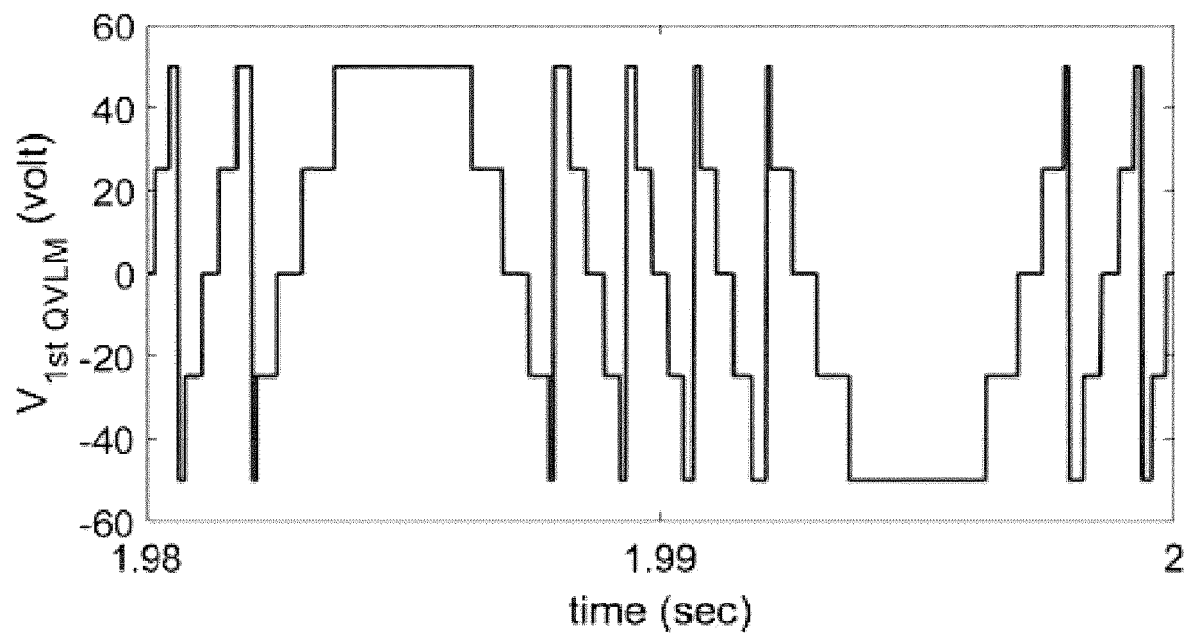
FIG. 13B is a plot of output voltage of the first voltage level multiplier module of FIG. 8.
Figure 13C:
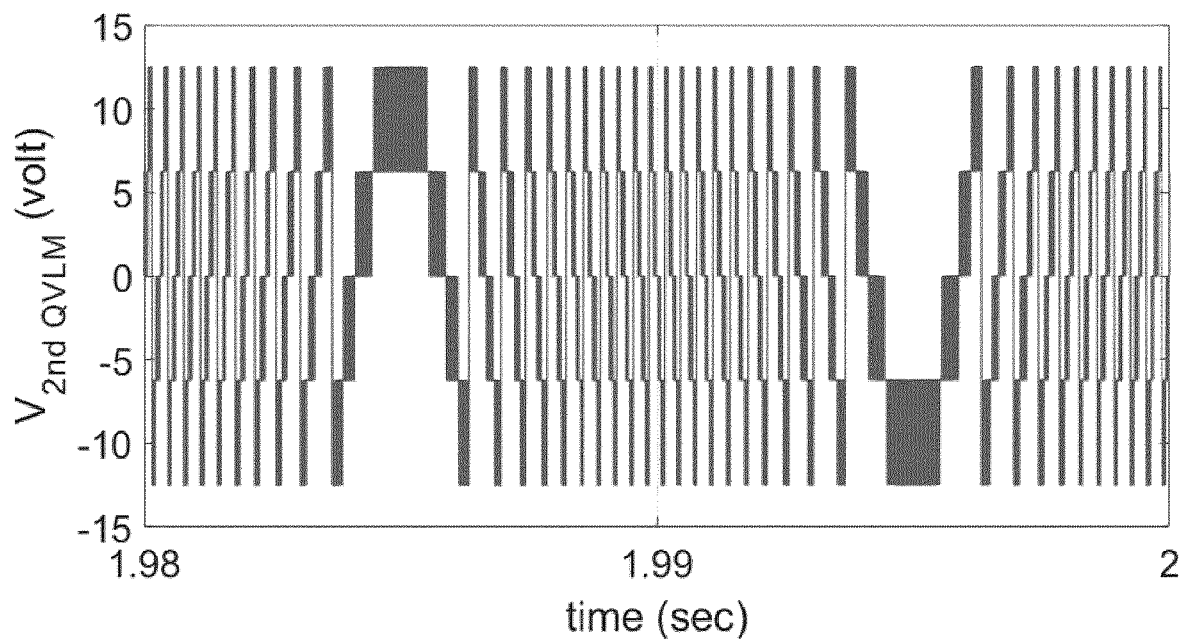
FIG. 13C is a plot of output voltage of the second voltage level multiplier module of FIG. 8.
Figure 13D:
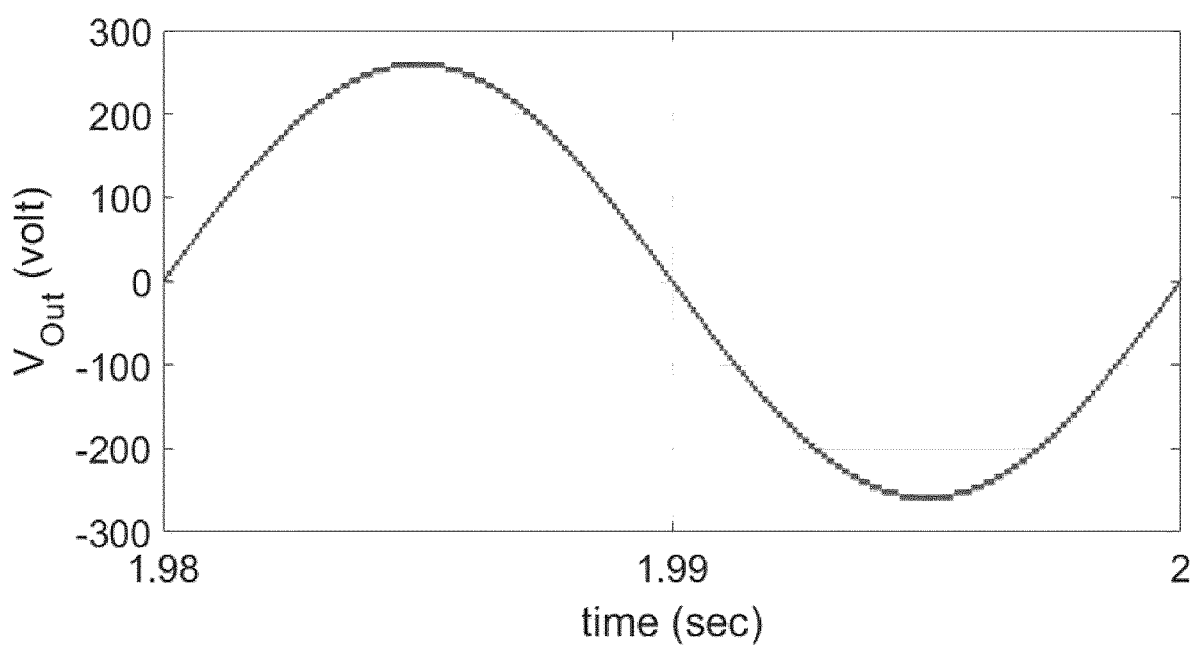
FIG. 13D is plot of output voltage for the power converter circuit of FIG. 8.
Figure 14A:
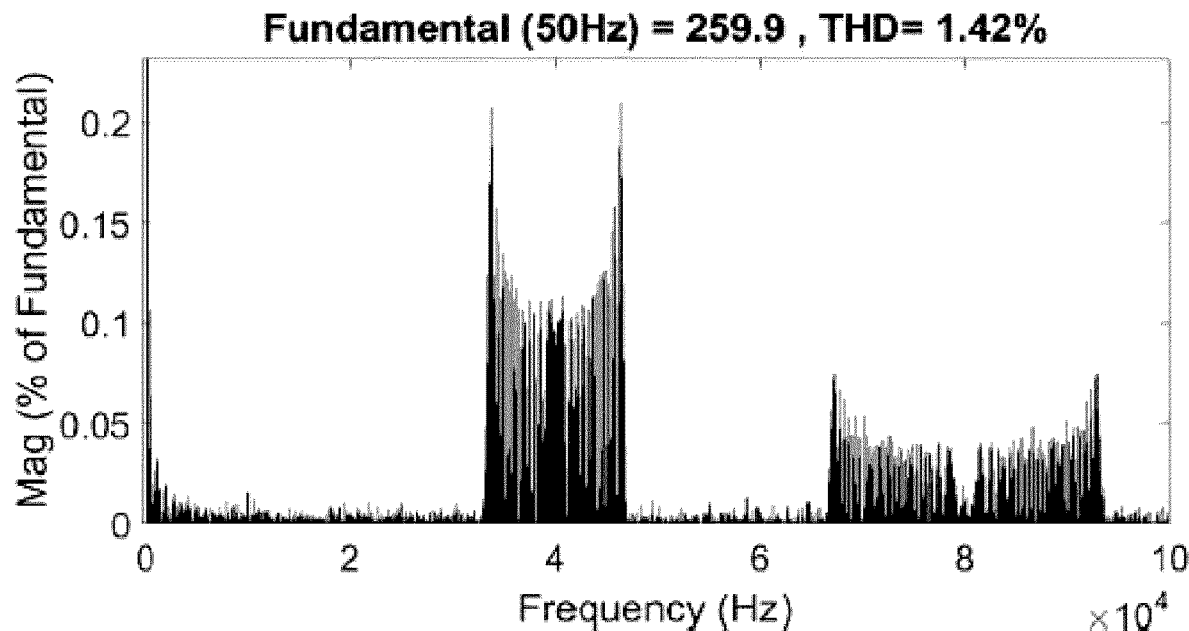
FIGS. 14A and 14B each illustrate an FFT analysis of the power converter circuit of FIG. 8.
Figure 14B:
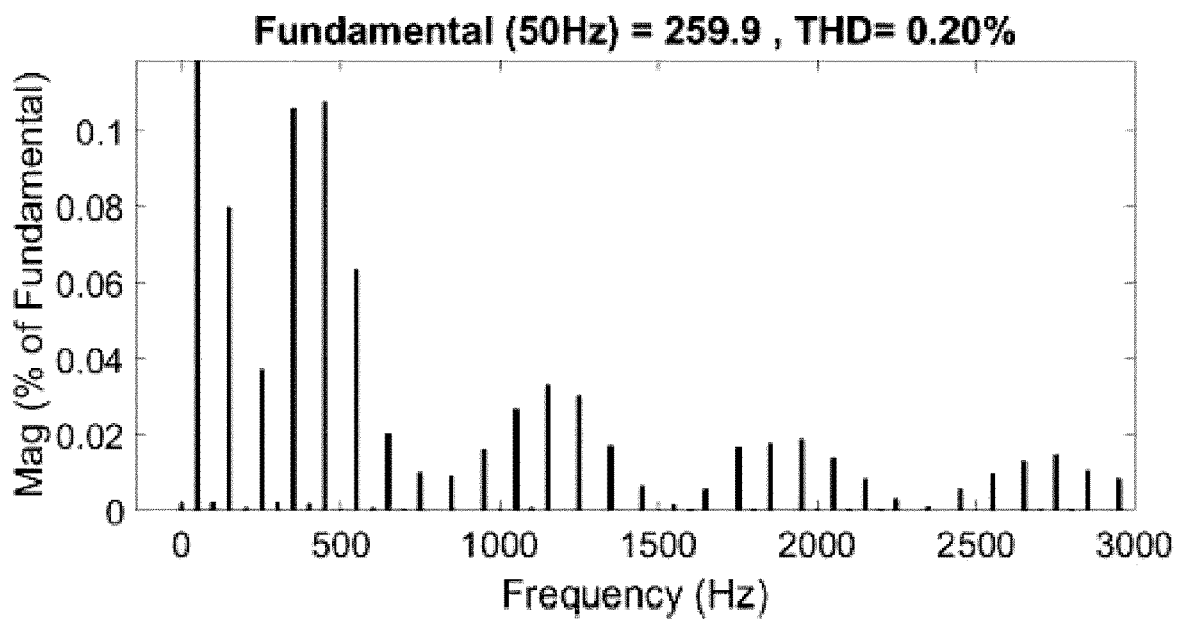

A VLMMs modified reference voltage waveform generator 902 is used to provide a modified reference waveform from the input reference signal MI×sin($\omega_r$t). The modified reference waveform is decomposed to minor voltage levels for the two VLMMs $110_1$, $110_2$ by two switching pattern generator $140_1$' and $140_2$' and the PWM comparison module 904. The PWM comparison module 904 compares the input reference signal to a plurality of reference levels to generate VLMMs reference signals $V_{ref-1st-VLMM}$ and $V_{ref-2nd-VLMM}$. The VLMMs reference signals $V_{ref-1st-VLMM}$ and $V_{ref-2nd-VLMM}$ provide minor voltage levels between major voltage levels of the MLI 120. The VLMMs reference signals $V_{ref-1st-VLMM}$ and $V_{ref-2nd-VLMM}$ are generated in a similar manner to the MLI reference signal, as described in relation to FIG. 4A. The VLMMs reference signals $V_{ref-1st-VLMM}$ and $V_{ref-2nd-VLMM}$ are applied to each VLM $110_1$, $110_2$ based on the proposed switching pattern generator described in relation to FIG. 6 to provide switching signals ($S_{1st-VLMM}1, \overline{S_{1st-VLMM}1}, \ldots, S_{1st-VLMM}3, \overline{S_{1st-VLMM}3}$) and ($S_{2nd-VLMM}1, \overline{S_{2nd-VLMM}1}, \ldots, S_{2nd-VLMM}3, \overline{S_{2nd-VLMM}3}$). As presented in FIG. 12A, for a 5-level MLI 120, the achieved $V_{ref-Main-MLL}$ reference signal provides major levels of the Q2-MLI output voltage. Moreover, the low-voltage VLMMs reference signals provide minor voltage levels between major voltage levels of MLI 120. The attained $V_{ref-1st-VLMM}$ and $V_{ref-2nd-VLMM}$ reference signals which are depicted in FIGS. 12B and 12C, generate low-voltage minor voltage levels of the Q2-MLI output voltage having 85 levels. Finally, obtained $V_{ref-Main-MLI}$ is applied to MLI switching pattern generator 130 to provide ($S_{Main-MLI}1, \overline{S_{Main-MLI}1}, \ldots, S_{Main-MLI}3, \overline{S_{Main-MLI}3}$) switching signals. Also, $V_{ref-1st-VLMM}$ and $V_{ref-2nd-VLMM}$ reference signals are applied to each VLMM proposed switching pattern generator $140_1$', $140_2$' to provide ($S_{1st-VLMM}1, \overline{S_{1st-VLMM}1}, \ldots, S_{1st-VLMM}3, \overline{S_{1st-VLMM}3}$) and ($S_{2nd-VLMM}1, \overline{S_{2nd-VLMM}1}, \ldots, S_{2nd-VLMM}3, \overline{S_{2nd-VLMM}3}$) switching signals. The output voltage of PUC5 MLI $120_5$, the 2 low-voltage VLMMs $110_1$, $110_2$ and the Q2-PUC converter $100_6$ for MI=0.99 are illustrated in FIGS. 13A to 13D. As shown in FIGS. 13A, 13B and 13C, the PUC5 MLI converter $120_5$ works at 50 Hz with peak-to-peak voltage of 400 V whereas the first low-voltage VLMM converter $110_1$ operates at low frequency with peak-to-peak voltage of 100V and the second added low-voltage VLMM converter $110_2$ operates at switching frequency with peak-to-peak voltage of 25V. FIG. 13D depicts the staircase output voltage of the Q2-PUC $100_6$ converter with peak-to-peak voltage of 525 V. The FFT analysis of the Q2-PUC $100_6$ converter output voltage is shown in FIGS. 14A and 14B. As presented in FIGS. 14A and 14B, the output voltage THD is 1.42% for Nyquist frequency and only 0.2% for a maximum frequency equal to 3000 Hz.

The Qn-MLI consists of one 5-level MLI as a main MLI and n numbers of VLMMs. The n VLMMs are applied to the main 5 level MLI 120 output to increase the number of output voltage levels. The number of attained Qn-MLI output voltage levels is expressed as $$N_{Qn-MLI} = 5 \times 4^n + 4^{n-1} + 4^{n-2} + \ldots + 1 \tag{23}$$

where $N_{Qn-MLI}$ is the number of output voltage levels of the attained Qn-MLI and n is the number of VLMMs. Based on (23), the number of output voltage levels of Qn-MLI is increased with the n number of the VLMMs. For example, the number of output voltage levels of Q2-MLI by applying 2 VLMMs is obtained as $$N_{Q2-MLI} = 5 \times 4^2 + 4^1 + 1 = 85 (n=2) \tag{24}$$

The number of output voltage levels of Q3-MLI by applying 3 VLMMs is obtained as $$N_{Q3-MLI} = 5 \times 4^3 + 4^2 + 4^1 + 1 = 341 (n=3) \tag{25}$$

Moreover, in the Qn-MLI, the main MLI 120 operates at converter nominal voltage (E) and fundamental frequency (low frequency) whereas the first VLMM $110_1$ works at low voltage which is $$\frac{E}{4^1}$$

and low frequency, and also the second VLMM $110_2$ operates at $$\frac{E}{4^2}$$

and low frequency. The (n−1)$^{th}$ VLMM operates at $$\frac{E}{4^{(n-1)}}$$

and low frequency and the n$^{th}$ VLMM operates at $$\frac{E}{4^n}$$

and switching frequency. Hence, only the n$^{th}$ VLMM operates at switching frequency and the MLI 120 and other VLMMs operate at low frequency. The proposed n numbers of low-voltage VLMMs generate additional minor voltage levels between major voltage levels of the main MLI 120 which leads to an increase in the number of Qn-MLI output voltage levels. In accordance with an embodiment, all of semiconductors and power supply of low-voltage VLMMs work at low voltage and power. In accordance with an embodiment, the DC-link voltage and power of the applied low-voltage VLMMs are only the fraction of the main MLI 120 DC-link voltage and power. Accordingly, in accordance with an embodiment, the output voltage quality of Qn-MLI is improved by the increase in the output voltage levels whereas the low extra cost and size are imposed on the main MLI.

By implementing two VLMM 110 as described herein, in accordance with an embodiment, the number of voltage levels is at least increased by factor of 17. In generalized configuration of Qn-MLIs using n number of VLMMs, the number of output levels as a function of the number of VLMMs used may be represented as: $N_{Qn\text{-}MLI}=5\times 4^n+4^{n-1}+4^{n-2}+\ldots+1$, where $N_{Qn\text{-}MLI}$ is the number of output voltage levels of the attained Qn-MLI and n is the number of VLMMs. In accordance with an embodiment, when a 5-level MLI is used with one VLMM 110, the number of output levels is 21. In accordance with an embodiment, when a 5-level MLI is used with two VLMMs, the number of output levels is 85. In accordance with yet another embodiment, when a 5-level MLI is used with three VLMMs, the number of output levels is 341.

In accordance with an embodiment, the Qn-MLI, the main multilevel inverter operates at a DC voltage level and first VLMM operates at ¼ of the DC voltage level, and also second VLMM operates at ¹⁄₁₆ of the DC voltage level. The (n−1)$^{th}$ VLMM operates at $$\frac{1}{4^{(n-1)}}$$

of the DC voltage level and the n$^{th}$ VLMM operates at $$\frac{1}{4^n}$$

of the DC voltage level.

In accordance with an embodiment, the Qn-MLI, the main multilevel inverter operates at a DC current level and first VLMM operates at ¼ of the DC current level, and also second VLMM operates at ¹⁄₁₆ of the DC current level. The (n−1)$^{th}$ VLMM operates at $$\frac{1}{4^{(n-1)}}$$

of the DC current level and the n$^{th}$ VLMM operates at $$\frac{1}{4^n}$$

of the DC current level.

In accordance with an embodiment, the Qn-MLI, the main multilevel inverter operates at a DC power level and first VLMM operates at ¹⁄₁₆ of the DC power level, and also second VLMM operates at ¹⁄₂₅₆ of the DC power level. The (n−1)$^{th}$ VLMM operates at $$\frac{1}{4^{2(n-1)}}$$

of the DC power level and the n$^{th}$ VLMM operates at $$\frac{1}{4^{2n}}$$

of the DC power level.

Generated Voltage Levels and Operating DC Voltages of MLI and VLMM

In general, if the MLI generates a number of M voltage levels and the VLMM is a N-fold VLMM, the VLMM receiving an output of the MLI generates M×N+1 voltage levels, where N is at least four. Accordingly, if the number of series-connected N-fold VLMMs is m, the number of output voltage levels of the attained converter is $M\times N^m + N^{m-1}+N^{m-2}+\ldots+1$. In more general terms, if the number of series-connected N-fold VLMMs is m, the number of output voltage levels of the attained converter is $M\times N^m + \Sigma_{k=0}^{m-1} N^k$. Notice that the power source of the k$^{th}$ VLMM operates at a voltage of $1/(N^{(k-1)}\times(M-1))$ of the MLI DC voltage, where k=1 tom is the index of series-connected VLMMs as presented in FIG. 8. In one embodiment, the VLMM has two low frequency switches such as S1 and S4 of VLMM 110 in FIGS. 7A to 7E, such as J and J' of VLMM 110 in FIG. 7F, or such as S1stVLMM1, S1stVLMM1' of VLMM 110₁ and S2ndVLMM1, S2ndVLMM1' of VLMM 110₂ of FIG. 8. The two low frequency switches for each k$^{th}$ VLMM operate at $1/(N^{(k-1)}\times(M-1))$ of the MLI DC voltage. The VLMM also has 2×n high frequency switches such as S2, S3, S5 and S6 of VLMM 110 in FIGS. 7A to 7E, such as S1, S1', S2, S2' of VLMM 110 in FIG. 7F, or such as S1stVLMM2, S1stVLMM2', S1stVLMM3, S1stVLMM3' of VLMM 110₁ and S2ndVLMM2, S2ndVLMM2', S2ndVLMM3, S2ndVLMM3' of VLMM 110₂ of FIG. 8. The k$^{th}$ VLMM also has a number of n−1 capacitors each having a capacitor voltage of $(n-b)/(n\times N^{(k-1)}\times(M-1))$ of the MLI DC voltage level where b=1 to n−1. The high frequency switches for each k$^{th}$ VLMM operate at $1/(n\times N^{(k-1)}\times(M-1))$ of the MLI DC voltage level.

Figure 10:
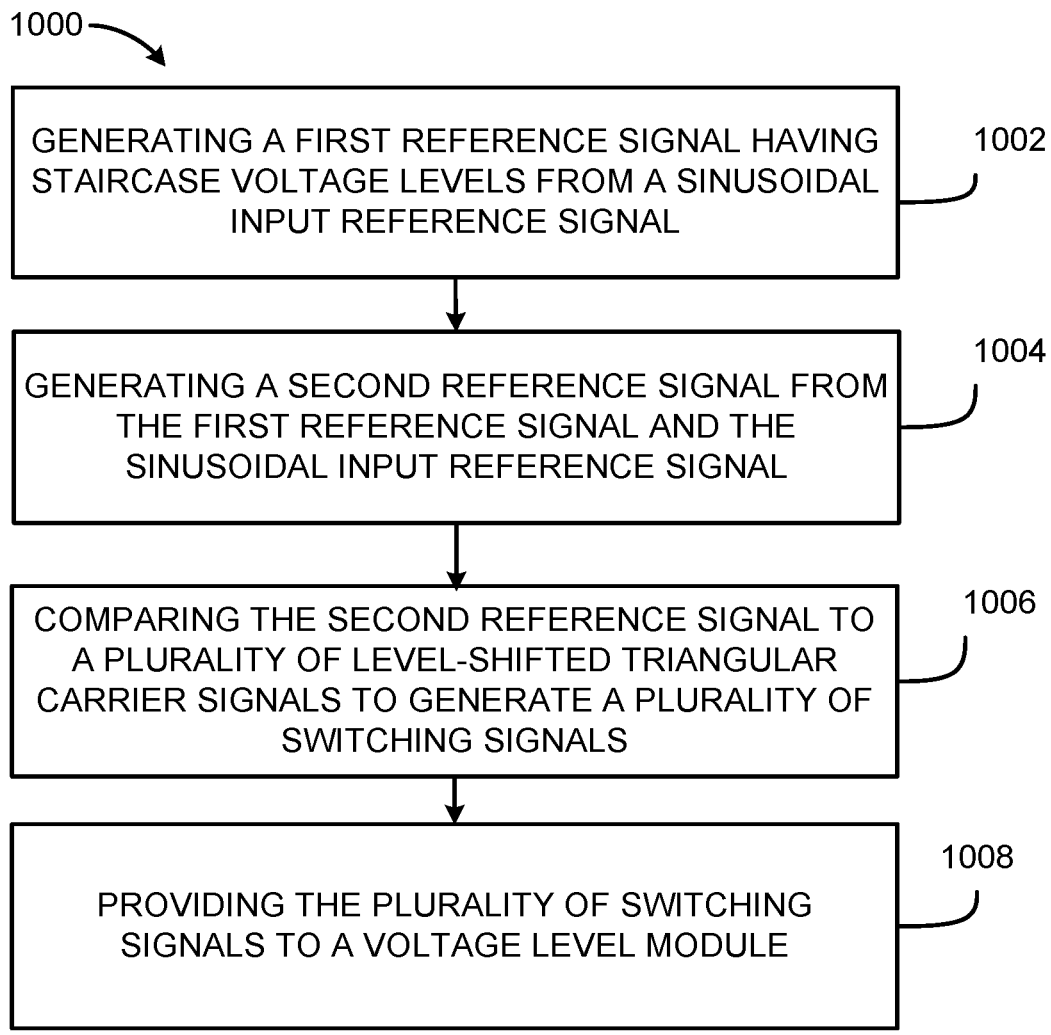
FIG. 10 is a flowchart illustrating an example method for modulating the voltage level multiplier module of FIG. 2, in accordance with an embodiment.

With reference to FIG. 10, there is shown a flowchart illustrating a method 1000 for modulating switching elements 210 of the VLMM 110. At step 1002, the MLI reference signal $V_{ref\text{-}MLI}$ 152 having staircase voltage levels is generated based on level detection of the sinusoidal input reference signal $V_{ref}$ 400. The MLI reference signal $V_{ref\text{-}MLI}$ 152 may be referred to as a "first reference signal". The MLI reference signal $V_{ref\text{-}MLI}$ 152 may be generated as described elsewhere in this document. At step 1004, the VLMM reference signal $V_{ref\text{-}VLMM}$ 154 is generated by subtracting the MLI reference signal $V_{ref\text{-}MLI}$ 152 from the sinusoidal input reference signal $V_{ref}$ 400. The VLMM reference signal $V_{ref\text{-}VLMM}$ 154 may be referred to as a "second reference signal". At step 1006, the VLMM reference signal $V_{ref\text{-}VLMM}$ 154 is compared to a plurality of level-shifted triangular carrier signals to generate the plurality of switching signals. Step 1006 may comprise comparing the VLMM reference signal $V_{ref\text{-}VLMM}$ 154 to the plurality of level-shifted triangular carrier signals to generate comparison results and processing the comparison results to generate the plurality of switching signals. In some embodiments, generating the comparison results comprises comparing the VLMM reference signal $V_{ref\text{-}VLMM}$ 154 to a zero value by applying a zero-crossing comparator to generate the comparison results. The comparison results may be for two low-frequency switching elements of the plurality of switching elements 210. The plurality of switching signals may be generated as described elsewhere in this document. At step 1008, the plurality of switching signals are provided to the VLMM 110, each of the plurality of switching signals for controlling a given one of a the plurality of switching elements 210 of the VLMM 110. In some embodiments, the method 1000 further comprises sensor-less balancing a voltage of n−1 capacitors according to the plurality of switching signals.

The proposed VLMM 110 multiplies the number of output voltage levels of the main multilevel inverter 120 at least by four whereas in conventional hybrid multilevel inverters the number of output voltage levels of the associated inverters are only added together. Hence, the number of output voltage levels attained with the power converter circuit 100 is increased by a multiplicative factor n provided by the VLMM 110.

Moreover, in accordance with an embodiment, the number of high frequency switches is reduced in the power converter circuit 100 and also the manufacturing cost and size of the power converter circuit 100 is decreased, when compared to a conventional hybrid multilevel inverter.

When the proposed decomposed modulation method is applied to the power converter circuit 100, the reference signals of the MLI 120 and of the VLMM 110 are decomposed. Moreover, with the proposed decomposed modulation method, a self-balancing of the capacitor voltage is achieved in the VLMM 110. In accordance with an embodiment, the MLI 120 decomposed reference voltage comprises the 5-level stepped staircase waveform and the VLMM 110 decomposed reference voltage comprises the 5-level staircase PWM waveform.

Two switching methods have been proposed to control and provide the switching signals of VLMM 110.

The first modulation method is produced by the VLMM switching pattern generator 140 as presented in FIG. 4A. The VLMM switching pattern generator 140 is a sensor-less controller of the VLMM 110. The switching signals are provided based on a phase disposition PWM (PDPWM) modulation method. The VLMM reference voltage is compared with four level-shifted triangular carrier signals ($452_1$, $452_2$, $452_3$ and $452_4$). Then, the PWM comparisons outputs are applied to a sensor-less control method implemented by the logic gates 454 and six possible switching states are produced. The desired switching state is selected from the possible six switching states by the switching states table 458.

The second proposed modulation method is produced by the VLMM switching pattern generator 140', as presented in FIG. 6. The VLMM switching pattern generator 140' is a sensor-less controller of the VLMM 110 which allows the capacitor size of the VLMM to be decreased providing fast transient response and improving the output voltage frequency spectrum. The fast transient response is achieved by the decreased capacitor size. The improved output voltage frequency spectrum is achieved by shifting the first switching harmonic cluster to twice of the switching frequency. The switching signals 145 are provided based on a combined phase-shifted PDPWM modulation method and logic gates. The VLMM reference voltage is compared with four phase-shifted and level-shifted triangular carrier signals ($652_1$, $652_2$, $652_3$ and $652_4$). Then, the PWM comparisons outputs are applied to logic gates 654 to directly provide six switching signals for power switches. In the second proposed method, the switching states table 458 is not required and the sensor-less algorithm is implemented by the logic gates 654. Hence, the second proposed modulation method is simpler and faster than the first modulation method. However, the first modulation method allows to provide switching signals when the VLMM reference signal is staircase stepped voltage. As presented in FIG. 13B, the staircase stepped reference signal is applied to VLMM when more than one VLMM are used. Generating low-frequency staircase stepped voltage does not require fast transient response and the proposed PDPWM in first modulation method provides better staircase stepped output voltage in comparison with the second proposed modulation method.

By applying the second proposed modulation method with generator 140', the VLMM 110 capacitor size is deceased by factor of $R_C = f_{sw}/f_1$, in comparison with the first modulation method provided by the generator 140.

Employing the second proposed modulation method leads to doubling the first switching harmonic cluster of the VLMM output voltage. Hence, the first switching harmonic cluster of the VLMM output voltage is at $2 \times f_{sw}$ which allows to improving the output voltage frequency spectrum and decrease the output LC filter size.

The proposed VLMM 110 can be applied to all 5 level multilevel converters (such as the neutral-point-clamped (NPC), the flying capacitor (FC) and its sub-topology named as stacked multi-cell (SM), the cascaded H-bridge (CHB), and the modular multilevel (MM) converters) without any modifications on the switches and other components of the mentioned 5-level multilevel converters. The proposed VLMM 110 is applied at the output of the 5 level converter 120 and the reference voltage ($V_{ref\text{-}MLI}$) of the 5 level converter control system 404 is modified. Hence, the modification cost is low and the attained converter 100 with the proposed VLMM 110 is advantageously modular.

The voltage diversity, voltage rating and stored energy of costly and bulky capacitors and isolated DC power supplies in the power converter circuit 100 is decreased. Moreover, modularity and integrity of the power converter circuit 100 by using the proposed VLMM 110 and generator 140 or 140' is increased.

Various types of 21-level Q-MLIs (i.e., the power convert circuit 100) such as Q-NPC, Q-CHB, Q-SM (Q-FCM), Q-ANPC and Q-PUC are achieved by applying the low-voltage VLMM 110 to conventional 5-level MLIs 120. In accordance with an embodiment, the proposed VLMM 110 quadruples the number of voltage levels provided by the main 5-level MLI 120. In accordance with an embodiment, the VLMM 110 generates four minor voltage levels between each major 5 levels of the main MLI 120. The high voltage side 5-level converter generates 5-level stepped staircase output voltage and operates at low frequency with low switching loss whereas the low voltage of the VLMM 110 generates 5-level PWM staircase output voltage and operates and high frequency.

With the Q-MLI 100, the 5-level MLI 120 operates at the nominal DC-link voltage and fundamental frequency. Hence, the high voltage components of the Q-MLI 100 operate at low frequency. As a result, because of their low frequency operation, it is possible to use gate turn-off thyristor (GTO) instead of insulated gate bipolar transistor (IGBT) especially for high power applications which leads to decrease cost and complexity of attained converter.

The low-voltage VLMM operates at low voltage and switching frequency. Therefore, the low-price, high-efficiency, and high-frequency metal-oxide-semiconductor field-effect transistors (MOSFET) may be used for the proposed VLMM 110.

In the 21-level Q-MLIs by using the first proposed switching method, in accordance with an embodiment, the output LC filter inductor size is decreased by factor of 5 in compare to the output LC filter inductor size in the 5-level MLIs.

In the 21-level Q-MLIs by using the second proposed switching method, in accordance with an embodiment, the output LC filter inductor size is decreased by factor of 10 in compare to the output LC filter inductor size in the 5-level MLIs.

In the 21-level Q-MLIs by using the second proposed switching method, in accordance with an embodiment, the output LC filter capacitor size is decreased by factor of 3 in compare to the output LC filter capacitor size in the 5-level MLIs.

The generalized topology of the hybrid Qn-MLI 100 as well as its decomposed modulation method has been described herein. In accordance with an embodiment, the proposed hybrid Qn-MLI 100 consists of one 5-level MLI 120 as a main MLI and n numbers of suggested voltage level multiplier modules (VLMM). The n VLMMs are applied to main 5-level MLI output 122 to increase the number of output voltage levels. In the gained Qn-MLIs, the number of voltage levels of main 5-level MLI and the n proposed VLMMs are multiplied together which leads to an increase in the number of output voltage levels of Qn-MLI, whereas in similar hybrid multilevel inverters the number of output voltage of inverters are added together. Hence, the number of high frequency switches is reduced in attained Qn-MLI and also the cost and size of attained Qn-MLI is decreased. Moreover, voltage diversity, voltage rating and stored energy of costly and bulky capacitors and isolated DC power supplies in attained Qn-MLIs are reduced. Furthermore, power density, modularity, and integrity of the converter by using proposed VLMM is boosted.

Six-Fold Voltage Level Multiplier Module (VLMM)

Figure 15A:
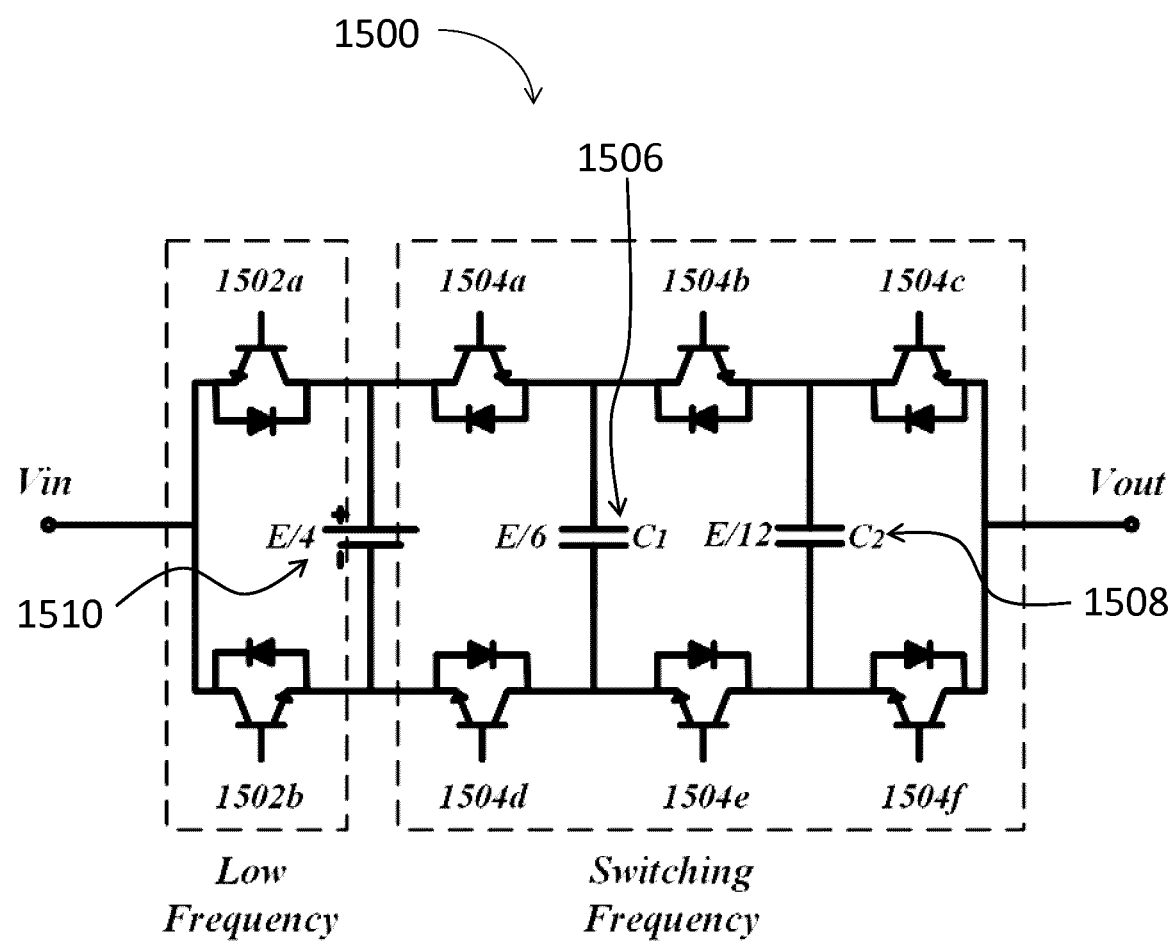
FIG. 15A is a circuit diagram of a six-fold voltage level multiplier module, according to one embodiment.

According to one embodiment, as presented in FIG. 15A, there is a six-fold voltage level multiplier module (VLMM) 1500 for a multilevel inverter (MLI) 120. The VLMM 1500 is a low-voltage power converter module adapted to produce seven voltage levels. When connected to, for instance, a five-level MLI 120 as presented in FIG. 15B, the VLMM 1500 is adapted to generate seven minor voltage levels between each major voltage level produced by the five-level MLI 120. As depicted in FIG. 15A, the proposed VLMM 1500 has two low frequency S1 and S5 switches (1502$a$ and 1502$b$) and six high frequency S2, S3, S4, S6, S7 and S8 switches (1504$a$, 1504$b$, 1504$c$, 1504$d$, 1504$e$, 1504$f$), two capacitors (1506 and 1508) and one DC source 1510 adapted to provide a DC voltage. The DC source 1510 may be a DC link capacitor adapted for connection to a separate independent DC source (e.g., a standard AC/DC converter, a solar photovoltaic module or the like). The DC source 1500 may also be an isolated DC source. The two capacitors (1506 and 1508) may be any suitable DC capacitor. In accordance with an embodiment, a first capacitor 1506 is regulated to two third (⅔) of the voltage level of the DC source 1510 and a second capacitor 1508 is regulated to a third (⅓) of the voltage level of the DC source 1510.

Figure 15B:
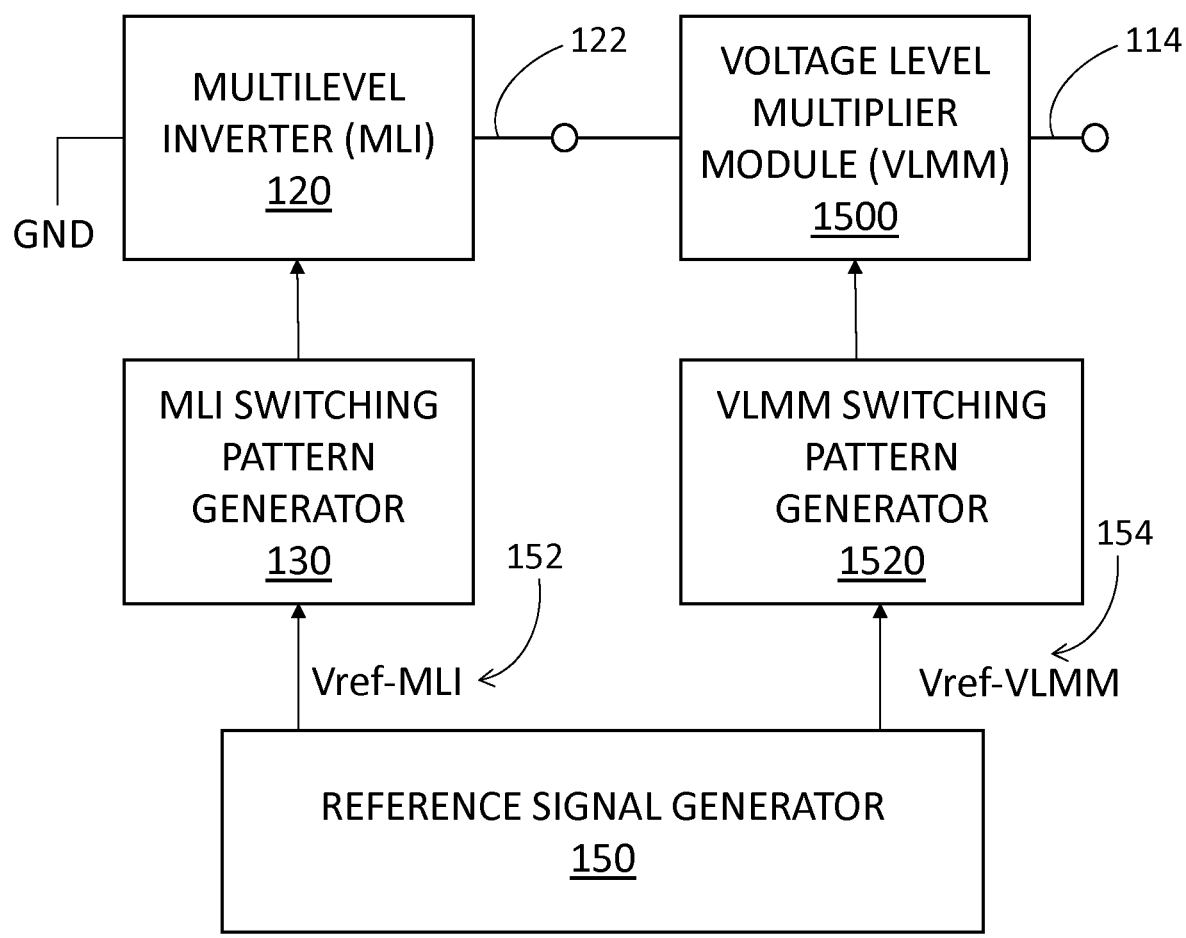
FIG. 15B is a schematic block diagram of an example power converter circuit comprising the six-fold voltage level multiplier module of FIG. 15A for use with the multilevel inverter and being controlled by a VLMM switching pattern generator and a MLI switching pattern generator respectively, in accordance with an embodiment.
Figure 15C:
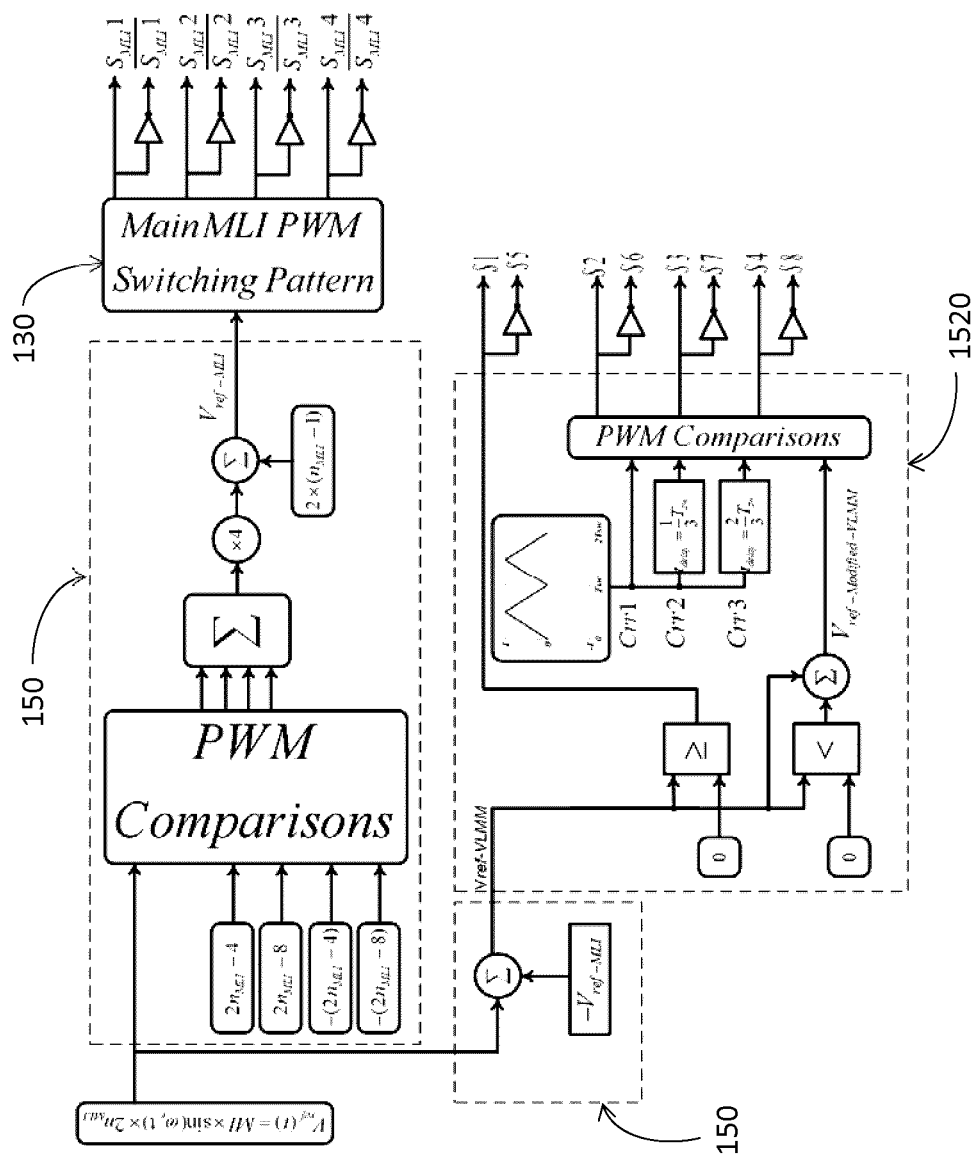
FIG. 15C is a block diagram of a switching pattern generator for use with the six-fold voltage level multiplier module of FIG. 15A, in accordance with an embodiment.

According to one embodiment, as presented in FIG. 15B, the VLMM 1500 is controlled by a VLMM switching pattern generator 1520 that provides switching states for all S1 to S8 switches according to the VLMM reference signal $V_{ref-VLMM}$ signal 154. The VLMM reference signal $V_{ref-VLMM}$ signal 154 is generated by the reference signal generator 150 that is also adapted to generate MLI reference signal $V_{ref-MLI}$ signal 152 for the MLI switching pattern generator 130. The $V_{ref-VLMM}$ signal is generated based on the input reference signal $V_{ref}$ signal 400 subtracted by MLI reference signal $V_{ref-MLI}$ 152. The VLMM switching pattern generator 1520 provides Pulse Width Modulation (PWM) comparisons of the $V_{ref-VLMM}$ signal 154 with triangular carrier signals Crr1, Crr2 and Crr3, as shown in FIG. 15C. Notice that the S1 and S5 switching signals are generated by a zero-crossing comparator of the VLMM reference signal $V_{ref-VLMM}$ signal 154. The S2, S6, S3, S7, S4 and S8 switching signals are generated by a PWM comparison of the VLMM reference signal $V_{ref-VLMM}$ signal 154 with triangular carrier signals Crr1, Crr2 and Crr3. The triangular carrier signals Crr1, Crr2 and Crr3 are defined in the VLMM switching pattern generator 1520 such as to provide a self balancing of the two capacitors (1506 and 1508).

Figure 16A:
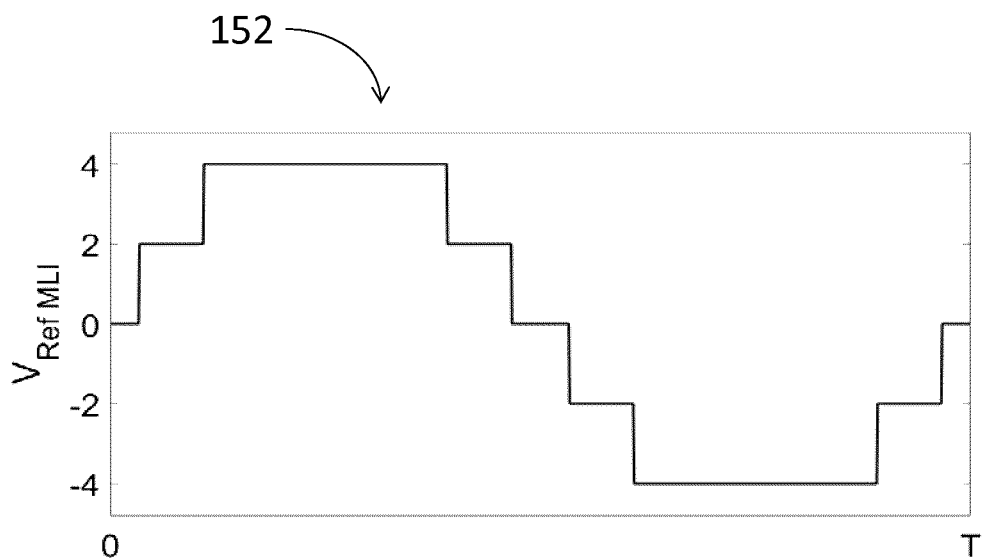
FIGS. 16A and 16B are graphs of a main MLI converter reference signal and a low-voltage six-fold VLMM reference signal, according to one embodiment.
Figure 16B:
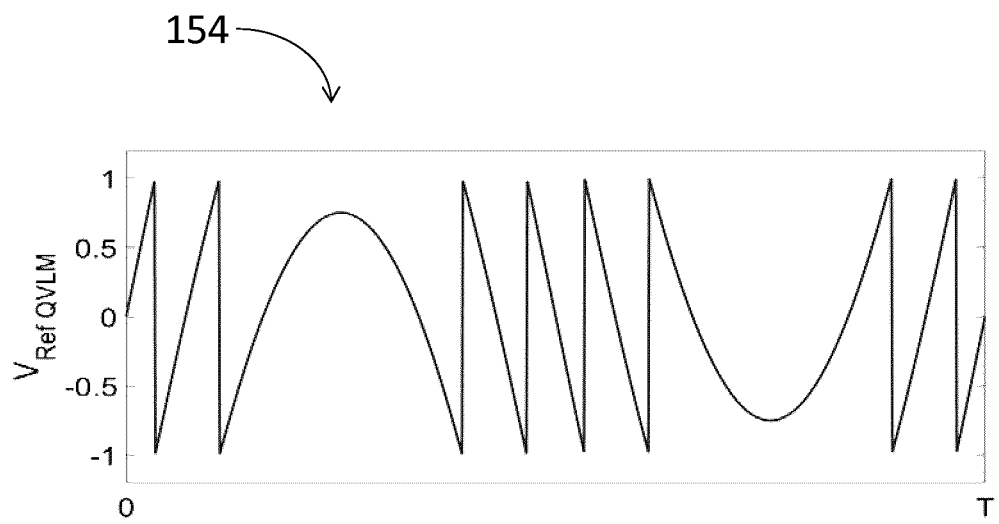

Presented in FIG. 16A is a graph depicting the MLI reference signal $V_{ref-MLI}$ 152 having five stepped voltage levels. In this example, the five stepped voltage levels correspond to 4, 2, 0, −2 and −4, respectively. Accordingly, the MLI reference signal $V_{ref-MLI}$ 152 is a five level low-frequency staircase reference signal. The number of voltage levels and the values of the voltage levels of the MLI reference signal $V_{ref-MLI}$ 152 may vary depending on practical implementations. Moreover, an example of the VLMM reference signal $V_{ref-VLMM}$ 154 is shown in FIG. 16B. In this example, VLMM reference signal $V_{ref-VLMM}$ 154 is defined by a subtraction of the MLI reference signal $V_{ref-MLI}$ 152 from the input reference signal $V_{ref}$ 400 to generate the VLMM reference signal $V_{ref-VLMM}$ 154 having a peak to peak values of −1 to 1.

The $V_{ref-VLMM}$ reference signal 154 is a high-frequency and low-voltage signal. The MLI reference signal $V_{ref-MLI}$ 152 is applied to the MLI switching pattern generator 130 and a five level stepped voltage output signal 122 is generated as presented by graph 1802 of FIG. 18. Based on the five level stepped voltage 122, the VLMM 1500 controlled by the VLMM switching pattern generator 1520 according to the VLMM reference signal $V_{ref-VLMM}$ 154 generates a seven level PWM voltage 1804 between the VLMM output 114 and input 112. An output signal having thirty-one voltage levels is thereby produced at the output 114 of the VLMM, as presented by graph 1806 of FIG. 18. In fact, the VLMM 1500 provides seven minor voltage levels between each major voltage levels of the MLI 120.

The VLMM 1500 is modulated by a modulation method allowing the VLMM 1500 to use capacitors having a relatively small size while providing an improved output voltage frequency spectrum. By applying the VLMM 1500 to the output of a multilevel converter topology such as to one of the MLIs ($120_1$ to $120_5$) as concurrently presented FIGS. 7A to 8 or any other suitable MLI 120 topology, the voltage levels of the MLI-output 122 is multiplied by six. Moreover, the six-fold VLMM 1500 operates at low voltage and at low power in comparison with the nominal voltage and power of the MLI 120. Hence, the multiplication of the number of voltage levels of the MLI-output 122 by six with the VLMM 1500 is possible at a low extra cost and size. Moreover, the number of extra components such as power supplies, semiconductors, and capacitors is relatively low. In addition, by applying a suitable modulation method to, for instance, the five-level MLI 120 and to the proposed VLMM 1500 the output voltage frequency spectrum of the VLMM 1500 is improved. Notice that in comparison with conventional converters, the VLMM 1500 does not require a large auxiliary capacitor and a closed-loop control loop to regulate the auxiliary capacitor voltage. Indeed, the modulation method applied to the VLMM 1500 allows voltage self-balancing of both capacitors (1506 and 1508). Moreover, the capacitors of the VLMM 1500 have a smaller size in comparison with the capacitors of the conventional seven-level PUC (PUC7) topology. In fact, with the VLMM 1500, the control complexity is relatively low, the capacitors and if required output LC filter is relatively small and can be purchased at a relatively low cost. Moreover, the dynamic and steady state performance of the attained hybrid converter 100 is improved.

Figure 17:
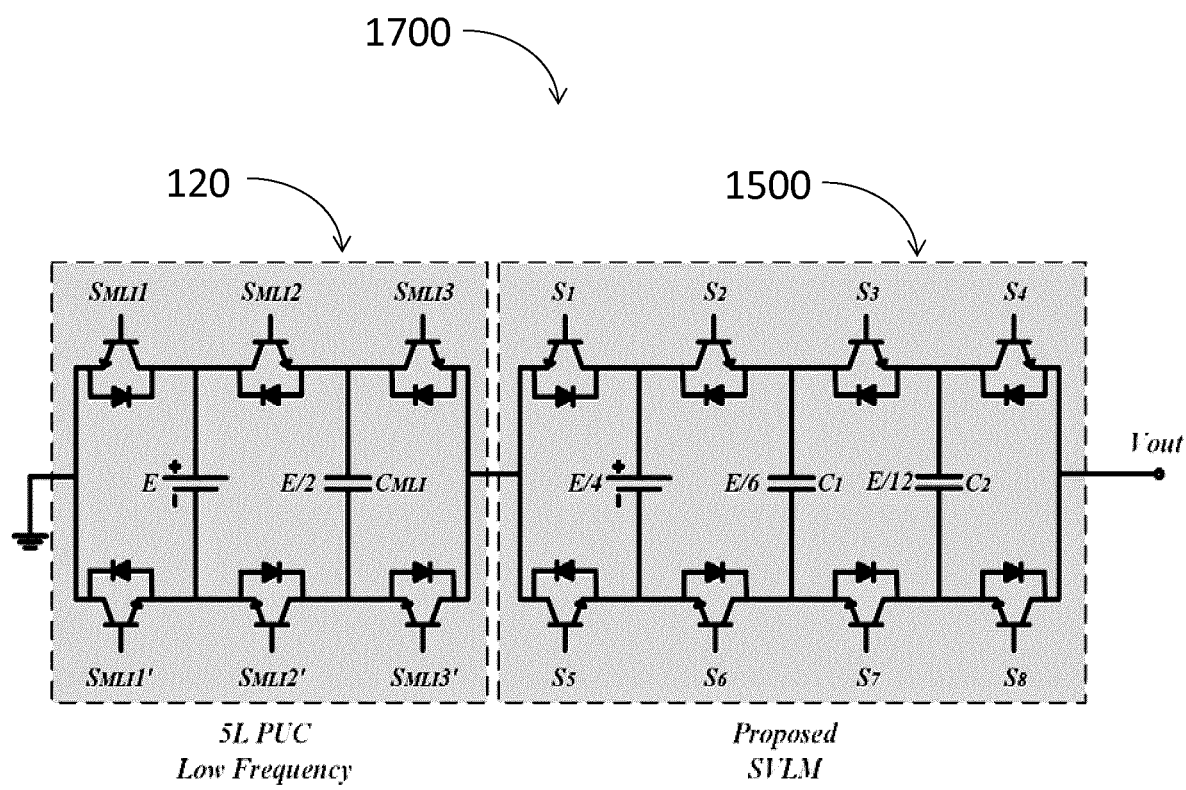
FIG. 17 is a circuit diagram of a six-fold VLMM connected to a five-level PUC converter, adapted to produce thirty-one voltage levels, according to one embodiment.

Presented in FIG. 17, there is an S-PUC 1700 adapted to provide thirty-one voltage levels, according to one embodiment. The S-PUC 1700 has a PUC5 converter as a main five level MLI 120 and the proposed VLMM 1500.

Figure 18:
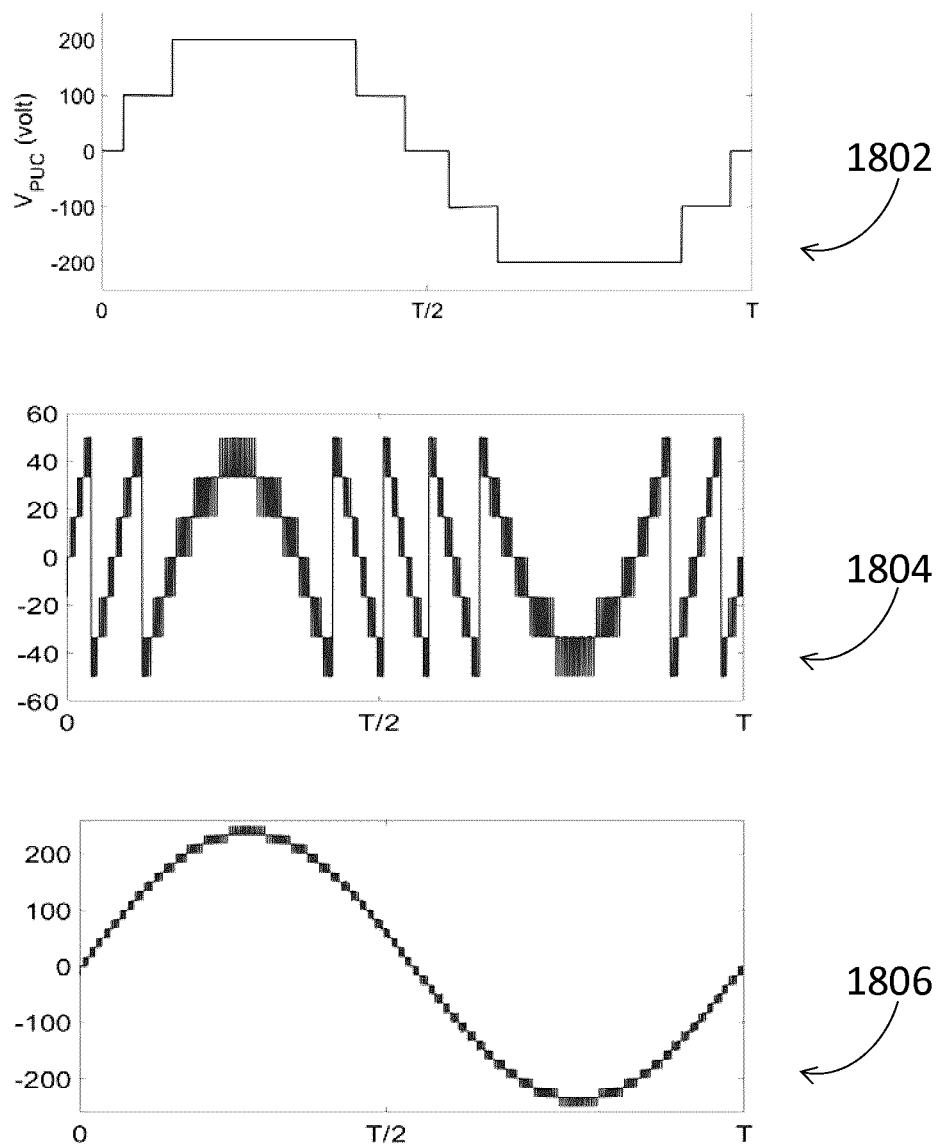
FIG. 18 are graphs of the five-level PUC converter output voltage with respect to a ground, the voltage measured between the output and the input of the six-fold VLMM and the thirty-one voltage levels at the output of the six-fold VLMM connected to the five-level PUC of FIG. 17 with respect to a ground, according to one embodiment.

Presented in FIG. 18 are simulation results using MATLAB/Simulink to evaluate the performances of the proposed thirty-one level S-PUC 1700 as well as its associated modulation method. The five-level output voltage of the MLI 120, the voltage between the VLMM input and output, and the thirty-one level S-PUC 1700 for modulation index: MI=0.9 are illustrated in graphs 1802, 1804 and 1806 respectively. As shown in graphs 1802 and 1804, the PUC5 converter 120 works at fundamental frequency with peak-to-peak voltage of E whereas the added low-voltage VLMM converter 1500 operates at switching frequency with peak-to-peak voltage of $$\frac{E}{4}$$

Graph 1806 depicts the staircase output voltage of the proposed thirty-one S-PUC 1700 with peak-to-peak voltage of $$\frac{5E}{4}.$$

Figure 19:
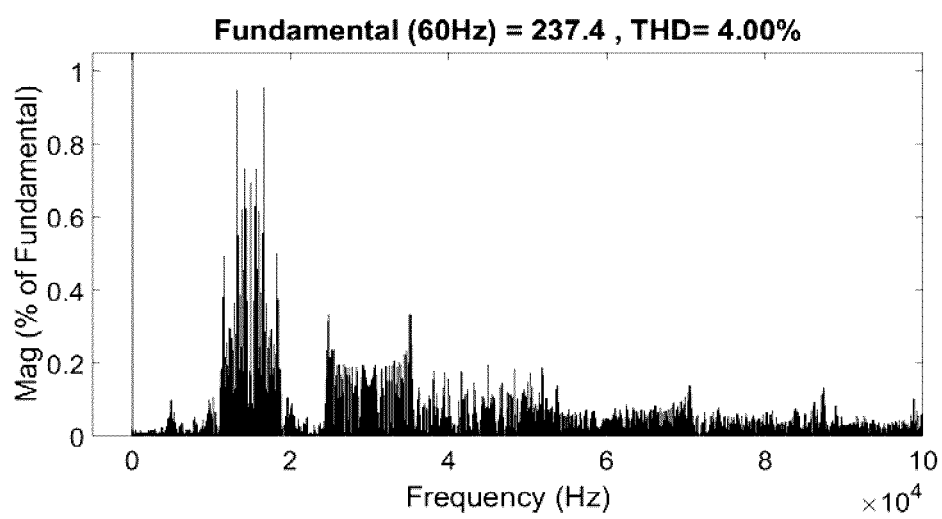
FIG. 19 is a graph of a Fast Fourier Transform of the voltage generated at the output of the six-fold VLMM connected to the five-level PUC of FIG. 17 with respect to a ground, according to one embodiment.

Presented in FIG. 19, there is an FFT analysis of the thirty-one S-PUC converter 1700 output voltage. As depicted, the total harmonic distortion (THD) of the output voltage is 4.00%.

Hence, applying the proposed low-voltage and low-power VLMM 1500 to the PUC-5 converter 120 allows to improve the output voltage waveform and THD at an additional cost and size that are relatively low.

Comparison Between VLMM and PUC7

Figure 20:
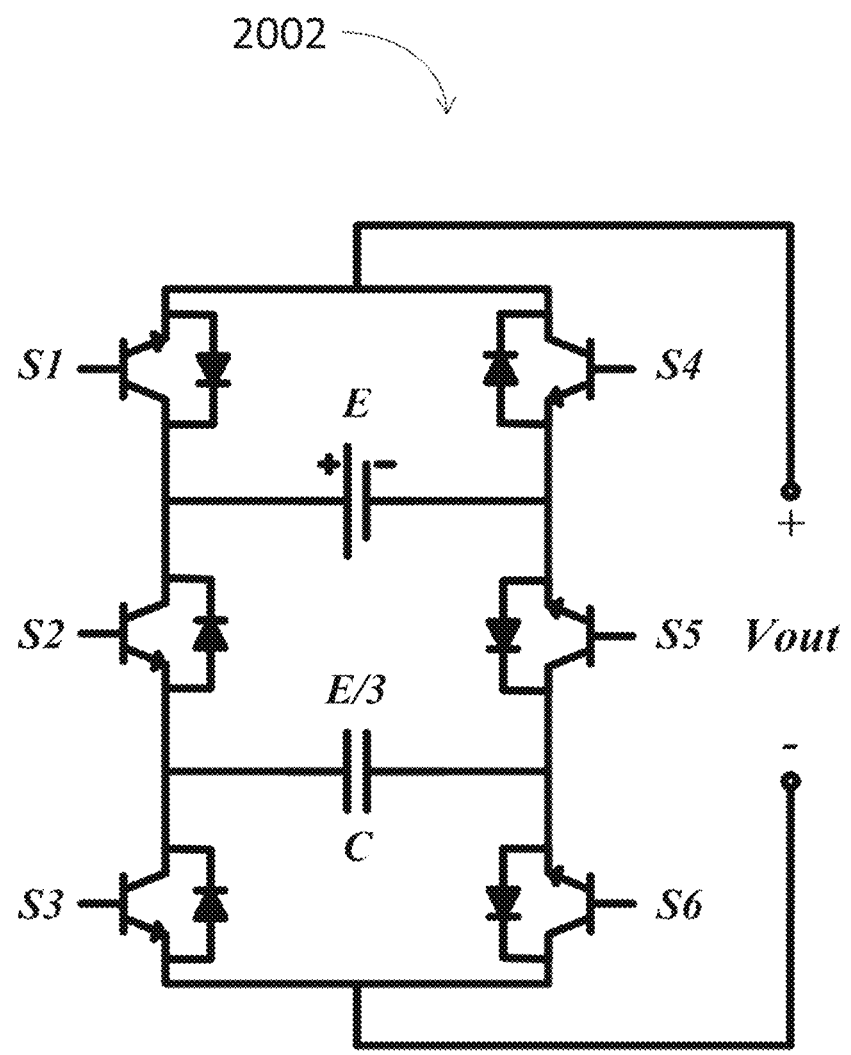
FIG. 20 is a circuit diagram of a prior art single-phase seven-level PUC (PUC7) converter as described in U.S. Pat. No. 9,331,599.

Depicted in FIG. 20, is a prior art single-phase PUC7 converter topology 2002 as described in U.S. Pat. No. 9,331,599. The PUC7 converter 2002 consists of two low frequency and four high frequency switches, one capacitor and one isolated DC source. The capacitor voltage is regulated at ⅓ of the DC source through a closed-loop voltage controller. Though the PUC7 converter 2002 has a lower number of components in comparison with the present S-PUC 1700, the PUC7 converter 2002 requires a high switching frequency, a complicated controller to regulate the capacitor voltage and a large capacitor.

The proposed VLMM 1500 comprises two low frequency and six high frequency switches, two capacitors (1506 and 1508) and one isolated DC source. The suggested modulation method allows the voltage self-balancing of two capacitors (1506 and 1508) without necessitating a closed-loop voltage controller. Moreover, according to one embodiment, the size of the capacitors (1506 and 1508) are small and fast self-balancing of the capacitor's voltage is possible.

Generalized Concept

Figure 21:
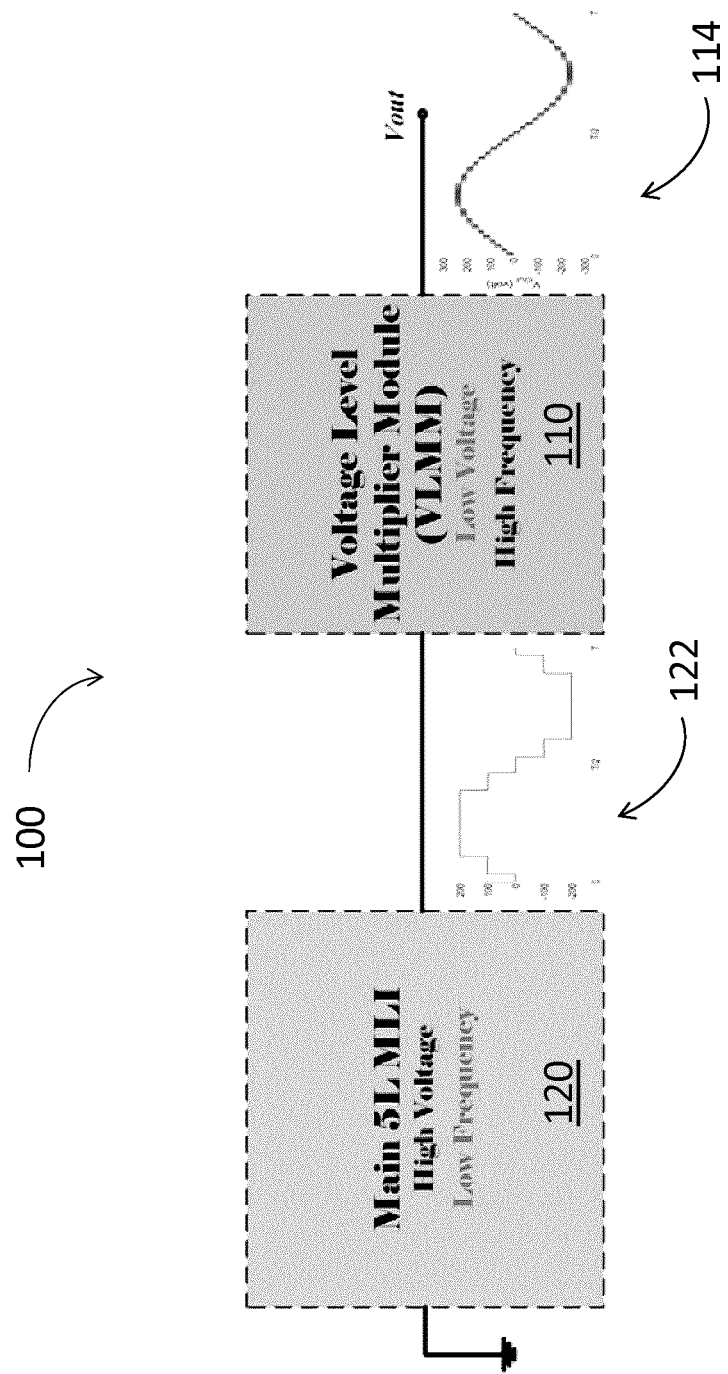
FIG. 21 is a block diagram of the multilevel inverter connected to the voltage level multiplier module with their corresponding outputs, according to one embodiment.

Presented in FIG. 21 are the general features of the Voltage Level Multiplication (VLM) converter 100, according to one embodiment. The converter 100 has a Multilevel Inverter (MLI) 120 and a Voltage Level Multiplier Module (VLMM) 110. The MLI 120 can be any type of MLI, such as MLI converters capable of providing either two-levels, three-levels, five-levels, seven-levels, or any suitable number of levels. The VLMM 110 can be a two-fold, four-fold (quadrupler), six-fold or any other n-fold multiplier module. As can be noticed in FIG. 21, the MLI 120 uses low frequency switching to produces stepped voltage signal 122 having a determined number of major voltage levels. The VLMM uses high frequency switching and provides minor voltage levels between the major voltage levels, in order to produce a cleaner output signal 114.

Figure 22:
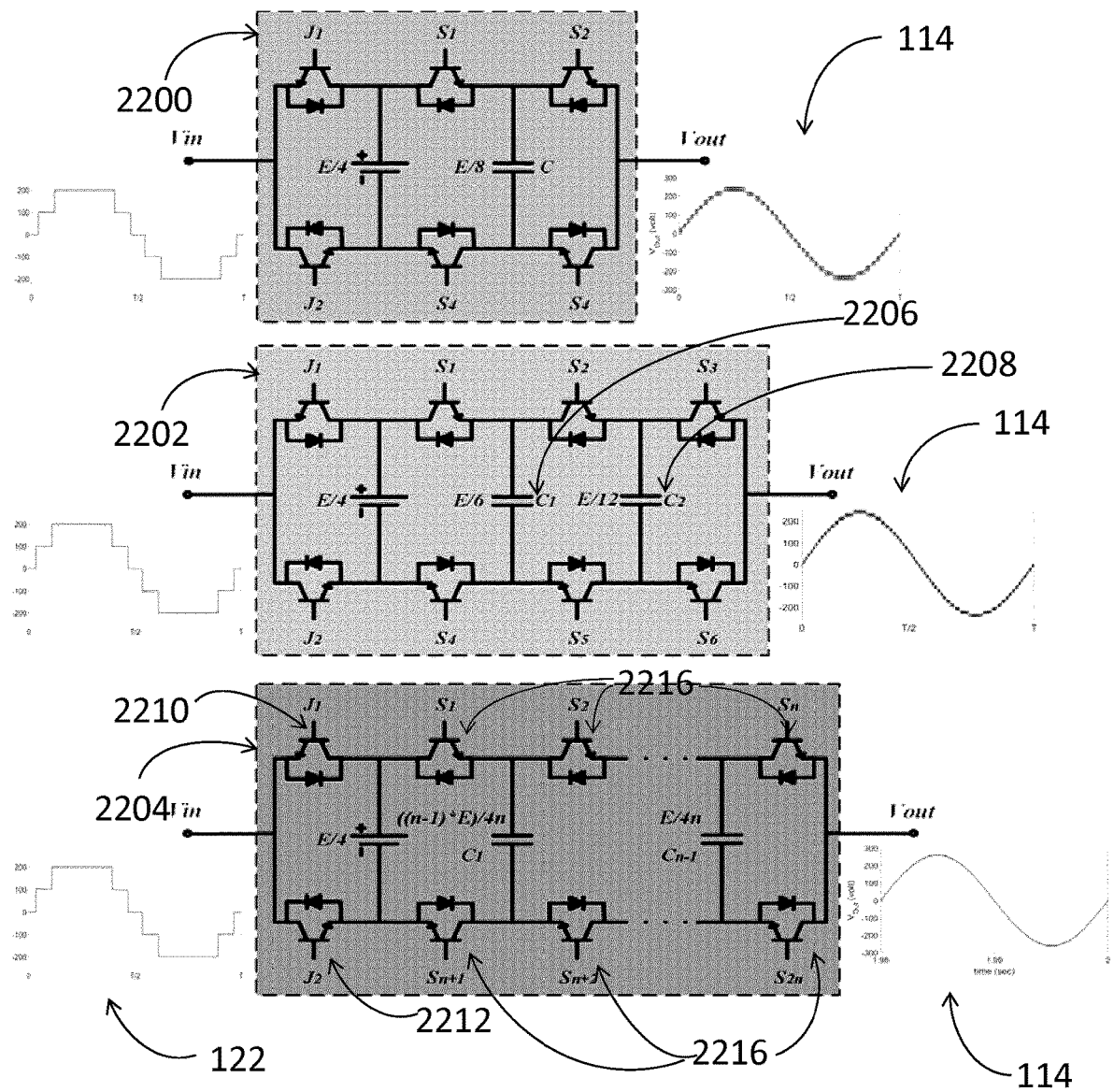
FIG. 22 presents various embodiments of the voltage level multiplier module each producing a respective voltage level multiplication, according to one embodiment.

For instance, presented in FIG. 22 are various output signal 114 provided by the VLM converter 100. Depending on the type of VLMM 110, for a same MLI 120, the accuracy of the output signal 114 differs. As can be noticed, the output signal 114 of a six-fold VLMM 2202 is cleaner or more accurate than the output signal 114 of the four-fold (quadrupler) VLMM 2200. In fact, the greater the number of levels or folds the VLMM can provide, the greater the accuracy of the output signal 114, as shown by the 2n-fold VLMM 2204.

Figure 23A:
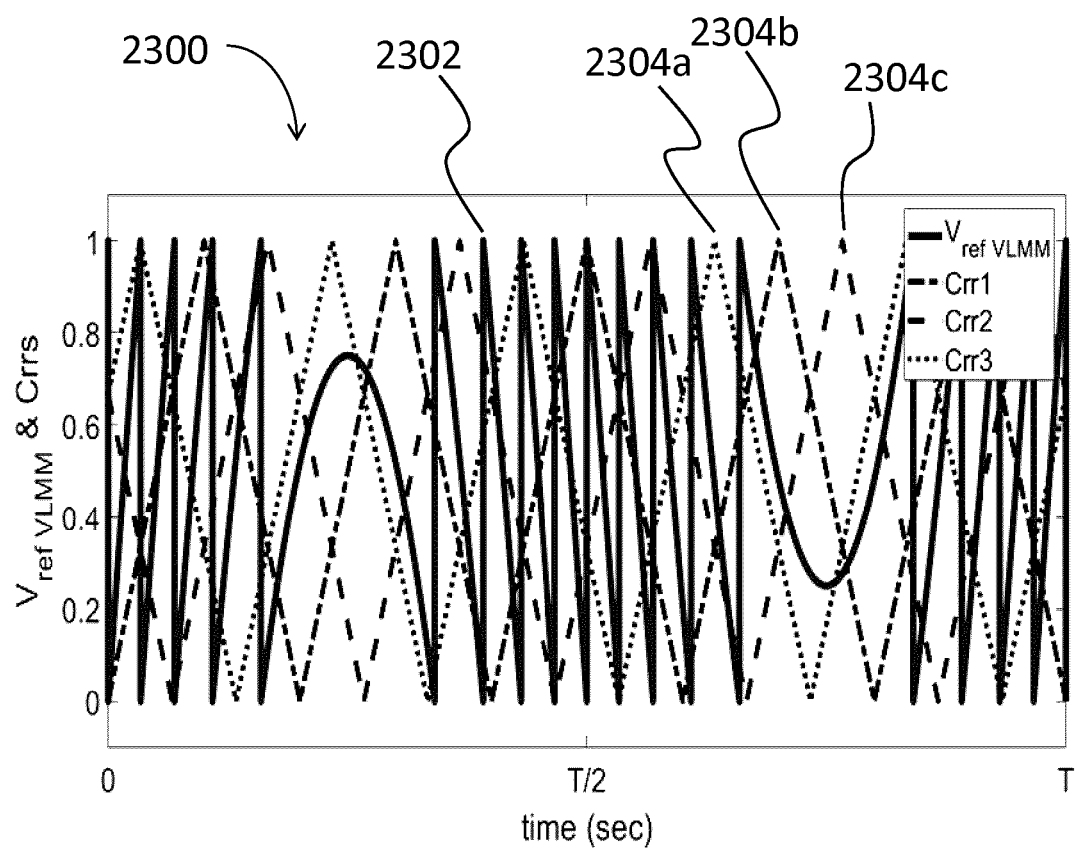
FIG. 23A presents a graph of a VLMM reference signal intersecting with various carrier signals of a VLMM switching pattern generator, according to one embodiment.

In the case of the six-fold VLMM 2202, as further presented in FIG. 22, there is an additional C2 capacitor 2208 with a voltage of E/12 and two power switches S3 and S6 with a voltage of E/12. A switching pattern for the six-fold VLMM 2202 is produced according to the signals 2300 presented in FIG. 23. As can be noticed the switching pattern is produced by a modulation technique that uses a modified reference signal (Vref_VLMM) 2302 and three intersecting triangular carrier signals (2304*a*, 2304*b* and 2304*c*) which are phase shifted by 2π/3. As presented in FIG. 23B, the modified Vref_VLMM 2302 is generated by subtracting from an input reference Vref sine signal 400 a Vref-MLI signal 152 generated by the reference signal generator 150. Pulse Width Modulation (PWM) comparisons are used to compare (or intersect) the Vref_VLMM 2302 with each of three triangular carrier signals 2304*a* (Crr1), 2304*b* (Crr2), and 2304*c* (Crr3). The resulting modulated signals with respect to each triangular carrier signals 2304*a* (Crr1), 2304*b* (Crr2), and 2304*c* (Crr3) are applied to power switch groups (S1, S4), (S2, S5), and (S3, S6), respectively. When applied to the six-fold VLMM 2202, the produced switching pattern provides a self-balancing of the C1 and C2 capacitors' (2206 and 2208) voltage, and capacitors closed-loop voltage controllers are not required.

Figure 23B:
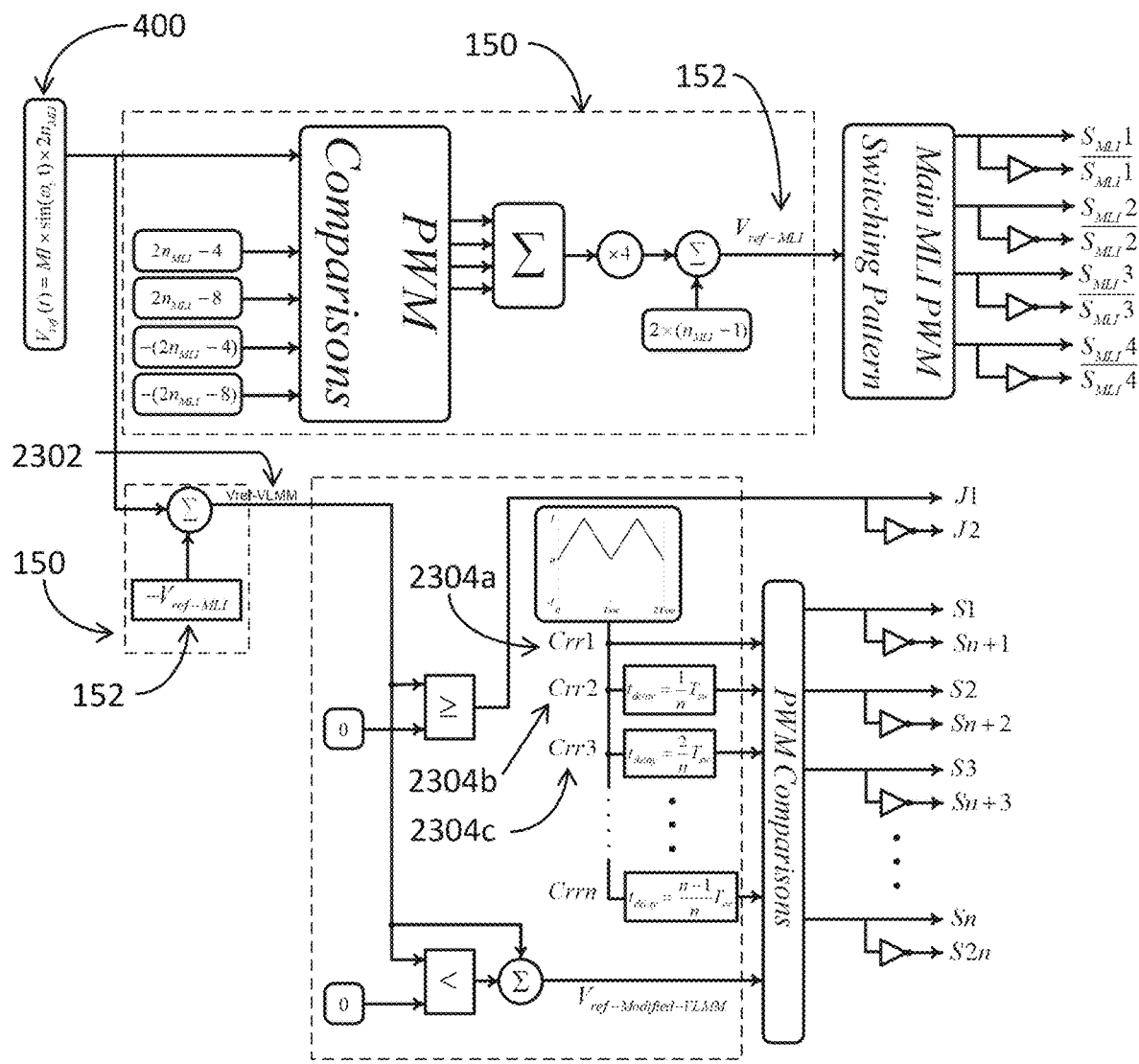
FIG. 23B is a block diagram of a generalised sensor-less switching pattern generator for use with various voltage level multiplier modules, in accordance with an embodiment.

In the case of the generalized topology of 2n-fold VLMM 2204, as further presented in FIGS. 22 and 23B, the VLMM 2204 has two low-frequency J1 and J2 power switches (2210 and 2212), and n high-frequency S1, . . . , Sn power switches 2216. According to one embodiment, the J1 and J2 power switches are operated at five times the fundamental frequency and the additional n high-frequency power switches are operated at a switching frequency determined by the carrier signals of the VLMM modulator. A switching pattern for the 2n-Fold VLMM 2204 is produced corresponding switching signals that are similar to the signals 2300 presented in FIG. 23A. In fact, the switching pattern is produced by a modulation technique that uses the modified reference signal (Vref_VLMM) 2302 and n intersecting triangular carrier signals (Crr1, Crr2, . . . , Crrn) which are phase shifted by 2π/n. The resulting modulated signals with respect to each n triangular carrier signals (Crr1, Crr2, . . . , Crrn) are applied to power switch groups (S1, Sn+1), (S2, Sn+2), . . . , (Sn, S2n), respectively. The switching pattern applied to the 2n-Fold VLMM 2204 allows to provide a self-balancing of all the capacitors' C1 to Cn−1 voltage, and capacitors closed-loop voltage controllers are not required.

Three-Phase H-Bridge Based Converter

Figure 24:
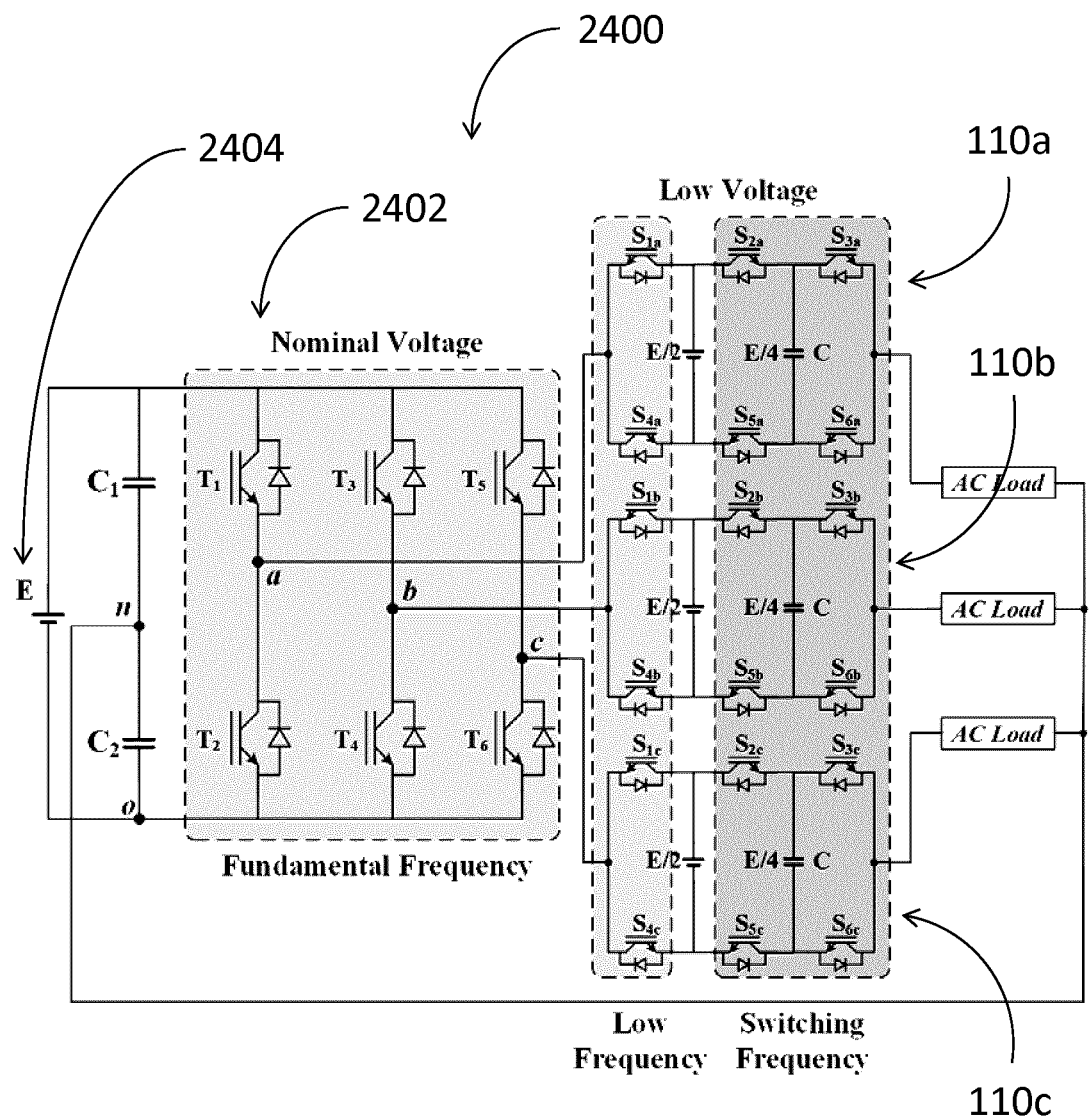
FIG. 24 is a circuit diagram of a three phase converter having three voltage level multiplier modules each connected to a phase voltage output of a three phase H-Bridge inverter, according to one embodiment.
Figure 25:
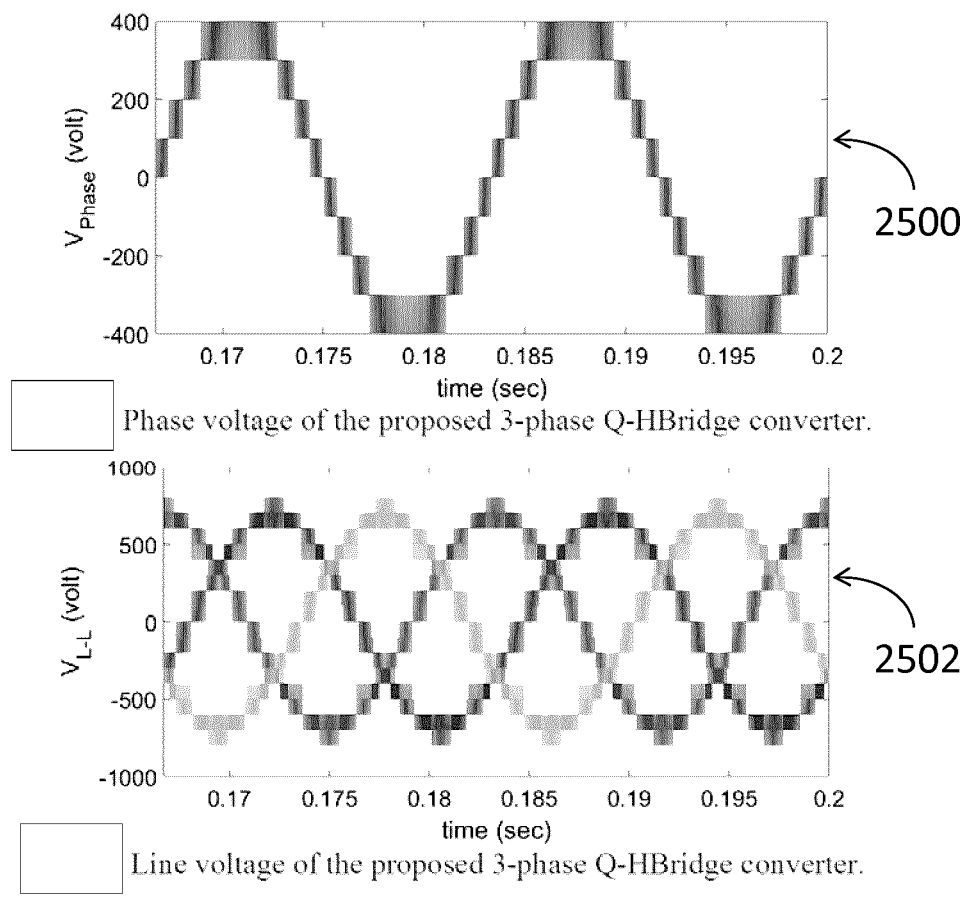
FIG. 25 are graphs of the phase voltage and line voltage of the three phase converter of FIG. 24, according to one embodiment.

In FIG. 24 there is presented a three-phase quadrupled H-Bridge based converter circuit 2400 (Q-HBridge), according to one embodiment. The three-phase Q-HBridge converter 2400 has an MLI 120 that is an H-Bridge inverter 2402. The H-Bridge inverter 2402 is a common three-phase converter for low and medium voltage power electronic converters in industrial applications. As can be noticed, the inverter 2402 has six switches and provides three 2-level inverter outputs a, b and c, where each output has a corresponding output signal. Each 2-level inverter output signal is one of a three-shifted phase and is provided as an input signal to one of three corresponding VLMMs (110a, 110b, 110c). The three-phase converter 2400 is adapted to produce nine voltage levels per phase, as presented in phase voltage graph 2500 of FIG. 25 and seventeen voltage levels per line, as presented in line voltage graph 2502. It is worth mentioning that, according to one embodiment, for a same output 114 voltage amplitude, the required voltage of the main DC link 2404 for the proposed 3-phase Q-HBridge converter is half of the voltage value that would normally be required for a traditional 3-phase 6-switch HBridge converter.

Figure 26:
FIG. 26 is a table presenting a component comparison between the three phase converter of FIG. 24 with various traditional topologies, according to one embodiment.

Presented in FIG. 26, is a table 2600 that presents a comparison between the proposed 3-phase Q-HBridge converter 2400 with various traditional topologies capable of generating nine level phase voltages and seventeen level line voltages. The comparison is provided with respect to the total number of required components.

Three-Phase NPC Based Converter

Figure 27:
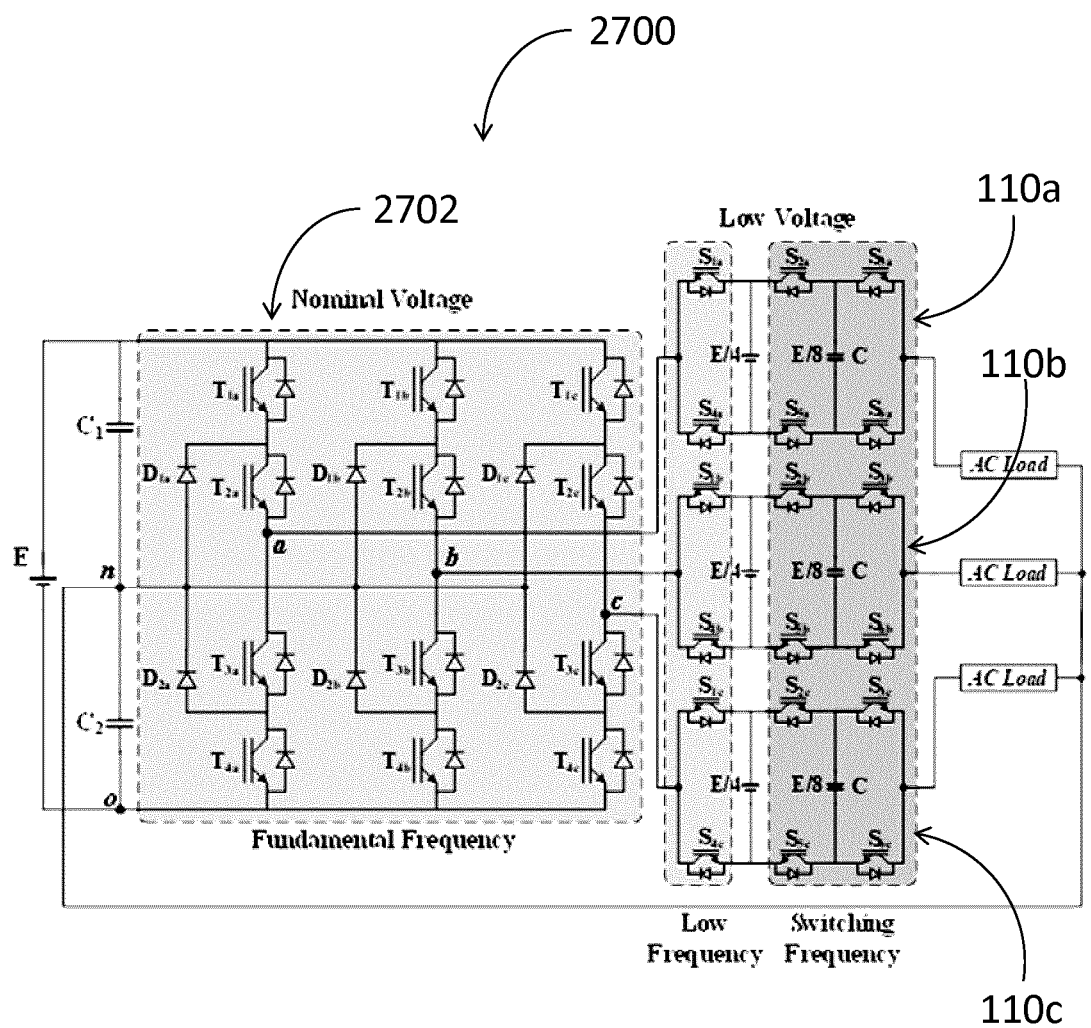
FIG. 27 is a circuit diagram of a three phase converter having three voltage level multiplier modules each connected to a phase voltage output of a three phase NPC multilevel inverter, according to one embodiment.
Figure 28:
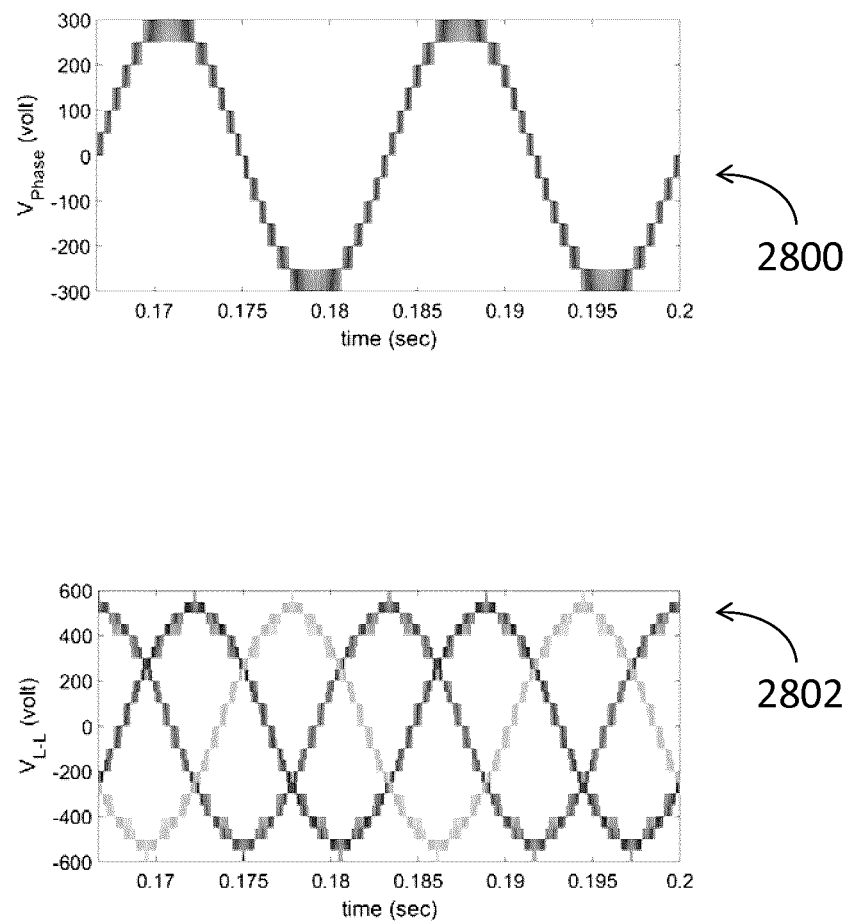
FIG. 28 are graphs of the phase voltage and line voltage of the three phase converter of FIG. 27, according to one embodiment.

In FIG. 27 there is presented a three-phase quadrupled NPC based converter circuit 2700 (Q-NPC), according to one embodiment. The three-phase Q-NPC converter 2700 has an MLI 120 that is an NPC inverter 2702. The NPC inverter 2702 is a common three-phase converter for low, medium and high voltage power electronic converters in industrial applications. As can be noticed, the inverter 2702 has twelve switches and provides three MLI output signals. Each MLI output signal is one of a three-shifted phase and is provided as an input signal to one of three corresponding VLMMs (110a, 110b, 110c). The three-phase Q-NPC converter 2700 is adapted to produce thirteen voltage levels per phase, as presented in phase voltage graph 2800 of FIG. 28 and twenty-five voltage levels per line, as presented in line voltage graph 2802.

Presented in FIG. 29, is a table 2900 that presents a comparison between the proposed 3-phase Q-NPC converter 2700 with various traditional topologies capable of generating thirteen level phase voltages and twenty-five level line voltages. The comparison is provided with respect to the total number of required components.

Three-Phase Quadrupled Five-Level Converters

Figure 30:
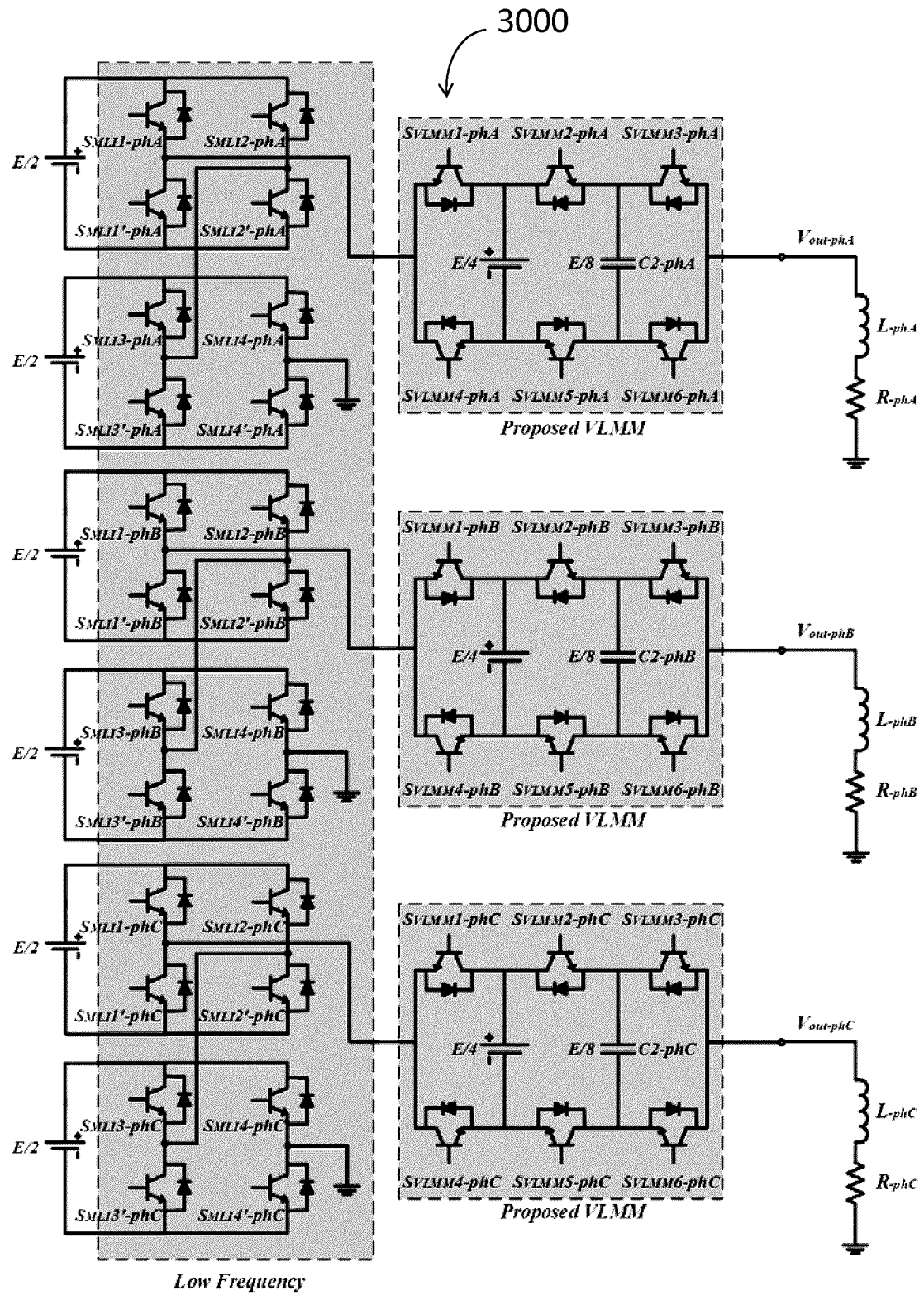
FIGS. 30 to 33 are circuit diagrams of three phase converters having three voltage level multiplier modules each connected to a phase voltage output of a three phase five-level multilevel inverters, according to various embodiments.
Figure 31:
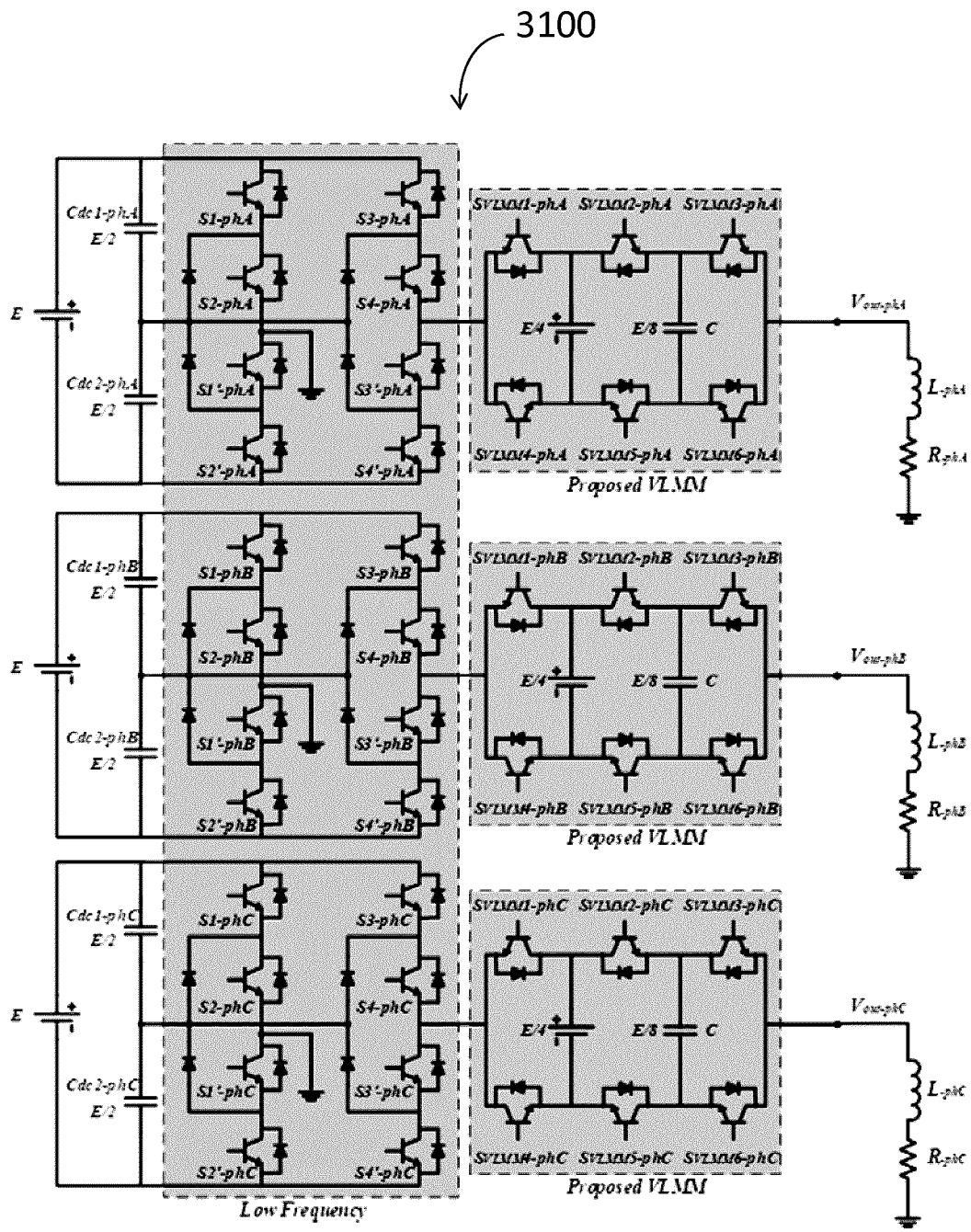
Figure 32:
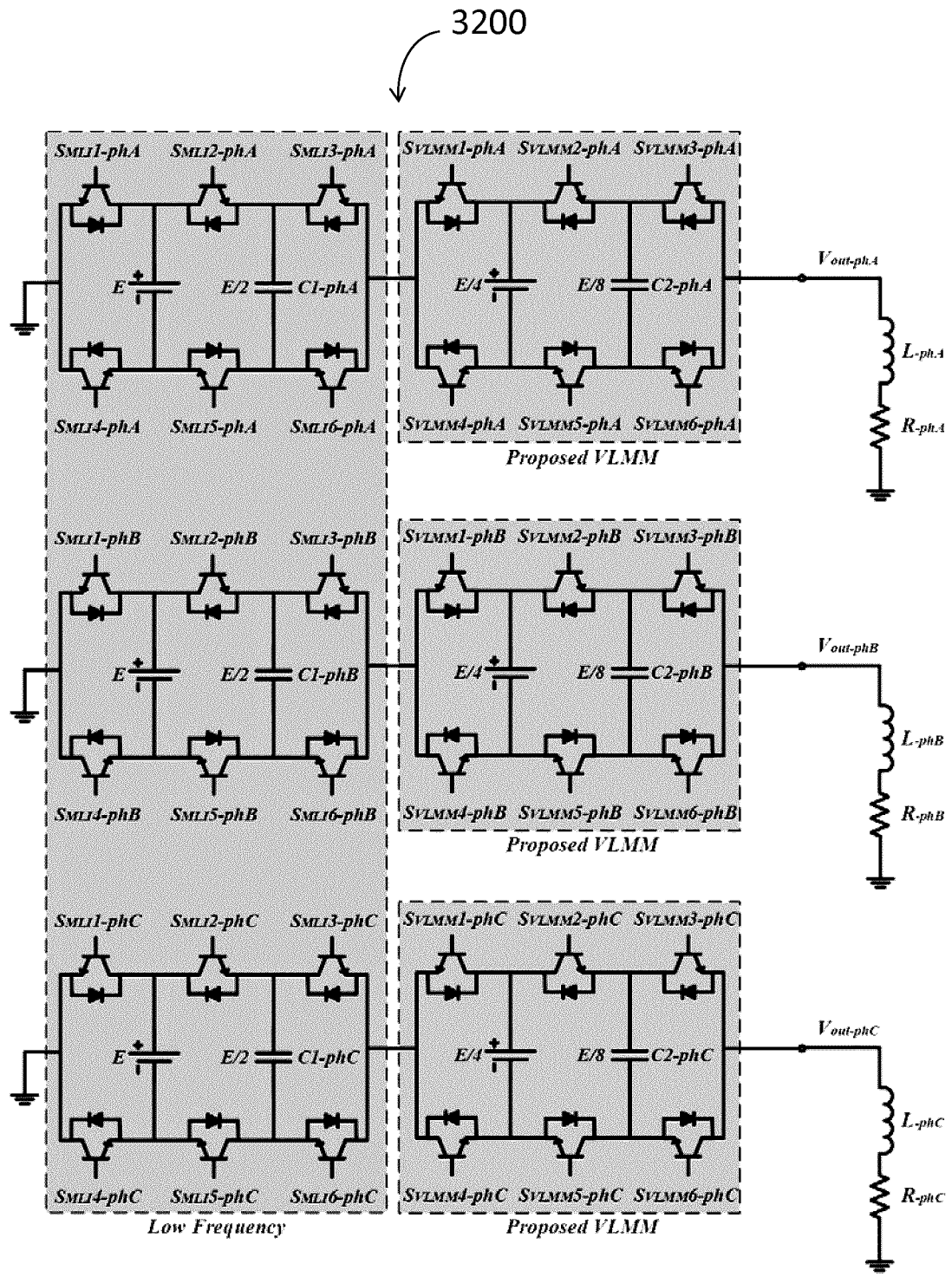
Figure 33:
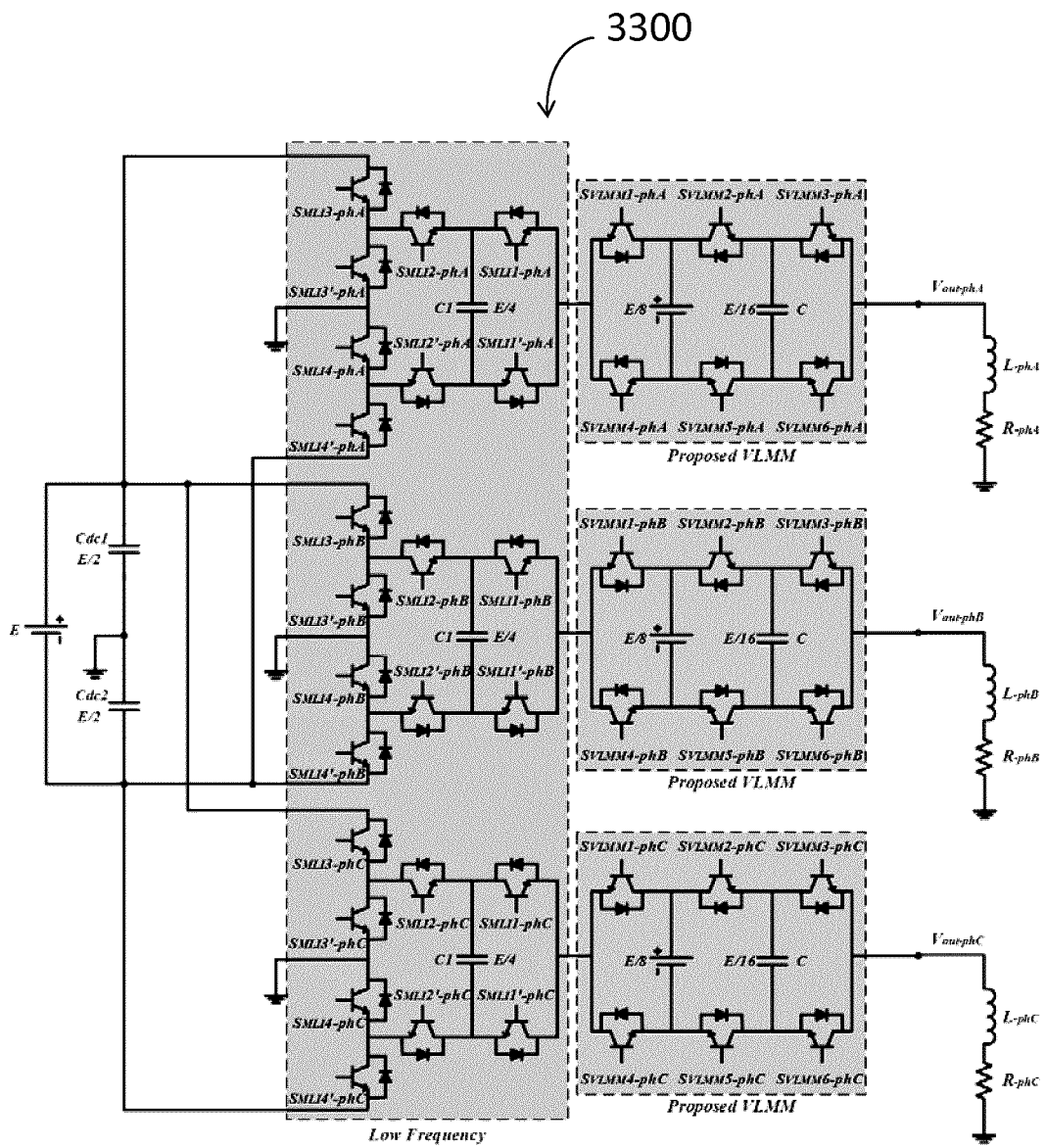

It shall be recognized that the VLMMs (110a, 110b, 110c) can be connected to the output of a variety of other inverters in order to augment by 2n-Folds the phase voltage levels. For instance, as presented in FIG. 30, there is a three-phase quadrupled CHB based converter circuit 3000 (Q-CHB), according to one embodiment. Presented in FIG. 31 is a three-phase quadrupled HNPC based converter circuit 3100 (Q-HNPC), according to one embodiment. Presented in FIG. 32 is a three-phase quadrupled PUC based converter circuit 3200 (Q-PUC), according to one embodiment. Presented in FIG. 33 is a three-phase quadrupled ANPC based converter circuit 3300 (Q-ANPC), according to one embodiment.

Figure 34:
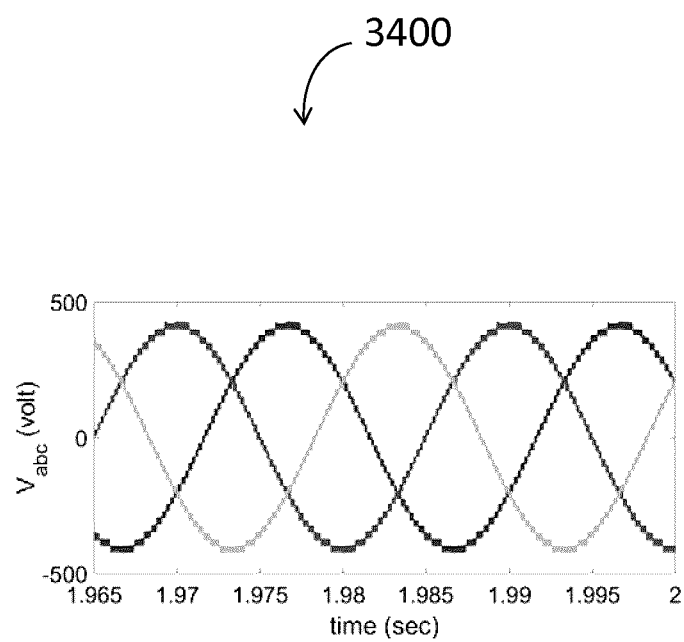
FIG. 34 is graph of a line voltage of the three phase converters of FIGS. 30 to 33, according to one embodiment.

The three-phase quadrupled five-level MLI converters (3000, 3100, 3200 and 3300) are adapted to produce twenty-one voltage levels per phase, and forty-one voltage levels per line, as presented in the line voltage output graph 3400 of FIG. 34.

It shall be recognized that the decomposed modulation architecture or technique provides great versatility in connecting a variety of MLIs to any 2n-fold VLMM. Indeed, the MLI is controlled independently from the VLMM and the required switching pattern is provided to control the various switches of the MLI or VLMM, individually. Also the decomposed modulation technique is easily adapted for three-phase applications. In addition, with decomposed modulation technique, the capacitors are self-balanced and additional capacitors voltage closed-loop controllers are not required.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A power converter circuit, comprising:
a multilevel inverter providing at an output thereof a first output voltage having M voltage levels; and
at least one N-fold voltage level multiplier module electrically connected to the output of the multilevel inverter and comprising a plurality of circuit elements configured to provide at least five voltage levels, the at least one voltage level multiplier module configured to receive the first output voltage from the multilevel inverter and to generate a second output voltage having M×N+1 voltage levels, where N is at least four.

2. The power converter circuit of claim 1, wherein the multilevel inverter is configured to provide three output voltages, each of the three output voltages being phase shifted by 2π/3 and having the M voltage levels, three of the at least one voltage level multiplier module being connected to receive a respective one of the three output voltages and being configured to each generate the second output voltage at a corresponding phase.

3. The power converter circuit of claim 1, further comprising an output filter connected to an output of the voltage level multiplier module, the output filter comprising an inductor and a capacitor, wherein the inductor has an inductance value of $$L = \frac{V_{DC}}{8 \times (n-1) \times \Delta I_L \times f_{1st\ SW\ Harmonic}}$$

and the capacitor has a capacitance value of $$C = \frac{4}{(2\pi \times f_{1st\ SW\ Harmonic})^2 \times L},$$

where n is the number of output voltage levels, $\Delta I_L$ is the desired output current ripple, $f_{1st\ SW\ Harmonic}$ is the first switching harmonic cluster frequency and $V_{DC}$ is the DC-link voltage.

4. The power converter circuit of claim 1, further comprising a controller having:
a processor and non-transitory memory storing instructions to cause the processor to perform:
generating a first reference signal having staircase voltage levels based on level detection of a sinusoidal input reference signal;
generating a second reference signal by subtracting the first reference signal from the sinusoidal input reference signal; and
one of:
comparator circuitry for comparing the second reference signal to a plurality of triangular carrier signals to generate a plurality of switching signals for the voltage level multiplier module, each of the plurality of switching signals for controlling a given one of a plurality of switching elements of the at least one voltage level multiplier module; and
further instructions stored in said memory for causing the processor to further perform comparing the second reference signal to a plurality of triangular carrier signals to generate a plurality of switching signals for the voltage level multiplier module, each of the plurality of switching signals for controlling a given one of the plurality of switching elements of the at least one voltage level multiplier module.

5. A power converter circuit, comprising:
a multilevel inverter providing at an output thereof a first output voltage having M voltage levels; and
at least one N-fold voltage level multiplier module electrically connected to the output of the multilevel inverter and comprising a plurality of switching elements,
wherein said at least one N-fold voltage level multiplier module provides at least five voltage levels, receives the first output voltage from the multilevel inverter and generates a second output voltage having M×N+1 voltage levels, where N is at least four.

6. The voltage level multiplier module of claim 5, wherein the voltage level multiplier module is connectable in series and is adapted to generate a converter output voltage of $M \times N^m + \Sigma_{k=0}^{m-1} N^k$ voltage levels, where k is an index of each of the series-connected voltage level multiplier modules ranging from 1 to m and m is the number of series-connected voltage level multiplier modules.

7. The voltage level multiplier module of claim 6, wherein the multilevel inverter comprises a first power source operating at a DC voltage level E and wherein the plurality of switching elements comprise an additional power source operating at a voltage level of $E/(N^{(k-1)} \times (M-1))$, for each $k^{th}$ series-connected voltage level multiplier module.

8. The voltage level multiplier module of claim 6, wherein the plurality of switching elements comprise two low frequency switches operating at the $E/(N^{(k-1)} \times (M-1))$ voltage level, for each $k^{th}$ series-connected voltage level multiplier module.

9. The voltage level multiplier module of claim 8, wherein the plurality of switching elements comprise 2×n high frequency switches and n−1 capacitors each having a capacitor voltage of $((n-b) \times E)/n \times N^{(k-1)} \times (M-1))$ where b is an index of each of the n−1 capacitors, b ranging from 1 to n−1, the high frequency switches operating at a voltage of $E/(n \times N^{(k-1)} \times (M-1))$, for each $k^{th}$ series-connected voltage level multiplier module.

10. The voltage level multiplier module of claim 9, wherein the two low frequency switches and the 2×n high frequency switches are controlled to provide sensor-less voltage balancing to the n−1 capacitors.

11. The voltage level multiplier module of claim 5 wherein said instructions cause the processor to control a given one of the plurality of switching elements based on phase disposition pulse width modulation.

12. The switching pattern generator of claim 11, configured to generate the plurality of switching signals based on comparing a reference voltage signal to a group of triangular carrier signals.

13. The switching pattern generator of claim 12, wherein the plurality of switching elements comprise 2×n high frequency switches and n−1 capacitors and wherein the group of triangular carrier signals are n phase-shifted triangular carrier signals that are shifted by 2×π/n.

14. The switching pattern generator of claim 13, wherein the plurality of switching signals provide sensor-less voltage balancing to the n−1 capacitors.

15. A method for controlling a plurality of switching elements of a voltage level multiplier module configured to provide at least five voltage levels, the method comprising:
generating a first reference signal having staircase voltage levels based on level detection of a sinusoidal input reference signal;
generating a second reference signal by subtracting the first reference signal from the sinusoidal input reference signal;
comparing the second reference signal to a plurality of triangular carrier signals to generate comparison results;
processing the comparison results to generate a plurality of switching signals; and
providing the plurality of switching signals to the voltage level multiplier module, each of the plurality of switching signals for controlling a given one of the plurality of switching elements.

16. The method of claim 15 wherein the plurality of triangular carrier signals are phase-shifted triangular carrier signals.

17. The method of claim 16 wherein the plurality of triangular carrier signals are n triangular carrier signals that are shifted by 2π/n, where the plurality of circuit elements comprise 2×n high frequency switches and n−1 capacitors.

18. The method of claim 15 further comprising comparing the second reference signal to a zero value by applying a zero-crossing comparator to generate comparison results for two low-frequency switching elements of the plurality of circuit elements.

19. The method of claim 15 further comprising sensorless balancing a voltage of n−1 capacitors according to the switching signals, where the plurality of circuit elements comprise n−1 capacitors.

* * * * *

UNITED STATES PATENT AND TRADEMARK OFFICE
CERTIFICATE OF CORRECTION

PATENT NO. : 11,456,679 B2
APPLICATION NO. : 17/079879
DATED : September 27, 2022
INVENTOR(S) : Mostafa Abarzadeh et al.

It is certified that error appears in the above-identified patent and that said Letters Patent is hereby corrected as shown below:

In the Specification
1. In Column 1, Line 38, delete "MLs," and insert -- MLIs, --, therefor.
2. In Column 2, Line 10, delete "MLs" and insert -- MLIs --, therefor.
3. In Column 2, Line 29, delete "M×N$^m$+Σ$_{k=0}$$^{m-1}$N$^k$" and insert -- $M \times N^m + \sum_{k=0}^{m-1} N^k$ --, therefor.
4. In Column 2, Lines 35 and 36, delete "E/(N$^{(k-1)}$×(M–1))" and insert -- E/(N$^{(k-1)}$ × (M-1)), --, therefor.
5. In Column 4, Line 10, delete "M×N$^m$+Σ$_{k=0}$$^{m-1}$N$^k$" and insert -- $M \times N^m + \sum_{k=0}^{m-1} N^k$ --, therefor.
6. In Column 4, Line 19, delete "E/(N$^{(k-1)}$×(M–1))" and insert -- E/(N$^{(k-1)}$ × (M-1)), --, therefor.
7. In Column 4, Line 19, delete "kth" and insert -- k$^{th}$ --, therefor.
8. In Column 7, Line 42, delete "generalised" and insert -- generalized --, therefor.
9. In Column 16, Line 41, delete "1001" and insert -- 100$_1$ --, therefor.
10. In Column 16, Line 42, delete "1201.'" and insert -- "120$_1$." --, therefor.
11. In Column 31, Line 34, delete "$\frac{E}{4}$" and insert -- $\frac{E}{4}$. --, therefor.
12. In Column 32, Line 44, delete "Vref-MLI" and insert -- Vref_MLI --, therefor.

In the Claims
13. In Column 35, Claim 6, Line 64, delete "M×N$^m$+Σ$_{k=0}$$^{m-1}$N$^k$" and insert -- $M \times N^m + \sum_{k=0}^{m-1} N^k$ --, therefor.
14. In Column 36, Claim 9, Line 15, delete "((n–b)×E)/n×N$^{(k-1)}$×(M–1))" and insert -- ((n-b)×E)/(n×N$^{(k-1)}$ × (M-1)) --, therefor.
15. In Column 36, Claim 11, Line 24, after "claim 5" insert -- , --.
16. In Column 36, Claim 16, Line 58, after "claim 15" insert -- , --.
17. In Column 36, Claim 17, Line 61, after "claim 16" insert -- , --.
18. In Column 36, Claim 18, Line 65, after "claim 15" insert -- , --.
19. In Column 37, Claim 19, Line 4, after "claim 15" insert -- , --.

Signed and Sealed this
Fourteenth Day of February, 2023

Katherine Kelly Vidal
*Director of the United States Patent and Trademark Office*